US011800342B2

(12) United States Patent
Sreeram et al.

(10) Patent No.: US 11,800,342 B2
(45) Date of Patent: Oct. 24, 2023

(54) EMERGENCY OR STEALTH RESPONSES TRIGGERED BY FINGERPRINT SENSOR

(71) Applicant: QUALCOMM Incorporated, San Diego, CA (US)

(72) Inventors: Sai Praneeth Sreeram, Anantapur (IN); Surendra Paravada, Hyderabad (IN); Madhu Yashwanth Boenapalli, Hyderabad (IN); Bipul Tarafdar, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,195

(22) Filed: Sep. 20, 2021

(65) Prior Publication Data

US 2023/0085885 A1 Mar. 23, 2023

(51) Int. Cl.
*H04W 4/90* (2018.01)
*G06V 40/12* (2022.01)
*G06V 40/13* (2022.01)
*G06F 3/048* (2013.01)

(52) U.S. Cl.
CPC .............. *H04W 4/90* (2018.02); *G06F 3/048* (2013.01); *G06V 40/1306* (2022.01); *G06V 40/1365* (2022.01)

(58) Field of Classification Search
CPC ............ G06V 40/1365; G06V 40/1306; G06F 3/048; H04W 4/90
See application file for complete search history.

(56) References Cited

U.S. PATENT DOCUMENTS

| 2016/0147987 | A1* | 5/2016 | Jang | G06V 40/1365 726/19 |
| 2017/0103246 | A1 | 4/2017 | Pi et al. | |
| 2019/0187643 | A1* | 6/2019 | Carpenter | H04W 4/38 |

(Continued)

OTHER PUBLICATIONS

Derakhshani R., et al., "Determination of Vitality from a Non-Invasive Biomedical Measurement for use in Fingerprint Scanners", Pattern Recognition, Elsevier, GB, vol. 36, No. 2, Feb. 28, 2003, pp. 383-396, XP004389399, ISSN: 0031-3203, DOI: 10.1016/S0031-3203(02)00038-9 Title Abstract.

(Continued)

*Primary Examiner* — Gerald Johnson
(74) *Attorney, Agent, or Firm* — QUALCOMM Incorporated

(57) ABSTRACT

A method may involve receiving fingerprint sensor data from a fingerprint sensor system, detecting, according to the fingerprint sensor data, a presence of a digit on an outer surface of the apparatus in a fingerprint sensor system area; determining, according to the fingerprint sensor data, a digit force or a digit pressure of the digit on the outer surface of the apparatus; and making, according to the fingerprint sensor data, a time threshold determination. The time threshold determination may involve determining whether a length of time during which the digit force exceeds a threshold digit force or during which the digit pressure exceeds a threshold digit pressure is greater than or equal to a threshold length of time. The method may involve determining, based at least in part on the time threshold determination, whether to enable one or more emergency response functions of the apparatus.

26 Claims, 34 Drawing Sheets

(56) References Cited

U.S. PATENT DOCUMENTS

| | | |
|---|---|---|
| 2019/0370442 A1 | 12/2019 | Novelli et al. |
| 2019/0370518 A1 | 12/2019 | Maor et al. |
| 2021/0052221 A1* | 2/2021 | Panneer Selvam ... A61B 5/1117 |
| 2021/0124814 A1* | 4/2021 | Andersson ............ G06F 3/0416 |
| 2021/0286060 A1* | 9/2021 | Jennings ............. G01S 7/52096 |
| 2022/0336083 A1* | 10/2022 | Goldstein ............. G16H 20/60 |

OTHER PUBLICATIONS

Partial International Search Report—PCT/US2022/074786—ISA/EPO—Nov. 2, 2022.

International Search Report and Written Opinion—PCT/US2022/074786—ISA/EPO—dated Feb. 6, 2023.

\* cited by examiner

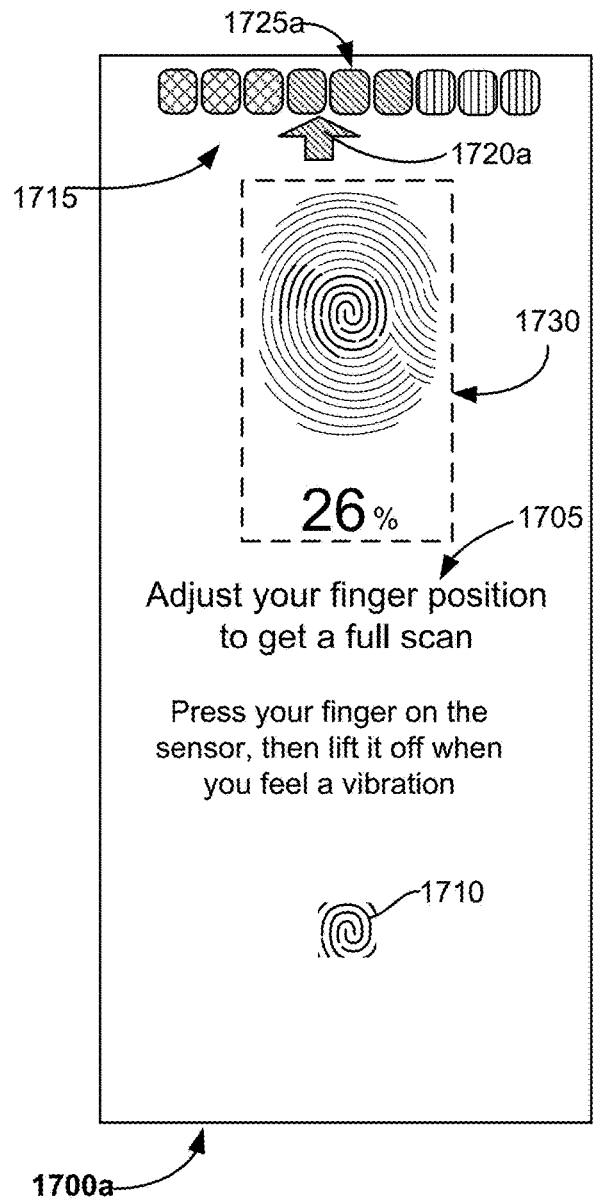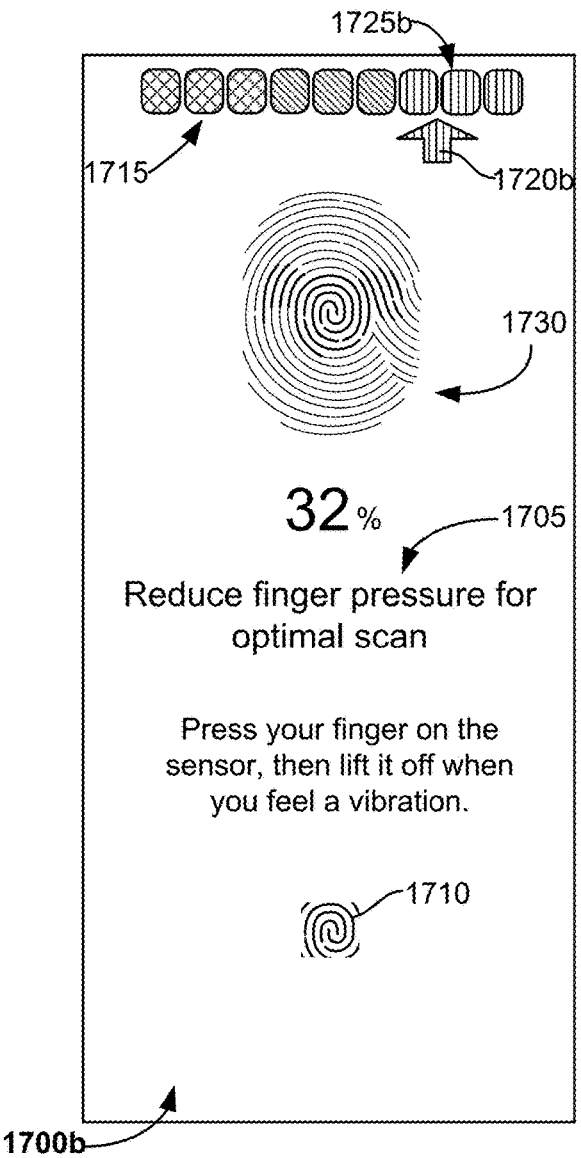
Figure 17A
Figure 17B

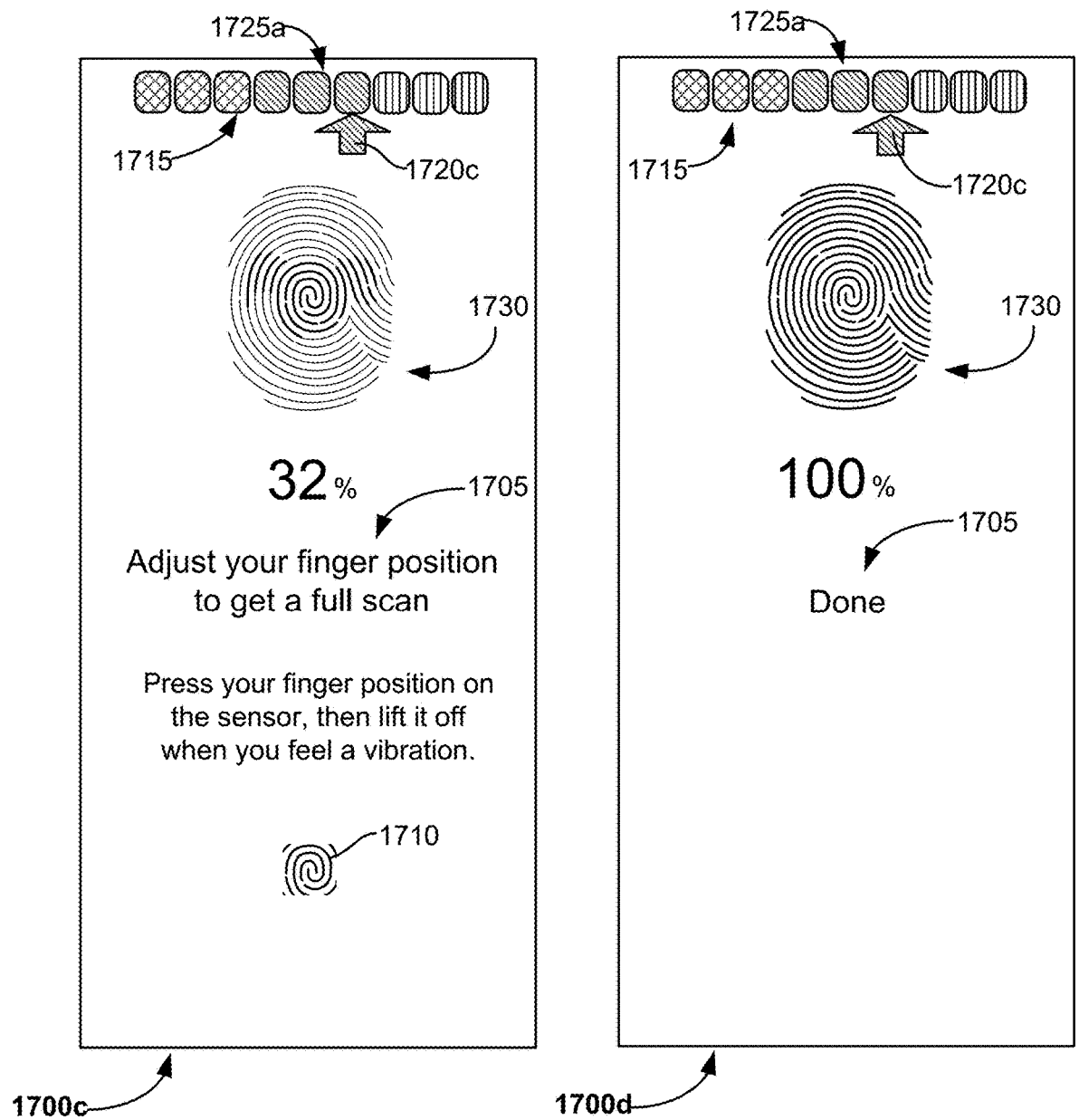

EMERGENCY OR STEALTH RESPONSES TRIGGERED BY FINGERPRINT SENSOR

TECHNICAL FIELD

This disclosure relates generally to fingerprint sensors and methods for using such systems.

DESCRIPTION OF THE RELATED TECHNOLOGY

Fingerprint sensors, including but not limited to ultrasonic fingerprint sensors, have been included in devices such as smartphones, cash machines and cars to authenticate a user. Although some existing devices with fingerprint sensors can provide satisfactory performance, improved devices and methods for operating such devices would be desirable.

SUMMARY

The systems, methods and devices of the disclosure each have several innovative aspects, no single one of which is solely responsible for the desirable attributes disclosed herein.

Some innovative aspects of the subject matter described in this disclosure may be implemented in a method. The method may involve controlling an apparatus that includes a fingerprint sensor system. The method may involve receiving, by a control system, fingerprint sensor data from the fingerprint sensor system. The method may involve detecting, by the control system and according to the fingerprint sensor data, a presence of a digit on an outer surface of the apparatus in a fingerprint sensor system area. The method may involve determining, by the control system and according to the fingerprint sensor data, a digit force or a digit pressure of the digit on the outer surface of the apparatus. The method may involve making, by the control system and according to the fingerprint sensor data, a time threshold determination. In some examples, the time threshold determination may involve determining at least one of whether a length of time during which the digit force exceeds a threshold digit force or during which the digit pressure exceeds a threshold digit pressure is greater than or equal to a threshold length of time. The method may involve determining, by the control system and based at least in part on the time threshold determination, whether to enable one or more emergency response functions of the apparatus.

In some instances, the one or more emergency response functions may include one or more of initiating a telephone call to an emergency response telephone number, initiating a telephone call to a designated emergency communication recipient or initiating a text message to the designated emergency communication recipient. In some examples, the one or more emergency response functions may include one or more of initiating an audio recording session, initiating a video recording session, taking one or more photographs or causing one or more financial institution accounts to be locked.

According to some examples, the method may involve determining, by the control system and according to the fingerprint sensor data, a heart rate. Some such examples may involve determining, by the control system, whether the heart rate equals or exceeds a threshold heart rate.

In some instances wherein the control system determines that the heart rate does not equal or exceed the threshold heart rate, the method may involve controlling, by the control system, the apparatus to provide a prompt indicating that at least one of the one or more emergency response functions will be enabled if first specified user actions are taken. In some examples, providing the prompt may involve presenting a graphical user interface (GUI) on a display device of the apparatus. In some instances the first specified user actions may be, or may include, additional instances of digit force or additional instances of digit pressure to be applied in the fingerprint sensor system area.

According to some instances wherein the control system determines that the heart rate equals or exceeds the threshold heart rate, the method may involve estimating, by the control system and according to the fingerprint sensor data, an anxiety level. In some examples, estimating the anxiety level may involve detecting a presence of digit perspiration or an absence of digit perspiration.

In some instances wherein the control system detects the presence of digit perspiration, the method may involve enabling, by the control system, the one or more emergency response functions. According to some such examples, the method may involve determining user location data prior to enabling the one or more emergency response functions and providing the user location data with at least one emergency response communication.

According to some instances wherein the control system does not detect the presence of digit perspiration, the method may involve controlling, by the control system, the apparatus to provide a prompt indicating that at least one of the one or more emergency response functions will be enabled if second specified user actions are taken. In some examples, the second specified user actions may be, or may include, additional instances of digit force or additional instances of digit pressure to be applied in the fingerprint sensor system area.

According to some examples, the method may involve determining, by the control system, whether the digit is a digit that is most often used for an authentication process. In some examples, the method may involve performing, by the control system, an authentication process that may be based, at least in part, on the fingerprint sensor data. In some implementations, receiving the fingerprint sensor data may involve receiving ultrasonic fingerprint sensor data.

In some examples, the method may involve determining, by the control system, whether the digit has been selected for triggering the one or more emergency response functions. In some such examples, determining whether to enable one or more emergency response functions may be based, at least in part, on whether the digit has been selected for triggering the one or more emergency response functions.

According to some examples, the method may involve a pattern determination process of determining, by the control system, whether a complete pattern has been input via the fingerprint sensor system. In some such examples, determining whether to enable one or more emergency response functions may be based, at least in part, on the pattern determination process. In some instances, the complete pattern may be, or may include, a number of instances of digit force or instances of digit pressure applied in the fingerprint sensor system area.

In some instances wherein the control system determines that the complete pattern has not been received via the fingerprint sensor system, the method may involve controlling, by the control system, the apparatus to provide a prompt indicating that at least one of the one or more emergency response functions will be enabled if specified user actions are taken. In some such examples, providing the prompt may involve presenting a GUI on a display device of the apparatus. In some examples, the specified user actions may be, or may include, additional instances of digit force or additional instances of digit pressure to be applied in the fingerprint sensor system area.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. According to some examples, the method may involve receiving, by a control system, fingerprint sensor data from a fingerprint sensor system. In some examples, the method may involve detecting, by the control system and according to the fingerprint sensor data, a presence of a digit on an outer surface of an apparatus in a fingerprint sensor system area. In some examples, the method may involve determining, by the control system and according to the fingerprint sensor data, a digit force or a digit pressure of the digit on the outer surface of the apparatus. In some examples, the method may involve determining, by the control system and according to the fingerprint sensor data, a heart rate. In some examples, the method may involve determining, by the control system and based at least in part on the heart rate and the digit force or the digit pressure, whether to enable one or more emergency response functions of the apparatus.

In some examples, the one or more emergency response functions may include one or more of initiating a telephone call to an emergency response telephone number, initiating a telephone call to a designated emergency communication recipient, initiating a text message to the designated emergency communication recipient, initiating an audio recording session, initiating a video recording session, taking one or more photographs or causing one or more financial institution accounts to be locked.

In some examples, the method may involve determining, by the control system, whether the heart rate equals or exceeds a threshold heart rate. In some instances wherein the control system determines that the heart rate does not equal or exceed the threshold heart rate the method may involve controlling, by the control system, the apparatus to provide a prompt indicating that at least one of the one or more emergency response functions will be enabled if first specified user actions are taken. In some examples, providing the prompt may involve presenting a GUI on a display device of the apparatus. According to some examples, the first specified user actions may be, or may include, additional instances of digit force or additional instances of digit pressure to be applied in the fingerprint sensor system area.

Some innovative aspect of the subject matter described in this disclosure may be implemented in an apparatus. The apparatus may include a fingerprint sensor system and a control system that is configured for communication with the fingerprint sensor system. In some examples, at least a portion of the control system may be coupled to the fingerprint sensor. In some implementations, a mobile device may be, or may include, the apparatus. For example, a mobile device may include an apparatus as disclosed herein.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured to receive fingerprint sensor data from a fingerprint sensor system. In some examples, the control system may be configured to detect, according to the fingerprint sensor data, a presence of a digit on an outer surface of an apparatus in a fingerprint sensor system area. In some examples, the control system may be configured to determine, according to the fingerprint sensor data, a digit force or a digit pressure of the digit on the outer surface of the apparatus. In some examples, the control system may be configured to make a time threshold determination, the time threshold determination comprising determining whether a length of time during which the digit force exceeds a threshold digit force or during which the digit pressure exceeds a threshold digit pressure is greater than or equal to a threshold length of time. In some examples, the control system may be configured to determine, based at least in part on the time threshold determination, whether to enable one or more emergency response functions of the apparatus.

In some examples, the control system may be configured to perform a pattern determination process of determining whether a complete pattern has been input via the fingerprint sensor system. According to some such examples, the complete pattern may be, or may include, a number of instances of digit force and/or additional instances of digit pressure applied in the fingerprint sensor system area. In some examples, determining whether to enable one or more emergency response functions may be based, at least in part, on the pattern determination process.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIGS. 17A, 17B, 17C and 17D show examples of GUIs that may be presented during a fingerprint capture phase of a user enrollment process.

DETAILED DESCRIPTION

Figure 1A:
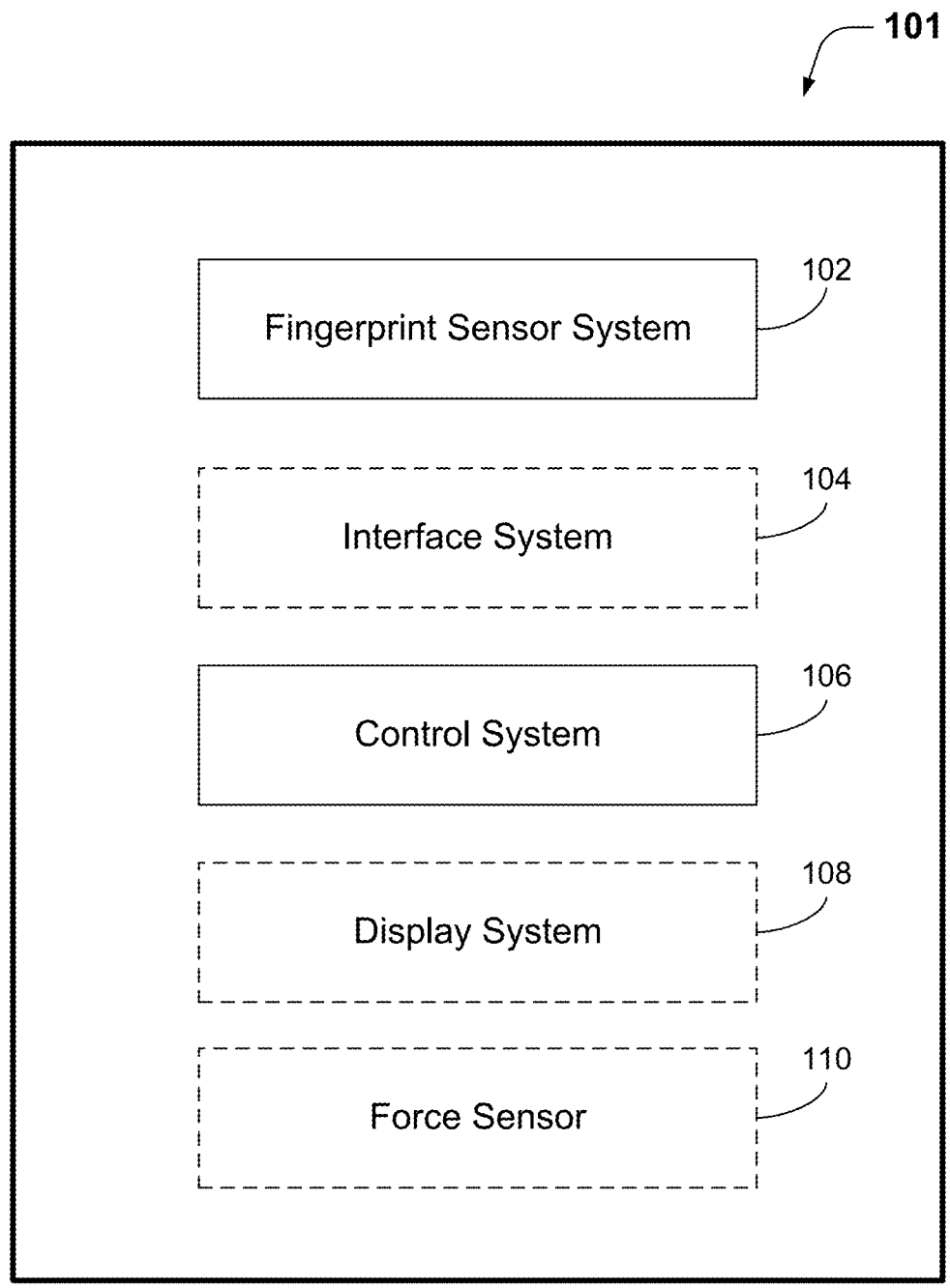
FIG. 1A is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In an emergency, time is of the essence. Therefore, it would be desirable to have fast and efficient methods for summoning help or taking other actions in an emergency situation. Such actions may be referred to herein as "emergency response functions." In some instances, including but not limited to situations in which a person and/or a person's property is being menaced by one or more other people, it would be desirable to summon help or take other actions without the other person(s) being aware that such responses are happening. Such actions may be referred to herein as "stealth actions," stealth events," or the like. Although stealth actions may not always correspond with situations involving a risk of harm to a person or property, as used herein stealth actions are considered to be a subset of possible emergency response functions.

In some implementations, an apparatus may include a fingerprint sensor system (which may in some instances be an ultrasonic fingerprint sensor system) and a control system. According to some examples, the control system may be configured to determine whether a digit is on an outer surface of the apparatus in a fingerprint sensor system area. In some examples, upon determining that a digit is on the outer surface of the apparatus in the fingerprint sensor system area, the control system may be configured to determine (e.g., according to fingerprint sensor data corresponding to the digit) a digit force or a digit pressure of the digit on the outer surface. In some examples, the control system may be configured to make, according to the fingerprint sensor data, a time threshold determination. The time threshold determination may involve determining whether a length of time during which the digit force exceeds a threshold force or during which the digit pressure exceeds a threshold pressure is greater than or equal to a threshold length of time. According to some examples, the control system may be configured to determine, based at least in part on the time threshold determination, whether to enable one or more emergency response functions of the apparatus. Some implementations may involve other methods of detecting an emergency situation, such as determining (e.g., according to the fingerprint sensor data) a heart rate and determining whether the heart rate equals or exceeds a threshold heart rate. The emergency response function(s) may, in some examples, involve initiating a telephone call to an emergency response telephone number and/or initiating a text message or a telephone call to a designated emergency communication recipient. The emergency response telephone number may, for example, be a publicly available emergency response telephone number (such as 911 in the United States). In some examples, the designated emergency communication recipient may be a spouse, a parent, a caretaker, etc. In some instances, the one or more emergency response functions may include initiating an audio recording session, initiating a video recording session, taking one or more photographs and/or causing one or more financial institution accounts to be locked.

Particular implementations of the subject matter described in this disclosure may be implemented to realize one or more of the following potential advantages. In some implementations, a user may be able to trigger one or more emergency response functions quickly and via stealth actions, in a manner that may not be easily detectable by a nearby person or persons. According to some such implementations, a user may be able to trigger one or more emergency response functions via a mobile device that includes a fingerprint sensor system, such as a cellular telephone. Because such mobile devices are widely deployed, a person may have an enhanced level of personal security based on implementations of the present disclosure.

Although force and pressure are different, in that pressure is force per unit of area, the terms "force" and "pressure" may sometimes be used interchangeably herein. According to some disclosed examples, a normal range of force or pressure applied by the user on a fingerprint sensor area may be determined during an enrollment process. In some such examples, prompts relating to a current digit force or a current digit pressure may be part of a user enrollment process, e.g., part of a force calibration phase or a pressure calibration phase of the user enrollment process or part of a fingerprint data capturing phase of the user enrollment process. However, in some instances prompts relating to a current digit force or a current digit pressure may be part of a post-enrollment authentication process. Feedback relating to the current digit force or the current digit pressure may indicate whether the current digit force or the current digit pressure is too low, too high or in an acceptable range for obtaining fingerprint data from a fingerprint sensor. In some instances, the feedback may be based on both fingerprint image quality and digit force or pressure. In some examples, the control system may be configured to determine an optimal range of digit force or pressure that corresponds with a highest level, or a highest range, of fingerprint image quality. By prompting a user to apply finger force or finger pressure in an optimal range, fingerprint image quality may be enhanced.

Moreover, having established a "normal" force or pressure range for a user (and, in some instances, for an individual digit of the user) during an enrollment process, instances of unusually high force or pressure on an active area of the fingerprint sensor may be detected. Such instances may, in some implementations, be the basis for triggering one or more emergency response functions. Alternatively, a user may establish a threshold digit force or digit pressure via user input, e.g., by interacting with a GUI. Various examples are disclosed herein.

FIG. 1A is a block diagram that shows example components of an apparatus according to some disclosed implementations. As with other disclosed implementations, the types, number and arrangement of elements shown in FIG. 1A are merely presented by way of example. Other implementations may have other types, numbers and/or arrangements of elements. In this example, the apparatus 101 includes a fingerprint sensor system 102 and a control system 106. Some implementations of the apparatus 101 may include an interface system 104, a display system and/or a force sensor 110.

The fingerprint sensor system 102 may be any suitable type of fingerprint sensor system, such as an optical fingerprint sensor system, a capacitive fingerprint sensor system, a resistive fingerprint sensor system, a radio frequency-based fingerprint sensor system, etc. In some examples the fingerprint sensor system may be, or may include, an ultrasonic fingerprint sensor system. Some detailed examples are provided herein.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the fingerprint sensor system 102, between the control system 106 and the display system 108 (if present) and between the control system 106 and the force sensor 110 (if present). According to some such examples, the interface system 104 may couple at least a portion of the control system 106 to the fingerprint sensor system 102 (as well as the display system 108 and/or the force sensor 110, if present), e.g., via electrically conducting material such as conductive metal wires or traces.

According to some examples, the interface system 104 may be configured to provide communication between the apparatus 101 and other devices and/or human beings. In some such examples, the interface system 104 may include one or more user interfaces. The user interface system 104 may, for example, include one or more loudspeakers, a touch and/or gesture sensor system, a haptic feedback system, etc. Although not shown as such in FIG. 1A or FIG. 1B, the optional display system 108 may be considered to be part of the interface system 104.

The interface system 104 may, in some examples, include one or more network interfaces and/or one or more external device interfaces (such as one or more universal serial bus (USB) interfaces and/or a serial peripheral interface (SPI)). In some implementations, the apparatus 101 may include a memory system in addition to memory that the control system 106 may include. The interface system 104 may, in some examples, include at least one interface between the control system 106 and the memory system.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include a dedicated component for controlling the fingerprint sensor system 102 (as well as the display system 108 and/or the force sensor 110, if present). The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1A or FIG. 1B. In some implementations, functionality of the control system 106 may be partitioned between one or more controllers or processors, such as between a dedicated sensor controller and an applications processor of a mobile device. Some examples are described below.

The force sensor 110, if present in the apparatus 101, may be a piezo-resistive sensor, a capacitive sensor, a thin film sensor (e.g., a polymer-based thin film sensor), or another type of suitable force sensor. If the force sensor 110 includes a piezo-resistive sensor, the piezo-resistive sensor may include silicon, metal, polysilicon and/or glass. The fingerprint sensor system 102 and the force sensor 110 may, in some instances, be mechanically coupled. In some such examples, the force sensor 110 may be integrated into circuitry of the fingerprint sensor system 102. However, in other implementations the force sensor 110 may be separate from the fingerprint sensor system 102. The fingerprint sensor system 102 and the force sensor 110 may, in some examples, be indirectly coupled. For example, the fingerprint sensor system 102 and the force sensor 110 each may be coupled to a portion of the apparatus 101. In some such examples, the fingerprint sensor system 102 and the force sensor 110 each may be coupled to a portion of the control system.

However, some implementations may not include a force sensor 110 that is separate from the fingerprint sensor system 102. In some such examples, the control system 106 may be configured for force detection and/or pressure detection based, at least in part, on fingerprint sensor data from the fingerprint sensor system 102.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 1B:
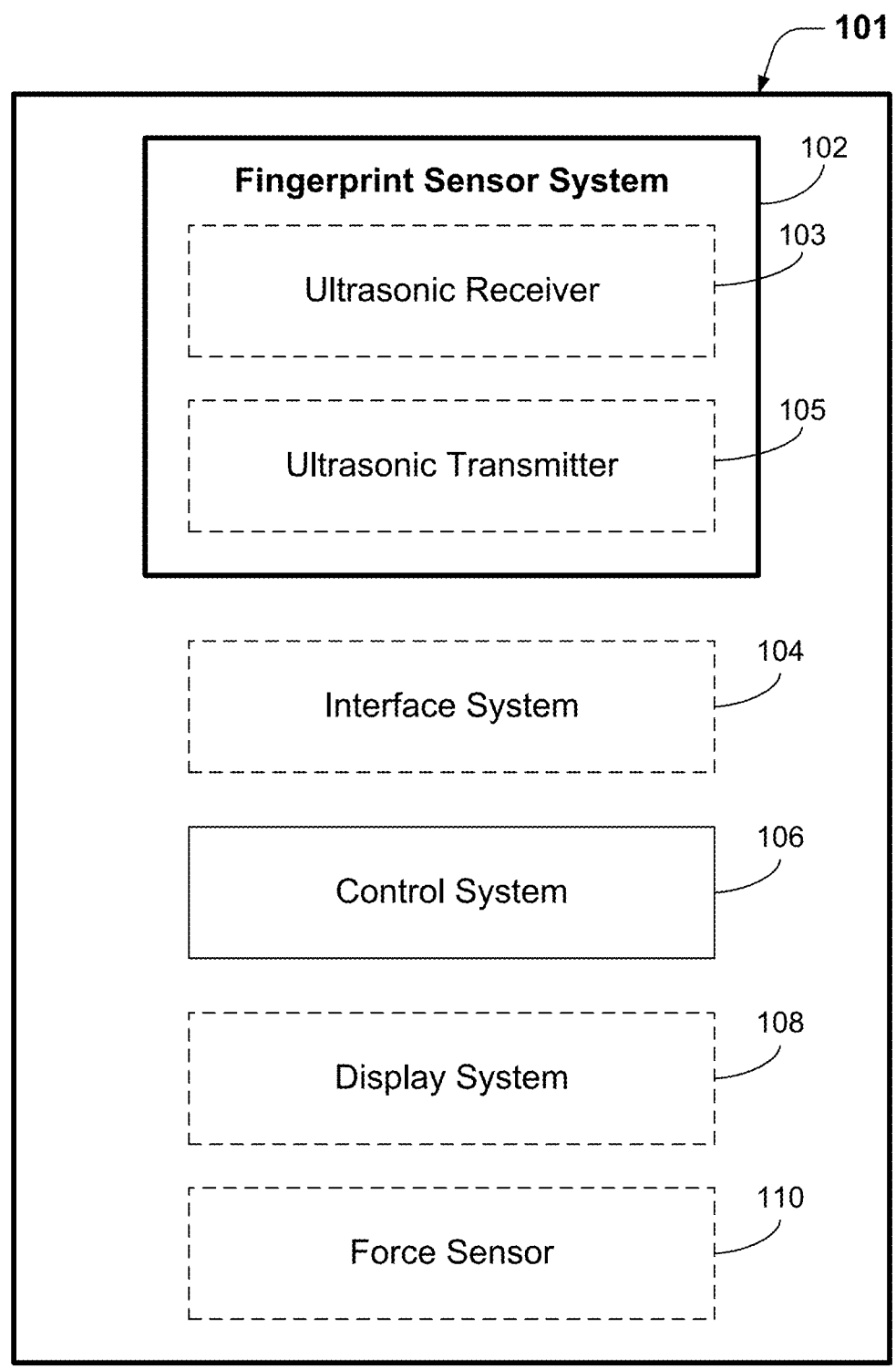
FIG. 1B is a block diagram that shows example components of the apparatus of FIG. 1A according to some disclosed implementations.

FIG. 1B is a block diagram that shows example components of the apparatus of FIG. 1A according to some disclosed implementations. In this example, the apparatus 101 includes the same elements that are described above with reference to FIG. 1A. Accordingly, unless noted otherwise, the elements of FIG. 1B may be assumed to be as described above with reference to FIG. 1A.

However, in this implementation, the fingerprint sensor system 102 is, or includes, an ultrasonic fingerprint sensor system. In some examples, as suggested by the dashed lines within the fingerprint sensor system 102, the fingerprint sensor system 102 may include an ultrasonic receiver 103 and a separate ultrasonic transmitter 105. In some such examples, the ultrasonic transmitter 105 may include an ultrasonic plane-wave generator, such as those described below.

Various examples of ultrasonic fingerprint sensors 102 are disclosed herein, some of which may include an ultrasonic receiver 103 and a separate ultrasonic transmitter 105 and some of which may not. Although shown as separate elements in FIG. 1B, in some implementations the ultrasonic receiver 103 and the ultrasonic transmitter 105 may be combined in an ultrasonic transceiver system. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

If the apparatus 101 includes an ultrasonic transmitter 105 that is separate from the ultrasonic receiver 103, the interface system 104 may be configured to provide communication between at least a portion of the control system 106 and the ultrasonic transmitter 105 and between at least a portion of the control system 106 and the ultrasonic receiver 103.

The control system 106 may be configured for receiving and processing data from the fingerprint sensor system 102, e.g., from the ultrasonic receiver 103. If the apparatus 101 includes a separate ultrasonic transmitter 105, the control system 106 may be configured for controlling the ultrasonic transmitter 105, e.g., as disclosed elsewhere herein.

Figure 2:
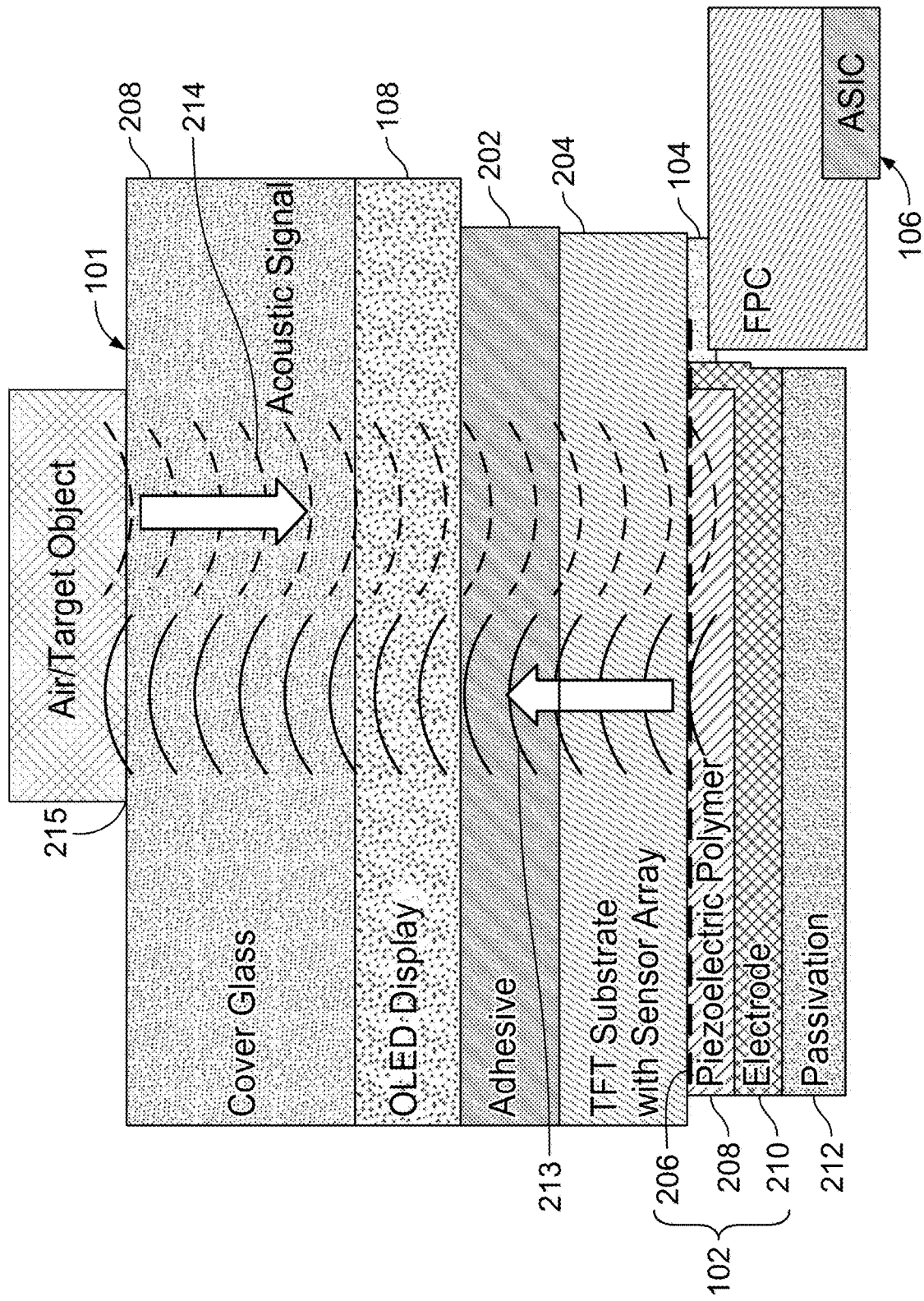
FIG. 2 shows a cross-section of an apparatus according to some disclosed implementations.

FIG. 2 shows a cross-section of an apparatus according to some disclosed implementations. As with other disclosed implementations, the types, numbers and arrangements of elements, as well as the dimensions of elements, are merely examples. According to this example, the apparatus 101 is configured to perform at least some of the methods disclosed herein. According to this implementation, the apparatus 101 has an ultrasonic sensor system 102 that includes a piezoelectric layer 208, an electrode layer 210 on one side of the piezoelectric layer 208 and an array of sensor pixels 206 on a second and opposing side of the piezoelectric layer 208. In this implementation, the piezoelectric layer 208 is an ultrasonic transceiver layer that includes one or more piezoelectric polymers.

According to this example, the electrode layer 210 resides between a passivation layer 212 and the piezoelectric layer 208. In some examples, passivation layer 212 may include an adhesive, such as an epoxy film, a polymer layer (such as a polyethylene terephthalate (PET) layer), etc.

In this implementation, the TFT layer 204 includes a TFT substrate and circuitry for the array of sensor pixels 206. The TFT layer 204 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass.

In this example, the apparatus 101 includes a display system 108, which includes an OLED display in this instance. Here, the OLED display is attached to the TFT layer 204 via an adhesive layer 202.

According to this implementation, the TFT layer 204, the array of sensor pixels 206 and the electrode layer 210 are electrically coupled to at least a portion of the control system 106 and one side of the ultrasonic transceiver layer 101 via a portion of the interface system 104, which includes electrically conducting material and a flexible printed circuit (FPC) in this instance.

In this example, the apparatus 101 is configured to perform at least some of the methods disclosed herein. In this example, the control system 106 is configured to control the ultrasonic sensor system 102 to transmit one or more ultrasonic waves 213. According to this example, the ultrasonic wave(s) 213 are transmitted through the TFT layer 204, the OLED display and the cover 208. According to this example, at least some reflections 214 of the ultrasonic wave(s) 213 are caused by acoustic impedance contrast at (or near) the interface 215 between the outer surface of the cover 208 and whatever is in contact with the outer surface, which may be air or the surface of a target object, such as the ridges and valleys of a fingerprint, etc. (As used herein, the term "finger" may refer to any digit, including a thumb. Accordingly, a thumbprint will be considered a type of "fingerprint.") In some examples, at least some reflections 214 of the ultrasonic wave(s) 213 are caused by acoustic impedance contrasts within a target object, such as a finger. Such impedance contrasts may correspond with sub-epidermal features such as papillary layer features, reticular layer features, subcutis features, blood vessel features, lymph vessel features, fat lobule features, muscle tissue features, bone features, etc.

According to some examples, reflections 214 of the ultrasonic wave(s) 213 may be detected by the electrode layer 210. Corresponding ultrasonic signals may be provided to the control system 106. In some such implementations, reflections 214 corresponding to a cover/air interface may be detected by the electrode layer 210 and corresponding background ultrasonic signals may be provided to the control system 106. In some such implementations, ultrasonic signals that are used by the control system 106 for fingerprint-based authentication may be based on reflections 214 from a cover/finger interface that are detected by the array of sensor pixels 206.

In some examples, the control system 106 may be configured for estimating a target object force or pressure (such as a digit force or pressure) based on fingerprint sensor data received from the fingerprint sensor system 102. In some such examples, the fingerprint sensor data may correspond to signals received from the array of sensor pixels 206. Alternatively, or additionally, the fingerprint sensor data may correspond to signals received from the electrode layer 210. In some implementations, the control system 106 may be configured for detecting or estimating a digit force or pressure according to one or more of the methods that are described in detail below.

In some implementations, the control system 106 may be configured for detecting or estimating a heart rate of a person, e.g., a heart rate of a user of the apparatus 101. According to some such implementations, the control system 106 may be configured for detecting or estimating a heart rate based, at least in part, on fingerprint sensor data received from the fingerprint sensor system 102. In some such examples, the fingerprint sensor data may correspond to signals received from the array of sensor pixels 206. Alternatively, or additionally, the fingerprint sensor data may correspond to signals received from the electrode layer 210. In some implementations, the control system 106 may be configured for detecting or estimating a heart rate according to one or more of the methods that are described in detail below.

In some implementations, the control system 106 may be configured for detecting or estimating a heart rate of a person during an enrollment process. According to some implementations, the control system 106 may be configured for detecting or estimating a heart rate of a person after an enrollment process, e.g., on a periodic basis and/or in response to a heart rate determination trigger, such as inertial sensor data indicating accelerations of the apparatus. In some such implementations, the control system 106 may be configured for determining one or more average or mean heart rates of a person, such as an average resting heart rate, an average heart rate while the person is standing still, an average heart rate while the person is performing an activity such as walking, driving, etc.

According to some implementations, the control system 106 may be configured to obtain heart rate data from another device, such as a smart watch, a health and fitness tracking device, etc. The heart rate data may include one or more of an average resting heart rate, an average heart rate while the person is standing still, an average heart rate while the person is performing an activity such as walking, driving, etc.

Figure 3:
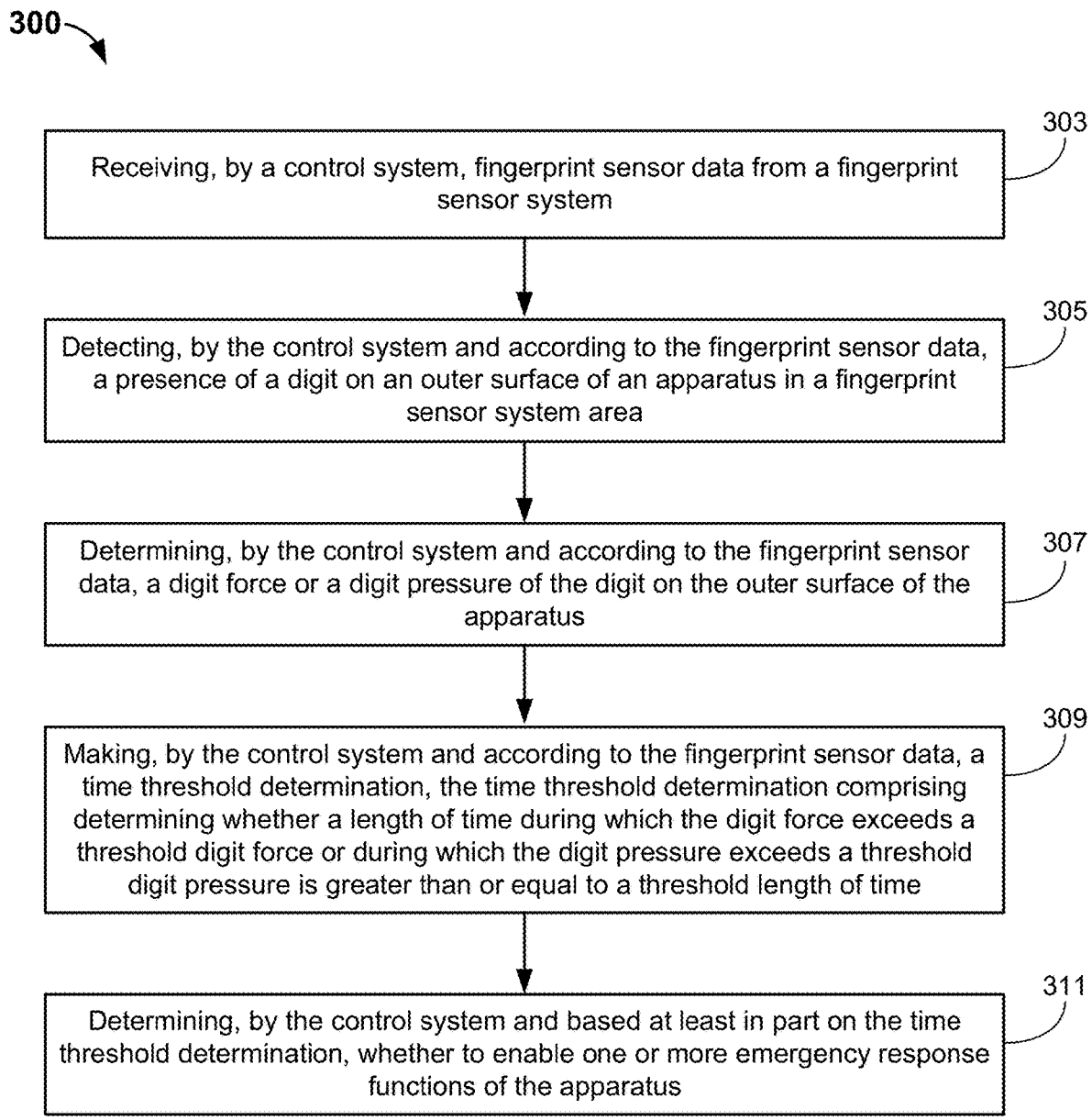
FIG. 3 is a flow diagram that provides example blocks of some methods disclosed herein.

FIG. 3 is a flow diagram that provides example blocks of some methods disclosed herein. The blocks of FIG. 3 may, for example, be performed by the apparatus 101 of FIG. 1A, FIG. 1B or FIG. 2, or by a similar apparatus. As with other methods disclosed herein, the method 300 outlined in FIG. 3 may include more or fewer blocks than indicated. Moreover, the blocks of methods disclosed herein are not necessarily performed in the order indicated. For example, in some instances block 305 of FIG. 3 may be performed prior to block 303. In some examples, some blocks of methods disclosed herein may be performed concurrently.

According to this example, block 303 involves receiving, by a control system, fingerprint sensor data from the fingerprint sensor system. In some instances, receiving the fingerprint sensor data may involve receiving ultrasonic fingerprint sensor data. In some examples, the fingerprint sensor data may correspond to signals received from an array of sensor pixels an ultrasonic fingerprint sensor system, such as the array of sensor pixels 206 of FIG. 2. Alternatively, or additionally, the fingerprint sensor data may correspond to signals received from an electrode layer an ultrasonic fingerprint sensor system, such as the electrode layer 210 of FIG. 2. However, the fingerprint sensor system may or may not be (or include) an ultrasonic fingerprint sensor system, depending on the particular implementation.

In this example, block 305 involves detecting, by the control system and according to the fingerprint sensor data, a presence of a digit on an outer surface of the apparatus in a fingerprint sensor system area. In some alternative examples, the apparatus may include a touch sensor system and block 305 may involve receiving input from the touch sensor system indicating whether a target object is on an outer surface of the apparatus in an active area of a fingerprint sensor system. In some examples, block 305 may involve receiving input from the touch sensor system and/or the fingerprint sensor system indicating whether a target object on the outer surface of the apparatus in an active area of a fingerprint sensor system has one or more characteristics of a digit, such as a digit shape, fingerprint features, etc. In some examples, block 305 may involve receiving input from the fingerprint sensor system indicating whether a target object on the outer surface of the apparatus in an active area of a fingerprint sensor system has one or more sub-epidermal features such as papillary layer features, reticular layer features, subcutis features, blood vessel features, lymph vessel features, fat lobule features, muscle tissue features, bone features, etc.

According to this example, block 307 involves determining, by the control system and according to the fingerprint sensor data, a digit force or a digit pressure of the digit on the outer surface of the apparatus. According to some such examples, the fingerprint sensor data may be, or may include, ultrasonic fingerprint sensor data. In some such examples, the ultrasonic fingerprint sensor data may be received via an electrode layer proximate a piezoelectric layer of an ultrasonic fingerprint sensor system. Alternatively, or additionally, in some examples the ultrasonic fingerprint sensor data may be received via an array of ultrasonic sensor pixels. Some detailed examples for estimating digit force or digit pressure according to fingerprint sensor data are disclosed herein. However, in some alternative implementations block 307 may involve determining a digit force or a digit pressure according to force sensor data from a force sensor (such as the optional force sensor 110 of FIG. 1A or FIG. 1B) that may be separate from the fingerprint sensor system 102.

In this example, block 309 involves making, by the control system and according to the fingerprint sensor data, a time threshold determination. According to this implementation, the time threshold determination involves determining whether a length of time during which the digit force exceeds a threshold digit force or during which the digit pressure exceeds a threshold digit pressure is greater than or equal to a threshold length of time. The threshold digit force and/or the threshold digit pressure may vary according to the particular implementation. In some instances, the threshold digit force and/or the threshold digit pressure may be determined according to a range of digit forces and/or the digit pressures that were determined and stored during an enrollment process. For example, if a user's normal digit force range during an enrollment process was between 50 gram-force and 100 gram-force, the threshold digit force may be set to 100 gram-force, 110 gram-force, 120 gram-force, 130 gram-force, etc. According to some examples, the threshold digit force may be based on an average digit force during an enrollment process and/or the threshold digit pressure may be based on an average digit pressure during an enrollment process. In some such examples, the threshold digit force may be 110%, 115%, 120%, 125%, 130%, 135%, 140%, 145%, 150%, etc., of the average digit force during the enrollment process.

In some implementations, the threshold digit force and/or the threshold digit pressure may be user-selectable, e.g., via a GUI. Some examples are disclosed herein.

The threshold length of time may also vary according to the particular implementation. In some instances, the threshold length of time may be one second or less, e.g., 400 milliseconds (ms), 500 ms, 600 ms, 700 ms, 800 ms, 900 ms, 1 second, etc. However, in some examples the threshold length of time may be more than one second. One may observe that examples having a longer threshold length of time may be more effective at avoiding false positives (e.g., instances of unintentional hard presses on the active area of the fingerprint sensor), whereas examples having a shorter threshold length of time may be more effective in providing a prompt emergency response during an emergency. In some implementations, the threshold length of time may be user-selectable, e.g., via a GUI. Some examples are disclosed herein.

According to this example, block 311 involves determining, by the control system and based at least in part on the time threshold determination, whether to enable one or more emergency response functions of the apparatus. In some examples, block 311 may involve determining whether a threshold number of instances (e.g., 1 instance, 2 instances, 3 instances, etc.) of threshold digit force and/or threshold digit pressure during a threshold length of time has occurred. The threshold number of instances may, in some implementations, be user-selectable. An instance of threshold digit pressure being maintained for at least the threshold time interval may be referred to herein as a "digit pressure event," which term may be used synonymously herein with a "digit force event."

The one or more emergency response functions may differ according to the particular implementation. In some examples, the one or more emergency response functions may be user-selectable. According to some examples, the one or more emergency response functions may include initiating a telephone call to an emergency response telephone number, initiating a text message and/or a telephone call to a designated emergency communication recipient, etc. In some examples, the one or more emergency response functions may include one or more of initiating an audio recording session, initiating a video recording session, taking one or more photographs or causing one or more financial institution accounts to be locked.

In some implementations, method 300 may involve identifying a particular digit. For example, method 300 may involve determining which of the user's previously-enrolled digits were detected in block 305 and which particular digit is applying the force and/or pressure that is determined in block 307. As noted elsewhere herein, some disclosed implementations involve determining a characteristic digit force range and/or digit pressure range for a user. In some such examples, the digit force range and/or digit pressure range may vary from digit to digit. For example, a user may tend to press down harder with the user's right thumb than with the user's right pinky finger. The threshold digit force and/or the threshold digit pressure that are described above with reference to block 309 may, in some implementations, vary from digit to digit.

In some implementations, method 300 may involve determining, by the control system, whether the identified digit is a digit that is most often used for an authentication process. For example, a user may normally use the left thumb for an authentication process.

According to some implementations, method 300 may involve determining, by the control system, whether the identified digit is a digit that has been selected for triggering the one or more emergency response functions. For example, the user may deliberately select a digit that is different from the digit that is most often used for an authentication process to trigger the one or more emergency response functions. For instance, if a user normally uses the right thumb for an authentication process, the user (or the apparatus 101) may select a different digit (e.g., the right index finger) for triggering the one or more emergency response functions. According to some such examples, determining whether to enable one or more emergency response functions (in block 311) may be based, at least in part, on whether the digit has been selected for triggering the one or more emergency response functions.

In some implementations, method 300 may involve a pattern determination process of determining, by the control system, whether a complete pattern has been input via the fingerprint sensor system. In some such examples, determining whether to enable one or more emergency response functions may be based, at least in part, on the pattern determination process. In some instances, the complete pattern may be a number of instances of digit force or instances of digit pressure applied in the fingerprint sensor system area (e.g., in an active area of the fingerprint sensor system, in a designated area of the fingerprint sensor system (e.g., an area corresponding to a displayed fingerprint sensor system icon, etc.)). For example, the complete pattern may be, or may include, a number of instances of digit force exceeding a threshold digit force and/or a number of instances of digit pressure exceeding a threshold digit pressure, e.g., during a determined time interval ("digit pressure events"). In one such example, the complete pattern may be two instances of digit force exceeding a threshold digit force ("digit force events") during a time interval (e.g., of 5 seconds or less, of 4 seconds or less, of 3 seconds or less, of 2 seconds or less, etc.).

According to some implementations, if the control system determines that the complete pattern has not been received via the fingerprint sensor system, method 300 may involve controlling, by the control system, the apparatus to provide a prompt indicating that at least one of the one or more emergency response functions will be enabled if specified user actions are taken. In some such examples, providing the prompt may involve presenting a visual prompt, such as presenting a graphical user interface (GUI) on a display device of the apparatus and/or providing an audio prompt via a loudspeaker system of the apparatus. According to some examples, the specified user actions may be, or may include, additional instances of digit force or additional instances of digit pressure to be applied in the fingerprint sensor system area.

In some implementations, method 300 may involve performing, by the control system, an authentication process that is based, at least in part, on the fingerprint sensor data. In some such examples, the authentication process may be based, at least in part, on fingerprint features determined by the control system according to received fingerprint sensor data. The fingerprint features may, for example, include fingerprint ridge endings, fingerprint ridge bifurcations, short ridges and/or islands, and the locations of such fingerprint features. The authentication process may involve comparing currently-obtained fingerprint features with previously-obtained fingerprint features, e.g., fingerprint features obtained during an enrollment process. In some examples, the authentication process may be based, at least in part, on sub-epidermal features determined by the control system based on the fingerprint sensor data. The sub-epidermal features may, for example, include papillary layer features, reticular layer features, subcutis features, blood vessel features, lymph vessel features, fat lobule features, muscle tissue features and/or bone features. The authentication process may involve comparing currently-obtained sub-epidermal features with previously-obtained sub-epidermal features, e.g., sub-epidermal features obtained during an enrollment process.

As noted above, in some implementations a control system may be configured to determine a heart rate according to received fingerprint sensor data. In some examples, method 300 may involve determining whether the heart rate equals or exceeds a threshold heart rate. The threshold heart rate may, for example, be based at least in part on one or more previously-observed heart rates for the person, such as a previously-observed resting heart rate, a previously-observed heart rate while the person is performing a task such as walking, etc.

In some examples, the threshold heart rate may be set to a level such that if the person's heart rate is at that level, the person is likely to be afraid and/or in a stressful situation. For example, if the person's average heart rate is 90 beats per minute, the threshold heart rate may be set to a level that is above 90 beats per minute, such as 100 beats per minute, 105 beats per minute, 110 beats per minute, etc.

Some examples may implement more than one threshold heart rate. For example, some implementations may apply one threshold heart rate if the person appears to be stationary (e.g., according to inertial sensor data received from an inertial sensor system) and another threshold heart rate if the person appears to be performing an activity, such as walking. For example, if the person's average resting heart rate is 70 beats per minute and the person appears to be stationary, the threshold heart rate may be set to a level that is above 70 beats per minute, such as 80 beats per minute, 85 beats per minute, 90 beats per minute, etc.

Accordingly, method 300 may involve determining a heart rate and determining whether the heart rate equals or exceeds a threshold heart rate. In some examples, the threshold heart rate may depend on the context, such as on whether or not the person is stationary. According to some examples, the determination of whether to enable one or more emergency response functions of the apparatus may be based, at least in part, on whether the heart rate equals or exceeds a threshold heart rate. For example, if the time threshold determination of block 309 indicates that a length of time during which the digit force exceeds a threshold digit force or during which the digit pressure exceeds a threshold digit pressure is greater than or equal to a threshold length of time and the heart rate equals or exceeds a threshold heart rate, in some implementations the control system may determine that one or more emergency response functions of the apparatus will be enabled.

However, according to some examples, if the control system determines that the heart rate does not equal or exceed the threshold heart rate, some implementations of method 300 may involve controlling, by the control system, the apparatus to provide a prompt indicating that at least one of the one or more emergency response functions will nonetheless be enabled if first specified user actions are taken. The prompt may be, or may include, an audio prompt and/or a visual prompt. In some examples, providing the prompt may involve presenting a graphical user interface (GUI) on a display device of the apparatus. Some examples are disclosed herein and described below. According to some examples, the first specified user actions may be, or may include, additional instances of digit force or additional instances of digit pressure (e.g., at or above a threshold digit force or a threshold digit pressure) to be applied in the fingerprint sensor system area.

According to some implementations, the control system may be configured to estimate a person's anxiety level according to one or more metrics apart from heart rate. In some such examples, estimating the anxiety level may involves detecting a presence of digit perspiration or an absence of digit perspiration, e.g., according to the presence or absence of digit perspiration on the digit, according to the presence or absence of moisture, oil or other residue on between the digit and an outer surface of the apparatus, etc. According to some examples, if the control system determines that the heart rate equals or exceeds the threshold heart rate, method 300 also may involve estimating, by the control system and according to the fingerprint sensor data, the anxiety level.

In some examples, if the control system has determined that the heart rate equals or exceeds the threshold heart rate and the control system detects an anxiety metric (e.g., the presence of digit perspiration), method 300 may involve enabling, by the control system, the one or more emergency response functions. In some examples, method 300 may involve determining user location data prior to enabling the one or more emergency response functions and providing the user location data with at least one emergency response communication. For example, if the emergency response function(s) include initiating a text message to a designated emergency communication recipient, the text message may include the user location data.

According to some examples, if the control system has determined that the heart rate equals or exceeds the threshold heart rate and the control system does not detects an anxiety metric, method 300 may involve controlling, by the control system, the apparatus to provide a prompt indicating that at least one of the one or more emergency response functions will be enabled if second specified user actions are taken. The prompt may be, or may include, an audio prompt and/or a visual prompt. In some examples, the second specified user actions may be, or may include, additional instances of digit force or additional instances of digit pressure (e.g., at or above a threshold digit force or a threshold digit pressure) to be applied in the fingerprint sensor system area.

Figure 4:
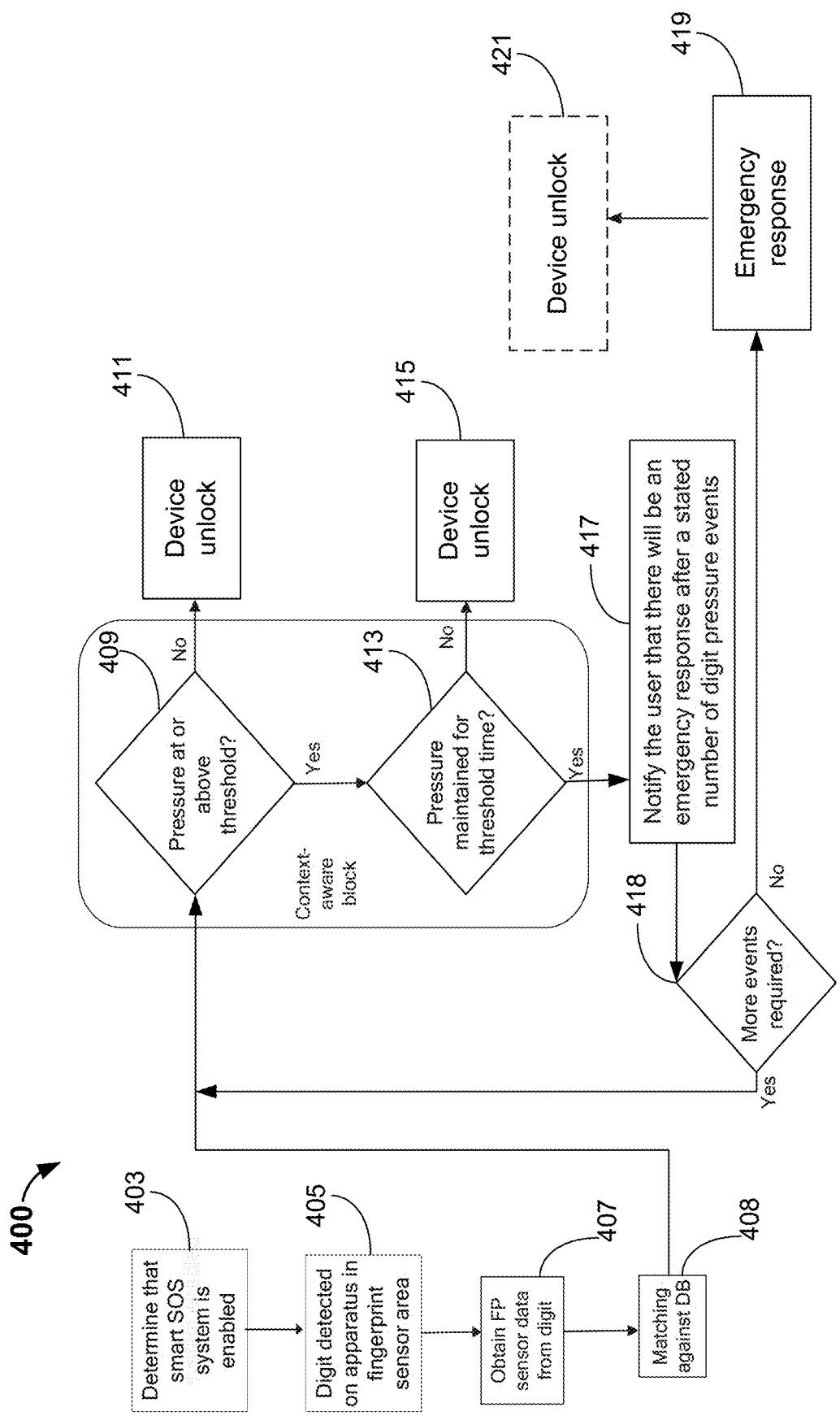
FIG. 4 is a flow diagram that provides example blocks of some methods disclosed herein.

FIG. 4 is a flow diagram that provides example blocks of some methods disclosed herein. The blocks of FIG. 4 may, for example, be performed by the apparatus 101 of FIG. 1A, FIG. 1B or FIG. 2, or by a similar apparatus. As with other methods disclosed herein, the method 400 outlined in FIG. 4 may include more or fewer blocks than indicated. Moreover, the blocks of methods disclosed herein are not necessarily performed in the order indicated. For example, in some instances block 407 of FIG. 4 may be performed prior to block 405. In some examples, some blocks of methods disclosed herein may be performed concurrently.

According to this example, block 403 involves determining whether what may sometimes be referred to herein as a "smart SOS system" is enabled on an apparatus, such as a mobile device that is performing the method 400. The smart SOS system may implement some or all aspects of the disclosed methods of determining whether to enable one or more emergency response functions, enabling such emergency response functions, etc. As noted above, although stealth actions may not always correspond with a risk of harm to a person or property, as used herein stealth actions are considered to be a subset of possible emergency response functions. Accordingly, in some examples the smart SOS system may implement one or more stealth actions. In this example, block 403 involves confirming that the smart SOS system is enabled on the apparatus. In some examples, if it is determined in block 403 that the smart SOS system is not enabled, the process may still proceed to block 405 and may include blocks 407, 408 and 411. However, if it is determined in block 403 that the smart SOS system is not enabled, the method may not include blocks 409, 413, 417 or 419.

In this example, block 405 involves detecting, by the control system, a presence of a digit on an outer surface of the apparatus in a fingerprint sensor system area. In some examples, the apparatus may include a touch sensor system and block 405 may involve receiving input from the touch sensor system indicating whether a target object is on an outer surface of the apparatus in an active area of a fingerprint sensor system. In some examples, block 405 may involve receiving input from the touch sensor system and/or a fingerprint sensor system indicating whether a target object on the outer surface of the apparatus in an active area of a fingerprint sensor system has one or more characteristics of a digit, such as a digit shape, fingerprint features, etc. In some examples, block 405 may involve receiving input from the fingerprint sensor system indicating whether a target object on the outer surface of the apparatus in an active area of a fingerprint sensor system has one or more sub-epidermal features such as papillary layer features, reticular layer features, subcutis features, blood vessel features, lymph vessel features, fat lobule features, muscle tissue features, bone features, etc.

According to this example, block 407 involves receiving, by a control system, fingerprint sensor data from the fingerprint sensor system. In some instances, receiving the fingerprint sensor data may involve receiving ultrasonic fingerprint sensor data. In some examples, the fingerprint sensor data may correspond to signals received from an array of sensor pixels an ultrasonic fingerprint sensor system, such as the array of sensor pixels 206 of FIG. 2. Alternatively, or additionally, the fingerprint sensor data may correspond to signals received from an electrode layer an ultrasonic fingerprint sensor system, such as the electrode layer 210 of FIG. 2. However, the fingerprint sensor system may or may not be (or include) an ultrasonic fingerprint sensor system, depending on the particular implementation.

In this example, block 408 is an authentication process that is based, at least in part, on the fingerprint sensor data obtained in block 407. According to this example, block 408 involves determining whether fingerprint features and/or sub-epidermal features derived from the fingerprint sensor data obtained in block 407 match previously-obtained fingerprint features and/or sub-epidermal features stored in a database (DB). The fingerprint features and/or sub-epidermal features in the database may, for example, have been obtained during an enrollment process. In this example, if it is determined in block 408 that there is a match, method 400 proceeds to block 409. In some examples, if it is determined in block 408 that there is not a match, method 400 may involve providing a prompt that there was no match (e.g., an audio prompt, a visual prompt and/or a haptic response). In some instances, if it is determined in block 408 that there is not a match, a user may be prompted to present the digit again, to present another enrolled digit, to clean the surface of the apparatus in the fingerprint sensor area, etc. In some examples, block 408 may involve other disclosed authentication methods.

According to this example, block 409 involves determining a current digit pressure on an outer surface of the apparatus in an active fingerprint sensor area and determining whether the current digit pressure is at or above a threshold digit pressure. Block 409 may, for example, be performed as described above with reference to block 307 of FIG. 3 and/or as described above in the digit pressure threshold description of block 309. In this example, if it is determined in block 409 that the current digit pressure does not equal or exceed a threshold digit pressure, the process continues to block 411 and the apparatus is unlocked. The apparatus is unlocked because, in this example, the authentication process of block 408 completed successfully.

In this example, if it is determined in block 409 that the current digit pressure equals or exceeds the threshold digit pressure, the process continues to block 413. According to this example, block 413 involves determining whether the threshold digit pressure is maintained for at least a threshold time interval. In some implementations, block 413 may involve a time threshold determination such as that described above with reference to block 309 of FIG. 3.

In some implementations, the threshold digit pressure and/or the threshold time interval may be user-selectable, e.g., as described below with reference to FIGS. 9 and 10. In this example, if it is determined in block 413 that the threshold digit pressure is not maintained for at least the threshold time interval, the process continues to block 415 and the apparatus is unlocked.

However, if it is determined in block 413 that the threshold digit pressure is maintained for at least the threshold time interval, the process continues to block 417. In this example, block 417 involves providing, via the apparatus, a notification that there will be an emergency response after a stated number of digit pressure events. In this context, a digit pressure event refers to an instance of threshold digit pressure being maintained for at least the threshold time interval. In some examples, block 417 may involve an audio prompt and/or a visual prompt. In some examples, the notification of block 417 may be omitted if no additional digit pressure events would be required to trigger the emergency response.

In some implementations, the number of digit pressure events required to trigger the emergency response function(s) may be user-selectable, e.g., as described below with reference to FIG. 9. As noted above and as described below with reference to FIG. 12, in some implementations, the number of digit pressure events required to trigger the emergency response function(s) may depend on a user's current heart rate (e.g., as estimated by the control system based on received ultrasonic sensor data) and/or other indications of the user's anxiety level, such as the presence or absence of perspiration.

Figure 7:
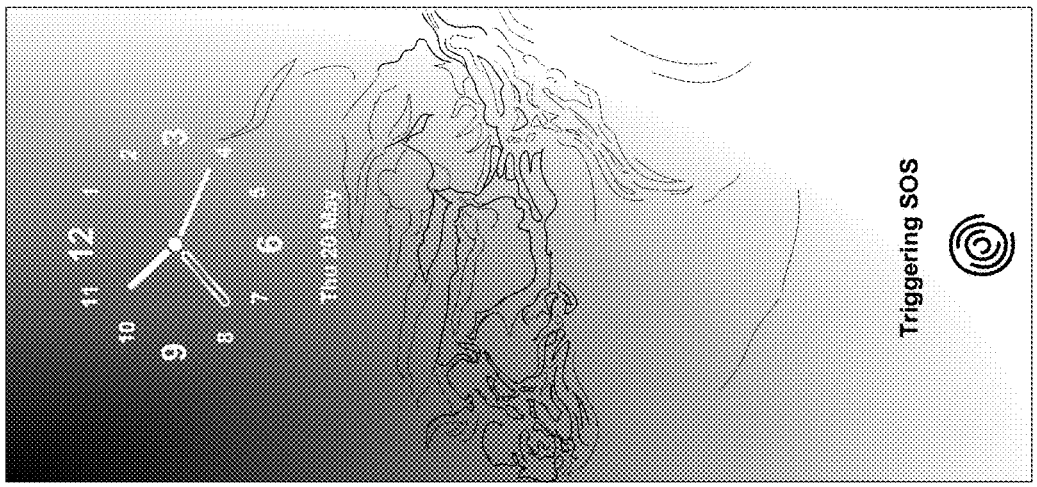
FIGS. 5, 6 and 7 show examples of visual prompts that may be displayed in the context of the method of FIG. 4 in some implementations.
Figure 6:
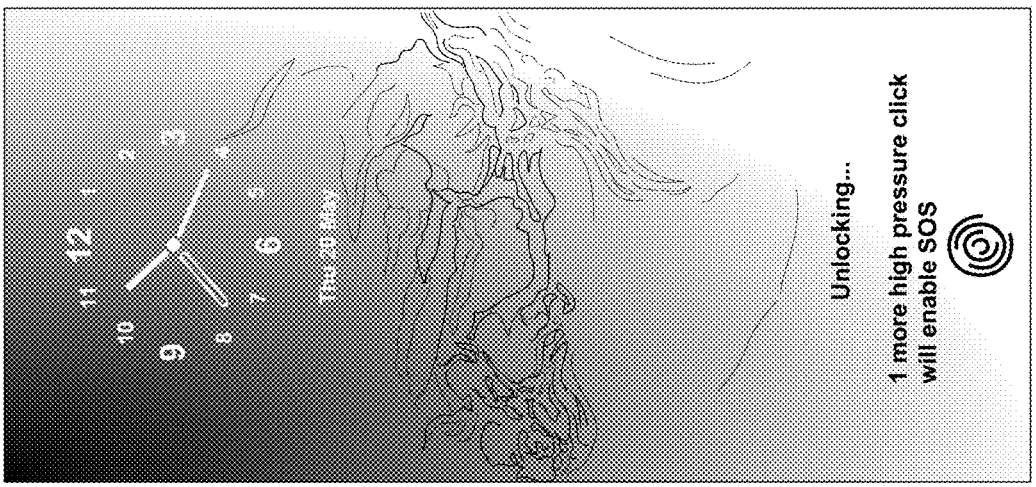
Figure 5:
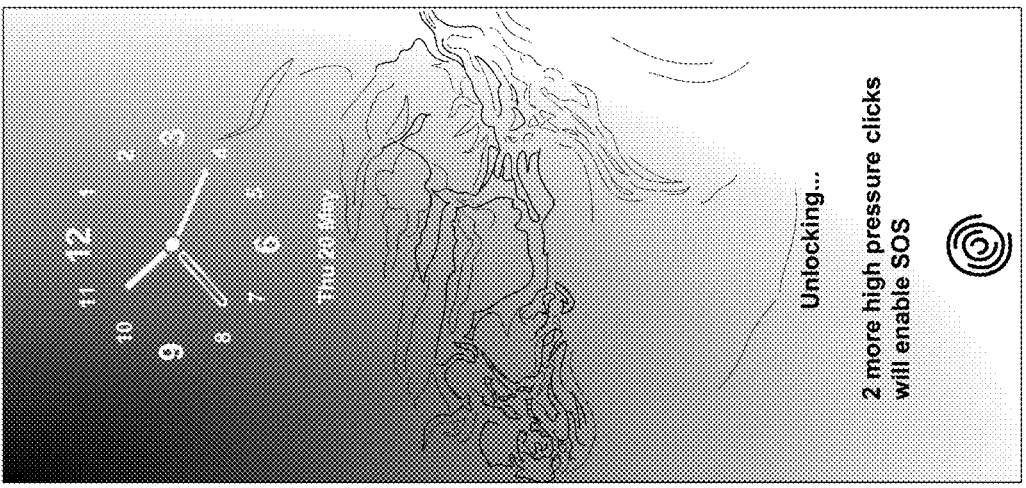

FIGS. 5, 6 and 7 show examples of visual prompts that may be displayed in the context of the method of FIG. 4 in some implementations. More specifically, FIGS. 5, 6 and 7 show examples of graphical user interfaces (GUIs) that may be displayed in some implementations of block 417.

In the example shown in FIG. 5, a control system is controlling a display of a mobile device to display the GUI 500, which indicates that the mobile device is being unlocked and also indicates that two more high-pressure clicks (digit pressure events) will enable one or more emergency response functions of the apparatus. In FIG. 6, a control system is controlling a display of a mobile device to display the GUI 600, which indicates that the mobile device is being unlocked and also indicates that one more high-pressure click (digit pressure event) will enable one or more emergency response functions of the apparatus. In FIG. 5, a control system is controlling a display of a mobile device to display the GUI 700, which indicates that the mobile device is enabling one or more emergency response functions of the apparatus (implicitly indicating that no more digit pressure events will be required to trigger the emergency response function(s)).

Referring again to FIG. 4, in block 418 it is determined whether additional digit pressure events will be required before an emergency response function of the apparatus is triggered. For example, if block 417 involved a notification that there will be an emergency response after three more digit pressure events, two more digit pressure events or one more digit pressure event, it would be determined in block 418 that more events would be required before an emergency response function of the apparatus is triggered. Therefore, the process would revert to block 409 in this example.

However, if block 417 involved a notification that no more digit pressure events would be required to trigger the emergency response (e.g., "an emergency response will now be triggered"), in this example it would be determined in block 418 that no more events would be required and the process would continue to block 419, in which an emergency response function of the apparatus is triggered. Block 419 may involve providing any one or more of the disclosed emergency response functions.

In optional block 421, the apparatus may be unlocked. This may or may not be a desirable feature, depending on the context. For example, if the apparatus is unlocked and subsequently is stolen, the thief would have access to an unlocked device. On the other hand, it may be advantageous for the user to have access to device functionality other than what may be enabled as part of the emergency response. Moreover, if the emergency response is not in the context of possible personal injury or property theft (e.g., if the user merely wishes to perform one or more stealth functions), it may be advantageous for a user to have access to some device functionality other than what may be enabled as part of the emergency response. Accordingly, in some examples a user may select whether to have the apparatus unlocked if one or more emergency response functions are triggered, e.g., as described below with reference to FIG. 9.

Figure 10:
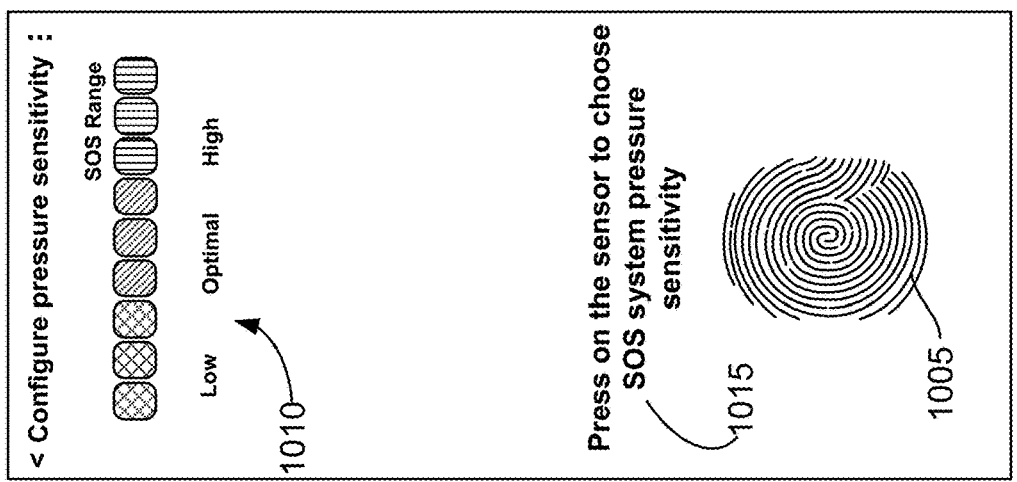
FIGS. 8, 9 and 10 show examples of GUIs that may be presented according to some implementations.
Figure 9:
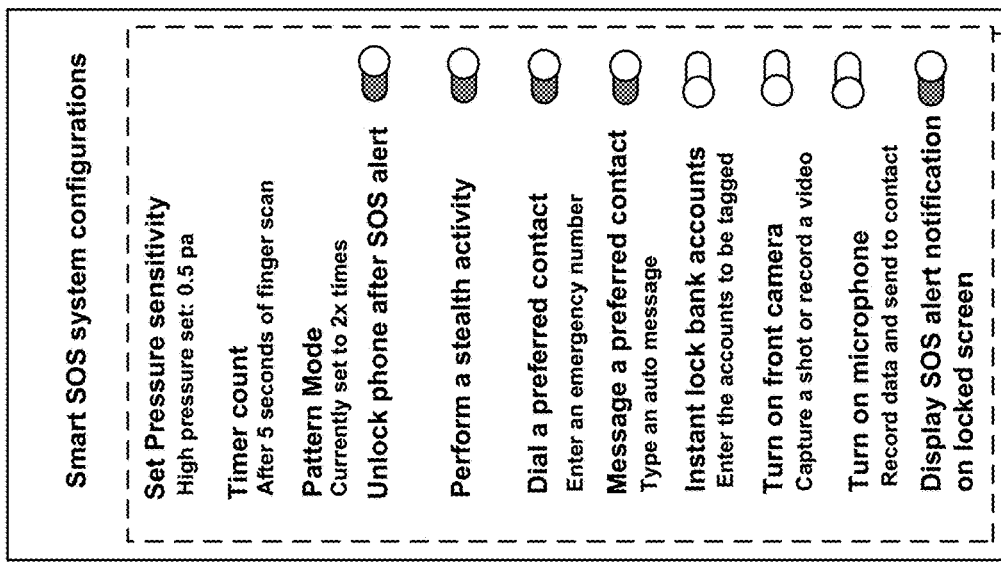
Figure 8:
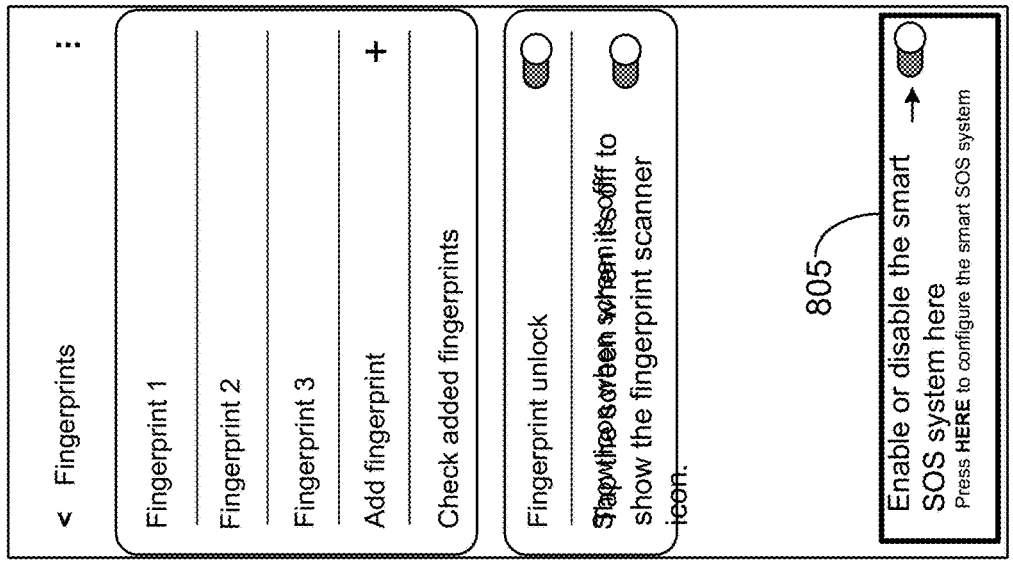

FIGS. 8, 9 and 10 show examples of GUIs that may be presented according to some implementations. In these examples, FIGS. 8, 9 and 10 show examples of GUIs for enabling and configuring a smart SOS system that may implement some or all aspects of the disclosed methods of determining whether to enable one or more emergency response functions, enabling such emergency response functions, etc. As noted above, some aspects of the smart SOS system may correspond to stealth activities that may or may not correspond to situations in which a person or property is in danger, depending on the particular implementation and/or circumstances. As with other disclosed examples, the types, numbers and arrangements of elements in FIGS. 8, 9 and 10 are merely made by way of illustration. Other examples may include different types, numbers and/or arrangements of elements.

FIG. 8 shows an example of a GUI 800 for enabling or disabling a smart SOS system. In this example, the GUI 800 is an example of a GUI for configuring features of a fingerprint sensor, which may or may not be an ultrasonic fingerprint sensor. According to this example, the GUI 800 may be presented in response to a user's interaction with a main device settings GUI, or in response to a user's interaction with a lower-level GUI that may be reached, directly or indirectly, from a main device settings GUI. In other examples, a GUI for enabling or disabling a smart SOS system may not be presented in the context of a GUI for configuring other features of a fingerprint sensor, but may be presented as a separate GUI.

In the example shown in FIG. 8, a user may interact with the GUI portion 805 in order to toggle the smart SOS system on or off. In this example, the GUI portion 805 includes a brief textual explanation of the smart SOS system and notes that a user may interact with the GUI portion 805 in order to configure the smart SOS system.

FIG. 9 shows an example of a GUI that may be presented in response to a user's enabling of the smart SOS system and indicating a desire to configure the smart SOS system via interaction with the GUI portion 805. According to this example, the GUI 900 presents various categories of smart SOS system configurations. In this example, the smart SOS system configurations include pressure sensitivity configurations (for setting a threshold digit pressure for a digit pressure event), timer count configurations (for setting a threshold length of time of threshold digit pressure for a digit pressure event) and pattern mode configurations (for setting, e.g., the number of digit pressure events required for initiating the emergency response function(s)).

In this example, the GUI 900 also includes fields for allowing a user to choose whether to unlock the apparatus after enabling one or more emergency response functions and whether to enable one or more stealth activities. According to this example, the GUI 900 includes fields for allowing a user to choose whether the emergency response function(s) will involve sending a text message or initiating a telephone call to an emergency recipient, whether the emergency response function(s) will involve locking an account with a financial institution, whether the emergency response function(s) will involve turning on a camera (which is a front camera in this example but may be, or may include, one or more other cameras in other examples), whether the emergency response function(s) will involve turning on a microphone, and whether the emergency response function(s) will involve displaying a notification on a locked screen. According to the example shown in FIG. 9, a user may interact with (e.g., touch) any of the fields indicated within the GUI portion 905 in order to cause one or more related GUIs to be presented on the apparatus, with which the user may interact in order to customize the smart SOS system.

In this example, the GUI 1000 of FIG. 10 is presented in response to a user's touch on the "Set pressure sensitivity" area of the GUI portion 905. In this example, a user may interact with the GUI 1000 to set the threshold digit pressure for a digit pressure event. According to this example, the GUI 1000 includes a fingerprint sensor area icon 1005, indicating an active area (or at least a portion of the active area) of a fingerprint sensor system, a pressure meter 1010 and a textual prompt 1015. Here, the textual prompt 1015 encourages the user to press on the fingerprint sensor area icon 1005 in order to set a threshold digit pressure for a digit pressure event that could potentially trigger the emergency response function(s). Responsive to pressure on the active area of the fingerprint sensor system, the pressure meter 1010 will indicate the pressure currently being applied by a digit pressing on the fingerprint sensor area icon 1005. According to this example, the pressure meter 1010 indicates a suggested range of digit pressures suitable for a digit pressure event that could potentially trigger the emergency response function(s).

Figure 11:
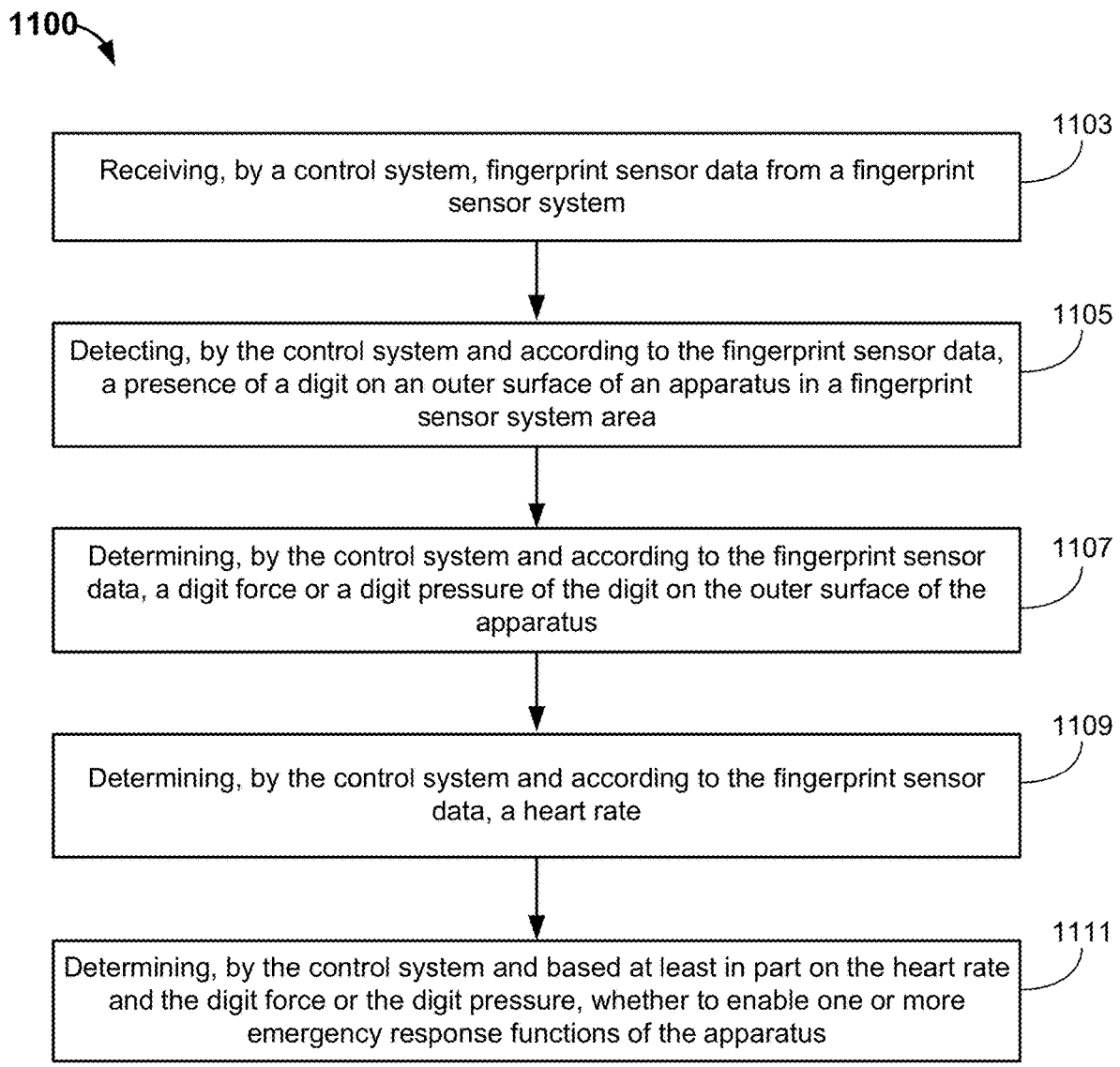
FIG. 11 is a flow diagram that provides example blocks of some methods disclosed herein.

FIG. 11 is a flow diagram that provides example blocks of some methods disclosed herein. The blocks of FIG. 11 may, for example, be performed by the apparatus 101 of FIG. 1A, FIG. 1B or FIG. 2, or by a similar apparatus. As with other methods disclosed herein, the method 1100 outlined in FIG. 11 may include more or fewer blocks than indicated. Moreover, the blocks of methods disclosed herein are not necessarily performed in the order indicated. For example, in some instances block 1105 of FIG. 11 may be performed prior to block 1103. In some examples, some blocks of methods disclosed herein may be performed concurrently.

According to this example, block 1103 involves receiving, by a control system, fingerprint sensor data from the fingerprint sensor system. In some instances, receiving the fingerprint sensor data may involve receiving ultrasonic fingerprint sensor data. In some examples, the fingerprint sensor data may correspond to signals received from an array of sensor pixels an ultrasonic fingerprint sensor system, such as the array of sensor pixels 206 of FIG. 2. Alternatively, or additionally, the fingerprint sensor data may correspond to signals received from an electrode layer an ultrasonic fingerprint sensor system, such as the electrode layer 210 of FIG. 2. However, the fingerprint sensor system may or may not be (or include) an ultrasonic fingerprint sensor system, depending on the particular implementation.

In this example, block 1105 involves detecting, by the control system and according to the fingerprint sensor data, a presence of a digit on an outer surface of the apparatus in a fingerprint sensor system area. In some examples, the apparatus may include a touch sensor system and block 1105 may involve receiving input from the touch sensor system indicating whether a target object is on an outer surface of the apparatus in an active area of a fingerprint sensor system. In some examples, block 1105 may involve receiving input from the touch sensor system and/or the fingerprint sensor system indicating whether a target object on the outer surface of the apparatus in an active area of a fingerprint sensor system has one or more characteristics of a digit, such as a digit shape, fingerprint features, etc. In some examples, block 1105 may involve receiving input from the fingerprint sensor system indicating whether a target object on the outer surface of the apparatus in an active area of a fingerprint sensor system has one or more sub-epidermal features such as papillary layer features, reticular layer features, subcutis features, blood vessel features, lymph vessel features, fat lobule features, muscle tissue features, bone features, etc.

According to this example, block 1107 involves determining, by the control system and according to the fingerprint sensor data, a digit force or a digit pressure of the digit on the outer surface of the apparatus. According to some such examples, the fingerprint sensor data may be, or may include, ultrasonic fingerprint sensor data. In some such examples, the ultrasonic fingerprint sensor data may be received via an electrode layer proximate a piezoelectric layer of an ultrasonic fingerprint sensor system. Alternatively, or additionally, in some examples the ultrasonic fingerprint sensor data may be received via an array of ultrasonic sensor pixels. Some detailed examples for estimating digit force or digit pressure according to fingerprint sensor data are disclosed herein. However, in some alternative implementations block 1107 may involve determining a digit force or a digit pressure according to force sensor data from a force sensor (such as the optional force sensor 110 of FIG. 1A or FIG. 1B) that may be separate from the fingerprint sensor system 102.

In this example, block 1109 involves determining, by the control system and based at least in part on the received fingerprint sensor data, a heart rate. In some alternative examples, method 1100 may involve determining a heart rate according to input from another device, such as a smart watch, a fitness tracking device, etc. In some examples, method 1100 may involve determining whether the heart rate equals or exceeds a threshold heart rate. The threshold heart rate may, for example, be based at least in part on one or more previously-observed heart rates for the person, such as a previously-observed resting heart rate, a previously-observed heart rate while the person is performing a task such as walking, etc.

According to this example, block 1111 involves determining, by the control system and based at least in part on the heart rate and the digit force or the digit pressure, whether to enable one or more emergency response functions of the apparatus. The one or more emergency response functions may differ according to the particular implementation. In some examples, the one or more emergency response functions may be user-selectable. According to some examples, the one or more emergency response functions may include initiating a telephone call to an emergency response telephone number, initiating a text message and/or a telephone call to a designated emergency communication recipient, etc. In some examples, the one or more emergency response functions may include one or more of initiating an audio recording session, initiating a video recording session, taking one or more photographs or causing one or more financial institution accounts to be locked.

If the control system determines that the heart rate does not equal or exceed a threshold heart rate, some implementations of method 1100 may involve controlling, by the control system, the apparatus to provide a prompt indicating that at least one of the one or more emergency response functions will be enabled if first specified user actions are taken. The prompt may be, or may include, an audio prompt and/or a visual prompt. In some examples, providing the prompt may involve presenting a graphical user interface (GUI) on a display device of the apparatus. Some examples are disclosed herein. According to some examples, the first specified user actions may be, or may include, additional instances of digit force or additional instances of digit pressure (e.g., at or above a threshold digit force or a threshold digit pressure) to be applied in the fingerprint sensor system area.

According to some implementations, method 1100 may involve making, by the control system, a time threshold determination that involves determining whether a length of time during which the digit force exceeds a threshold digit force or during which the digit pressure exceeds a threshold digit pressure is greater than or equal to a threshold length of time. The threshold digit force and/or the threshold digit pressure may vary according to the particular implementation. In some instances, the threshold digit force and/or the threshold digit pressure may be determined according to a range of digit forces and/or the digit pressures that were determined and stored during an enrollment process. For example, if a user's normal digit force range during an enrollment process was between 50 gram-force and 100 gram-force, the threshold digit force may be set to 100 gram-force, 110 gram-force, 120 gram-force, 130 gram-force, etc. According to some examples, the threshold digit force may be based on an average digit force during an enrollment process and/or the threshold digit pressure may be based on an average digit pressure during an enrollment process. In some such examples, the threshold digit force may be 110%, 115%, 120%, 125%, 130%, 135%, 140%, 145%, 150%, etc., of the average digit force during the enrollment process. In some implementations, the threshold digit force and/or the threshold digit pressure may be user-selectable.

The threshold length of time may also vary according to the particular implementation. In some instances, the threshold length of time may be one second or less, e.g., 400 milliseconds (ms), 500 ms, 600 ms, 700 ms, 800 ms, 900 ms, 1 second, etc. However, in some examples the threshold length of time may be more than one second. One may observe that examples having a longer threshold length of time may be more effective at avoiding false positives (e.g., instances of unintentional hard presses on the active area of the fingerprint sensor), whereas examples having a shorter threshold length of time may be more effective in providing a prompt emergency response during an emergency.

In some examples, method 1100 may involve determining whether a threshold number of instances (e.g., 1 instance, 2 instances, 3 instances, etc.) of threshold digit force and/or threshold digit pressure during a threshold length of time has occurred. The threshold number of instances may, in some implementations, be user-selectable.

In some implementations, method 1100 may involve identifying a particular digit. For example, method 1100 may involve determining which of the user's previously-enrolled digits were detected in block 1105 and which particular digit is applying the force and/or pressure that is determined in block 1107. As noted elsewhere herein, some disclosed implementations involve determining a characteristic digit force range and/or digit pressure range for a user. In some such examples, the digit force range and/or digit pressure range may vary from digit to digit. For example, a user may tend to press down harder with the user's right thumb than with the user's right pinky finger. The threshold digit force and/or the threshold digit pressure may, in some implementations, vary from digit to digit.

In some implementations, method 1100 may involve determining, by the control system, whether the identified digit is a digit that is most often used for an authentication process. For example, a user may normally use the left thumb for an authentication process.

According to some implementations, method 1100 may involve determining, by the control system, whether the identified digit is a digit that has been selected for triggering the one or more emergency response functions. For example, the user may deliberately select a digit that is different from the digit that is most often used for an authentication process to trigger the one or more emergency response functions. For instance, if a user normally uses the right thumb for an authentication process, the user (or the apparatus 101) may select a different digit (e.g., the right index finger) for triggering the one or more emergency response functions. According to some such examples, determining whether to enable one or more emergency response functions (in block 1111) may be based, at least in part, on whether the digit has been selected for triggering the one or more emergency response functions.

In some implementations, method 1100 may involve performing, by the control system, an authentication process that is based, at least in part, on the fingerprint sensor data. In some such examples, the authentication process may be based, at least in part, on fingerprint features determined by the control system based on the fingerprint sensor data. The fingerprint features may, for example, include fingerprint ridge endings, fingerprint ridge bifurcations, short ridges and/or islands, and the locations of such fingerprint features. The authentication process may involve comparing currently-obtained fingerprint features with previously-obtained fingerprint features, e.g., fingerprint features obtained during an enrollment process. In some examples, the authentication process may be based, at least in part, on sub-epidermal features determined by the control system based on the fingerprint sensor data. The sub-epidermal features may, for example, include papillary layer features, reticular layer features, subcutis features, blood vessel features, lymph vessel features, fat lobule features, muscle tissue features and/or bone features. The authentication process may involve comparing currently-obtained sub-epidermal features with previously-obtained sub-epidermal features, e.g., sub-epidermal features obtained during an enrollment process.

According to some examples, method 1100 may include one or more aspects that are described above with reference to FIG. 3 and/or aspects that are disclosed elsewhere herein, (e.g., details that are described below with reference to FIG. 12), even though such details are not presented in the description of FIG. 11.

Figure 12:
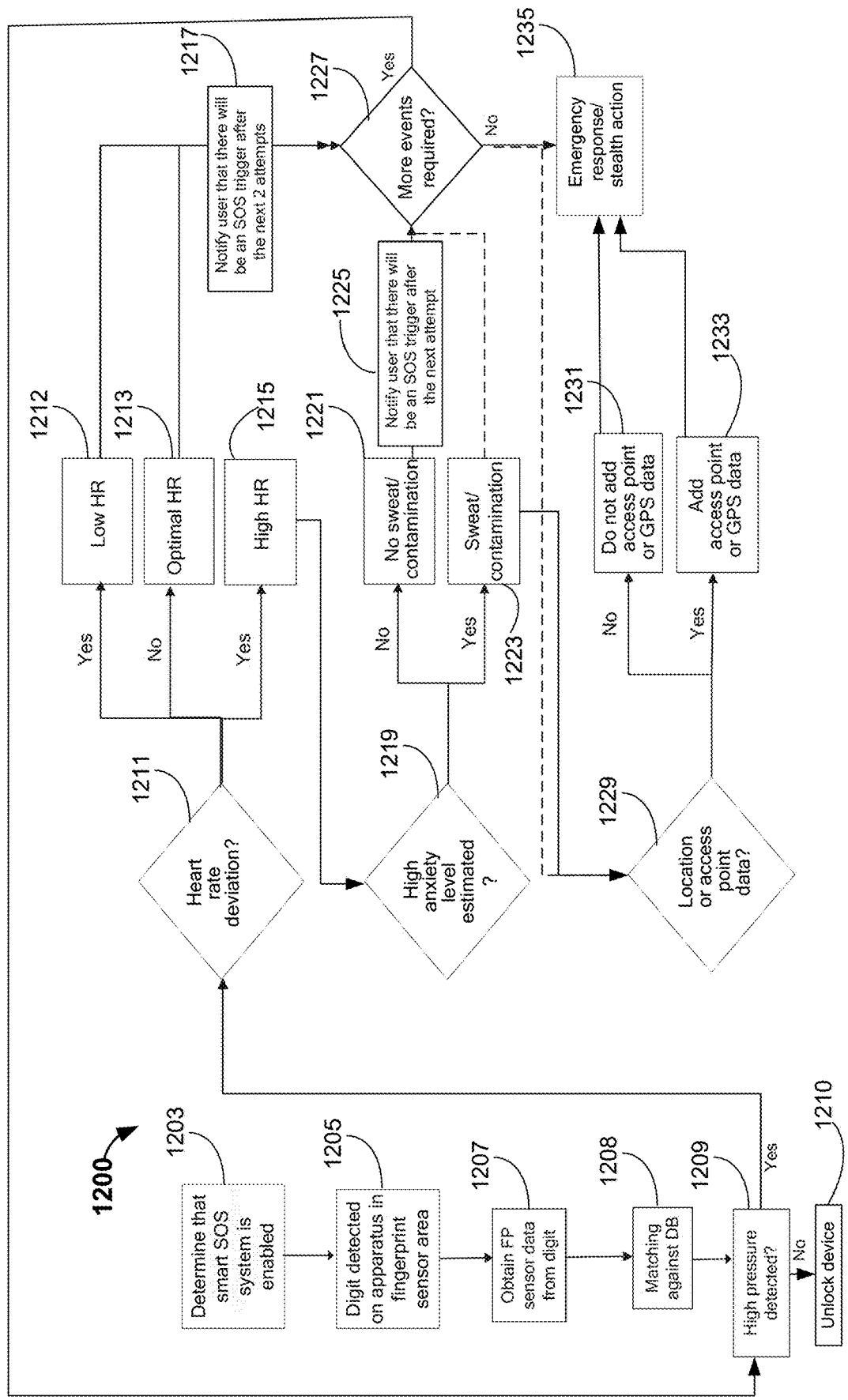
FIG. 12 is a flow diagram that provides example blocks of some methods disclosed herein.

FIG. 12 is a flow diagram that provides example blocks of some methods disclosed herein. The blocks of FIG. 12 may, for example, be performed by the apparatus 101 of FIG. 1A, FIG. 1B or FIG. 2, or by a similar apparatus. As with other methods disclosed herein, the method 1200 outlined in FIG. 12 may include more or fewer blocks than indicated. Moreover, the blocks of methods disclosed herein are not necessarily performed in the order indicated. For example, in some instances block 1207 of FIG. 12 may be performed prior to block 1205. In some examples, some blocks of methods disclosed herein may be performed concurrently.

According to this example, block 1203 involves determining whether what may sometimes be referred to herein as a "smart SOS system" is enabled on an apparatus, such as a mobile device that is performing the method 1200. The smart SOS system may implement some or all aspects of the disclosed methods of determining whether to enable one or more emergency response functions, enabling such emergency response functions, etc. As noted above, although stealth actions may not always correspond with a risk of harm to a person or property, as used herein stealth actions are considered to be a subset of possible emergency response functions. Accordingly, in some examples the smart SOS system may implement one or more stealth actions. In this example, block 1203 involves confirming that the smart SOS system is enabled on the apparatus. In some examples, if it is determined in block 1203 that the smart SOS system is not enabled, the process may still proceed to block 1205 and may include blocks 1207, 1208 and 1210 (e.g., block 1209 may be omitted). However, if it is determined in block 1203 that the smart SOS system is not enabled, the method may not include blocks 1209-1235.

In this example, block 1205 involves detecting, by the control system, a presence of a digit on an outer surface of the apparatus in a fingerprint sensor system area. In some examples, the apparatus may include a touch sensor system and block 1205 may involve receiving input from the touch sensor system indicating whether a target object is on an outer surface of the apparatus in an active area of a fingerprint sensor system. In some examples, block 1205 may involve receiving input from the touch sensor system and/or a fingerprint sensor system indicating whether a target object on the outer surface of the apparatus in an active area of a fingerprint sensor system has one or more characteristics of a digit, such as a digit shape, fingerprint features, etc. In some examples, block 1205 may involve receiving input from the fingerprint sensor system indicating whether a target object on the outer surface of the apparatus in an active area of a fingerprint sensor system has one or more sub-epidermal features such as papillary layer features, reticular layer features, subcutis features, blood vessel features, lymph vessel features, fat lobule features, muscle tissue features, bone features, etc.

According to this example, block 1207 involves receiving, by a control system, fingerprint sensor data from the fingerprint sensor system. In some instances, receiving the fingerprint sensor data may involve receiving ultrasonic fingerprint sensor data. In some examples, the fingerprint sensor data may correspond to signals received from an array of sensor pixels an ultrasonic fingerprint sensor system, such as the array of sensor pixels 206 of FIG. 2. Alternatively, or additionally, the fingerprint sensor data may correspond to signals received from an electrode layer an ultrasonic fingerprint sensor system, such as the electrode layer 210 of FIG. 2. However, the fingerprint sensor system may or may not be (or include) an ultrasonic fingerprint sensor system, depending on the particular implementation.

In this example, block 1208 is an authentication process that is based, at least in part, on the fingerprint sensor data obtained in block 1207. According to this example, block 1208 involves determining whether fingerprint features and/or sub-epidermal features derived from the fingerprint sensor data obtained in block 1207 match previously-obtained fingerprint features and/or sub-epidermal features stored in a database (DB). The fingerprint features and/or sub-epidermal features in the database may, for example, have been obtained during an enrollment process. In this example, if it is determined in block 1208 that there is a match, method 1200 proceeds to block 1209. In some examples, if it is determined in block 1208 that there is not a match, method 1200 may involve providing a prompt that there was no match (e.g., an audio prompt, a visual prompt and/or a haptic response). In some instance, a user may be prompted to present the digit again, to present another enrolled digit, to clean the surface of the apparatus in the fingerprint sensor area, etc. In some examples, block 1208 may involve other disclosed authentication methods.

According to this example, block 1209 involves determining a current digit pressure on an outer surface of the apparatus in an active fingerprint sensor area and determining whether the current digit pressure is at or above a threshold digit pressure. Block 1209 may, for example, be performed as described above with reference to block 307 of FIG. 3 and with reference to the digit pressure threshold description of block 309. According to some examples, block 1209 also may involve determining whether the threshold digit pressure is maintained for at least a threshold time interval. In some implementations, block 1209 may involve a time threshold determination like that described above with reference to block 309 of FIG. 3. In some implementations, the threshold digit pressure and/or the threshold time interval may be user-selectable, e.g., as described above with reference to FIGS. 9 and 10.

In this example, if it is determined in block 1209 that the current digit pressure does not equal or exceed a threshold digit pressure, the process continues to block 1210 and the apparatus is unlocked. The apparatus is unlocked because, in this example, the authentication process of block 1208 completed successfully.

In this example, if it is determined in block 1209 that the current digit pressure equals or exceeds the threshold digit pressure (and, in some instances, whether the current digit pressure equals or exceeds the threshold digit pressure for at least a threshold time interval), the process continues to block 1211.

According to this example, block 1211 involves determining a current heart rate and determining whether the current heart rate deviates from a normal heart rate (e.g., an average resting heart rate for the person) by more than a threshold amount. In some such examples, block 1211 may involve determining whether the current heart rate deviates from a normal heart rate by more than a determined percentage, such as 10%, 15%, 20%, 25%, 30%, 35%, etc.

In the example shown in FIG. 12, if it is determined in block 1211 that the current heart rate does not deviate from the normal heart rate by more than a threshold amount, it is determined in block 1213 that the current heart rate is within a normal or optimal range and the process continues to block 1217. In this example, if it is determined in block 1211 that the current heart rate does deviate from the normal heart rate by more than a threshold amount, but that the current heart rate is lower than normal, it is determined in block 1212 that the current heart rate is lower than the normal or optimal range and the process continues to block 1217.

According to this example, block 1217 involves providing a prompt indicating that at least one of the one or more emergency response functions will be enabled if specified user actions are taken. According to this implementation, the specified user actions are, or include additional instances of digit force or additional instances of digit pressure to be applied in the fingerprint sensor system area. In this example, block 1217 involves providing, via the apparatus, an audio or visual notification that there will be an emergency response after a stated number of digit pressure events. In this example, the stated number of digit pressure events is two digit pressure events. According to some examples, block 1217 may involve presenting a GUI, such as the GUI 500 shown in FIG. 5.

According to this example, after block 1217 the process continues to block 1227, wherein it is determined whether additional digit pressure events are required to trigger one or more emergency response functions. In this example, additional digit pressure events are required and therefore the process reverts to block 1209.

In this example, if it is determined in block 1211 that the current heart rate does deviate from the normal heart rate by more than a threshold amount and that the current heart rate is higher than normal, it is determined in block 1215 that the current heart rate is higher than the normal or optimal range and the process continues to block 1219. In some examples, the threshold heart rate for determining a high heart rate condition in block 1215 may be set to a level such that if the person's heart rate is at that level, the person is likely to be afraid and/or in a stressful situation. For example, if the person's average heart rate is 90 beats per minute, the threshold heart rate may be set to a level that is above 90 beats per minute, such as 100 beats per minute, 105 beats per minute, 110 beats per minute, etc.

Some examples may implement more than one threshold heart rate for determining a high heart rate condition. For example, some implementations may apply one threshold heart rate if the person appears to be stationary (e.g., according to inertial sensor data received from an inertial sensor system) and another threshold heart rate if the person appears to be performing an activity, such as walking. For example, if the person's average resting heart rate is 70 beats per minute and the person appears to be stationary, the threshold heart rate for determining a high heart rate condition may be set to a level that is above 70 beats per minute, such as 80 beats per minute, 85 beats per minute, 90 beats per minute, etc. In some examples, the threshold heart rate for determining a high heart rate condition may depend on the context, such as on whether or not the person is stationary.

According to this example, block 1219 involves determining whether there are one or more additional indications of user anxiety, in addition to an unusually high heart rate. In this example, block 1219 involves determining, based at least in part on the fingerprint sensor data, whether there is sweat or other contamination on the digit and/or on a surface of the apparatus with which the digit is in contact. According to some examples, block 1219 may involve determining, based at least in part on the fingerprint sensor data, whether sweat or other contamination on the digit and/or on a surface of the apparatus with which the digit is in contact has first been detected within a time interval, e.g., determining whether sweat or other contamination has first been detected within the last second, within the last half second, etc.

According to this example, if one or more additional indications of user anxiety are not detected in block 1219, the process continues to block 1221 wherein it is determined that no sweat or other contamination has been detected. The process then continues to block 1225. According to this example, block 1225 involves providing a prompt indicating that at least one of the one or more emergency response functions will be enabled if specified user actions are taken. According to this implementation, the specified user actions are, or include additional instances of digit force or additional instances of digit pressure to be applied in the fingerprint sensor system area. In this example, block 1225 involves providing, via the apparatus, an audio or visual notification that there will be an emergency response after a stated number of additional digit pressure events. In this example, the stated number of digit pressure events is one digit pressure event. According to some examples, block 1225 may involve presenting a GUI, such as the GUI 600 shown in FIG. 6.

According to this example, after block 1225 the process continues to block 1227, wherein it is determined whether additional digit pressure events are required to trigger one or more emergency response functions. In this example, additional digit pressure events are required and therefore the process reverts to block 1209.

In this example, if one or more additional indications of user anxiety are detected in block 1219, the process continues to block 1223 and sweat or other contamination is presumed to have been detected. In this example, the process then continues to block 1229. In some alternative examples (e.g., examples in which block 1235 does not involve sending an emergency response communication), the process may continue from block 1223 to block 1235 (as suggested by the dashed line connecting block 1223 to block 1235).

According to this implementation, block 1229 involves determining whether any available location data may be added to an emergency response communication, such as a telephone call to an emergency response telephone number, initiating a text message and/or a telephone call to a designated emergency communication recipient, etc. In this example, block 1229 involves determining whether any global positioning system (GPS) and/or any access point information corresponding to the apparatus is available. (The term "access point" is commonly used to indicate the hub through which wireless devices obtain access to a wireless network and the Internet.) In this example, if it is determined in block 1229 that any global positioning system (GPS) and/or any access point information is available, the process continues to block 1233, wherein such location data is added to an emergency response communication. According to this example, if it is determined in block 1229 that no global positioning system (GPS) and/or any access point information is available, the process continues to block 1231, wherein no such location data is added to an emergency response communication. After block 1231 or block 1233, the process continues to block 1235 wherein one or more emergency response functions of the apparatus are enabled.

Figure 13:
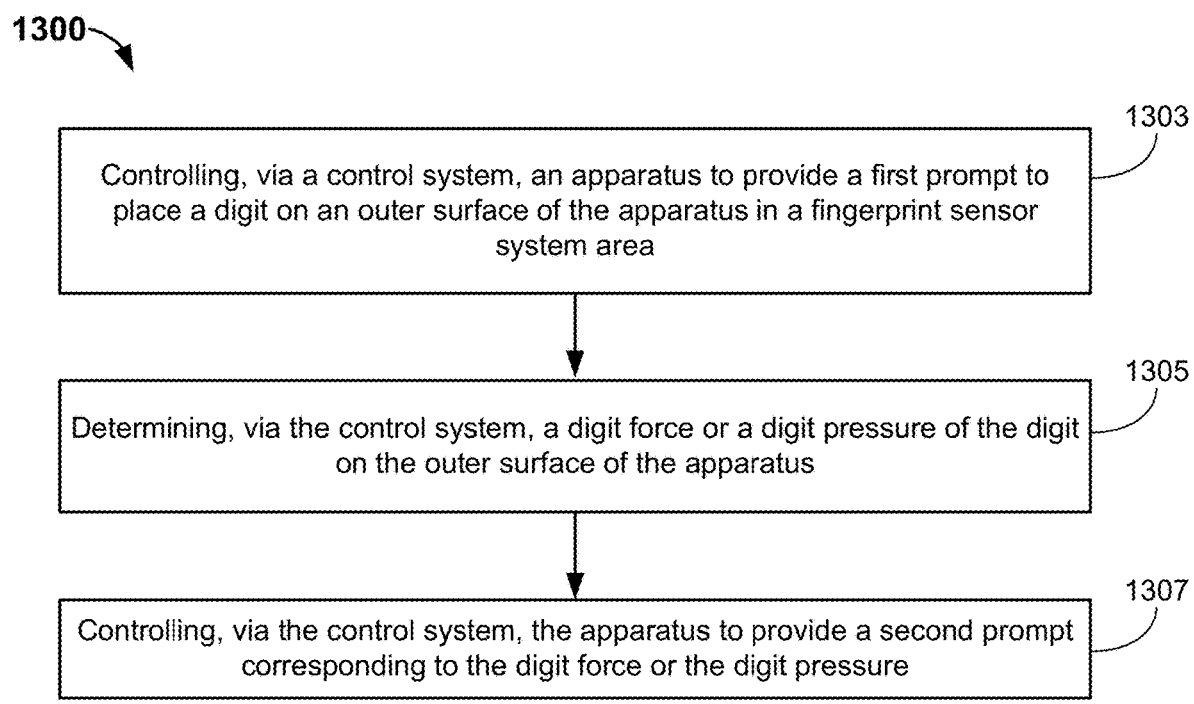
FIG. 13 is a flow diagram that provides example blocks of some methods disclosed herein.

FIG. 13 is a flow diagram that provides example blocks of some methods disclosed herein. The blocks of FIG. 13 may, for example, be performed by the apparatus 101 of FIG. 1A, FIG. 1B or FIG. 2, or by a similar apparatus. As with other methods disclosed herein, the method 1300 outlined in FIG. 13 may include more or fewer blocks than indicated. Moreover, the blocks of methods disclosed herein are not necessarily performed in the order indicated. In some examples, some blocks of methods disclosed herein may be performed concurrently.

According to this example, the method 1300 is a method of controlling an apparatus that includes a fingerprint sensor, which may or may not be an ultrasonic fingerprint sensor depending on the particular implementation. According to this implementation, block 1303 involves controlling, via a control system of the apparatus (such as the control system 106 of the apparatus 101), the apparatus to provide a first prompt to place a digit on an outer surface of the apparatus in a fingerprint sensor system area. In some examples, block 1303 may involve controlling at least a portion of a user interface system (e.g., a loudspeaker system of the apparatus 101) to provide the first prompt. In some instances, block 1303 may involve controlling a display device of the apparatus (which may be an instance of the optional display system 108 of FIG. 1A) to provide the first prompt.

Figure 14A:
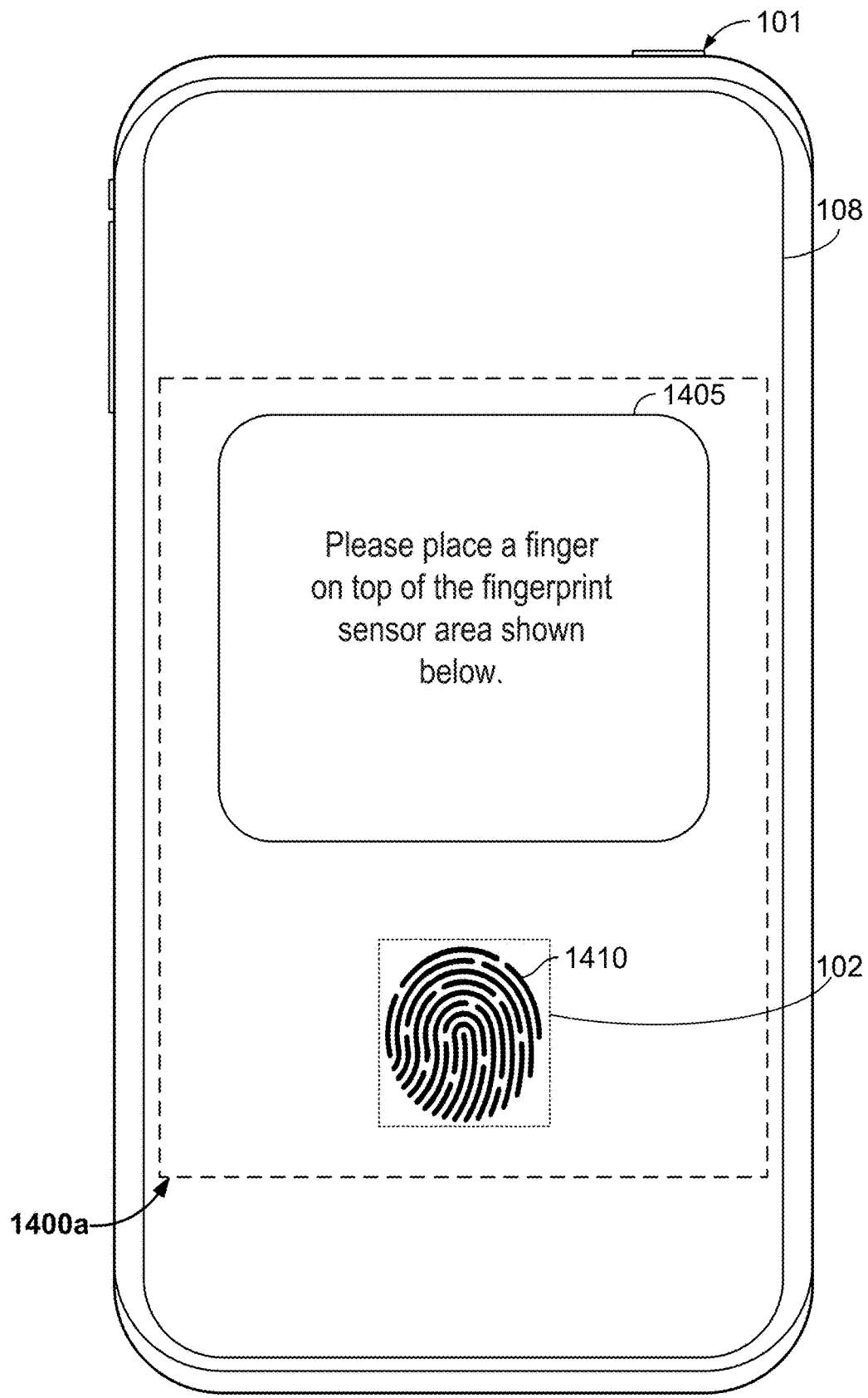
FIGS. 14A, 14B, 14C and 14D show examples of graphical user interfaces (GUIs) that may be presented during a process of implementing the method 300 according to some examples.

FIGS. 14A, 14B, 14C and 14D show examples of graphical user interfaces (GUIs) that may be presented during a process of implementing the method 1300 according to some examples. In these examples, the apparatus 101 includes an instance of the fingerprint sensor system 102, an instance of the control system 106 (not shown) and an instance of the display system 108. A dashed outline of one example of an active area of the fingerprint sensor system 102 is shown in FIG. 14A. (The dashed lines in FIGS. 14A-14D are not intended to represent portions of the GUIs that would actually be presented on the display system 108 and visible to a user.) The active area may, for example, correspond with the areal extent of an array of sensor pixels of the fingerprint sensor system 102, such as the areal extent of the array of sensor pixels 206 shown in FIG. 2. In some implementations, an active area of the fingerprint sensor system 102 may be larger or smaller than the fingerprint sensor system 102 shown in FIG. 14A, may have a different aspect ratio, etc. For example, in some instances an active area of the fingerprint sensor system 102 may occupy a substantial portion of the display system 108, e.g., 10%, 20%, 30%, 40%, 50%, etc.

According to the examples shown in FIGS. 14A-14D, the control system 106 is controlling the display system 108 to present GUIs 1400a, 1400b, 1400c and 1400d, respectively, each of which includes a message area 1405 and a fingerprint sensor system area icon 1410. Accordingly, in these examples a display stack of the display system 108 resides between the active area of the fingerprint sensor system 102 and the outer surface of the apparatus 101 corresponding to the fingerprint sensor system area icon 1410, which is a display cover (e.g., a display glass) in these examples. In these examples, the active area of the fingerprint sensor system 102 roughly corresponds with the fingerprint sensor system area icon 1410.

Returning to FIG. 13, in this example block 1305 involves determining, via the control system, a digit force or a digit pressure of the digit on the outer surface of the apparatus. In some examples, the control system may determine the digit force or the digit pressure according to fingerprint sensor data received from the fingerprint sensor system. According to some such examples, the fingerprint sensor data may be, or may include, ultrasonic fingerprint sensor data. In some such examples, the ultrasonic fingerprint sensor data may be received via an electrode layer proximate a piezoelectric layer of an ultrasonic fingerprint sensor system. Alternatively, or additionally, in some examples the ultrasonic fingerprint sensor data may be received via an array of ultrasonic sensor pixels. Some detailed examples for estimating digit force or digit pressure according to fingerprint sensor data are disclosed herein. However, in some implementations block 1305 may involve determining a digit force or a digit pressure according to force sensor data from a force sensor (such as the optional force sensor 110 of FIG. 1A or FIG. 1B) that may be separate from the fingerprint sensor system 102.

According to this example block 1307 involves controlling, via the control system, the apparatus to provide a second prompt corresponding to the digit force or the digit pressure. In some examples, the second prompt may be, or may include, an audio prompt made via a loudspeaker system of the apparatus 101 and/or haptic feedback from a haptic feedback system of the apparatus 101. Alternatively, or additionally, in some examples the second prompt may include a visual prompt made via a display system.

For example, providing the second prompt may involve presenting a GUI on a display device of the apparatus. The GUI may, for example, indicate a current digit force or a current digit pressure. The GUI may, in some instances, indicate whether the current digit force or the current digit pressure is within an acceptable range. However, in some instances, the GUI may indicate that the current digit force or the current digit pressure is not within an acceptable range. According to some such examples, the GUI may include a prompt to change the current digit force or the current digit pressure.

Figure 14B:
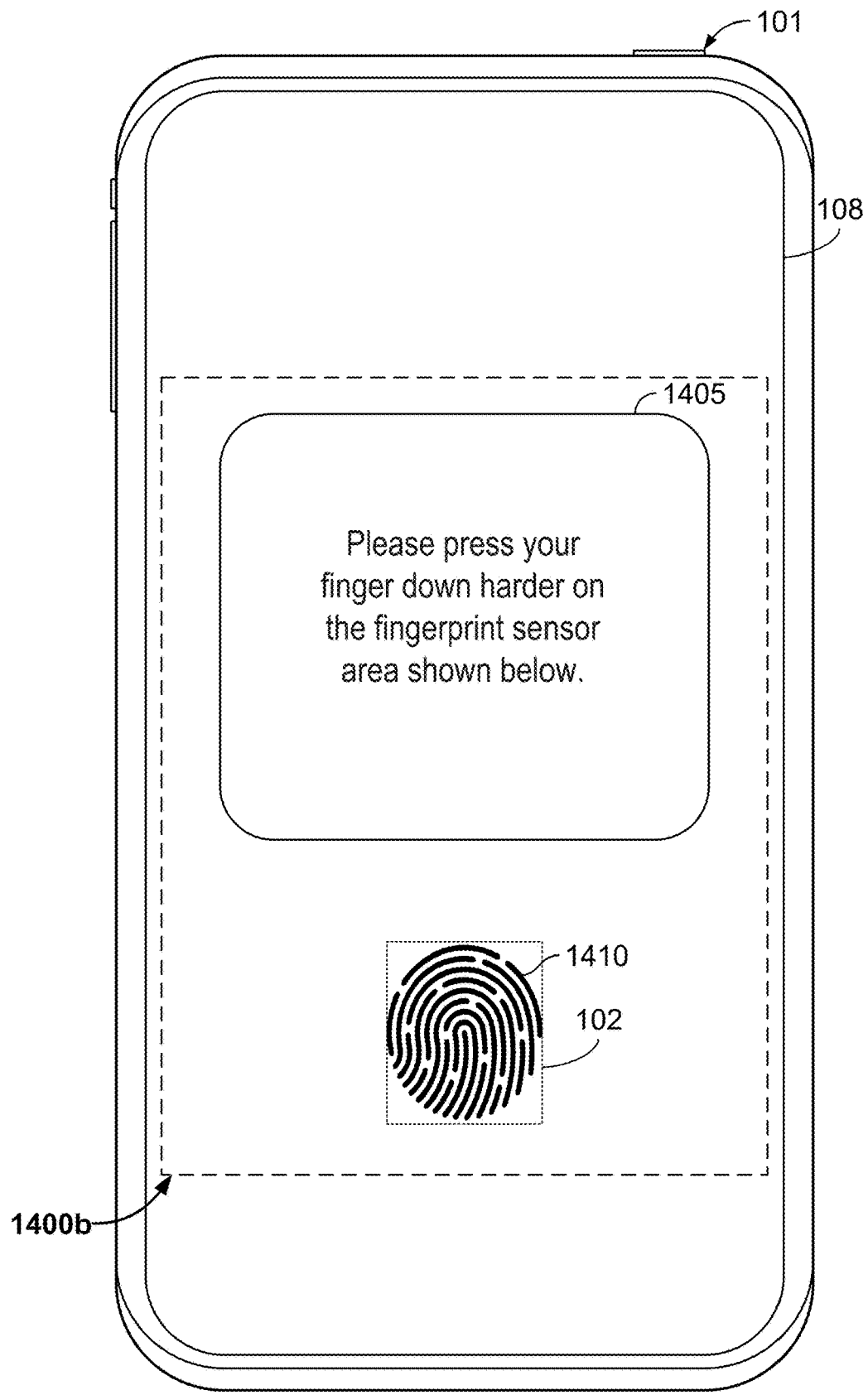

In the example shown in FIG. 14B, the control system 106 (not shown) is controlling the display system 108 to present a GUI 1400b, which includes a message area 1405 and a fingerprint sensor system area icon 1410. According to this example, the message area 1405 includes a textual prompt for the user to press the user's finger down harder on the outer surface of the apparatus 101 corresponding to the fingerprint sensor system area icon 1410. By implication, the message area 1405 is indicating that the current digit force or the current digit pressure is not within an acceptable range, but instead is too low.

Figure 14C:
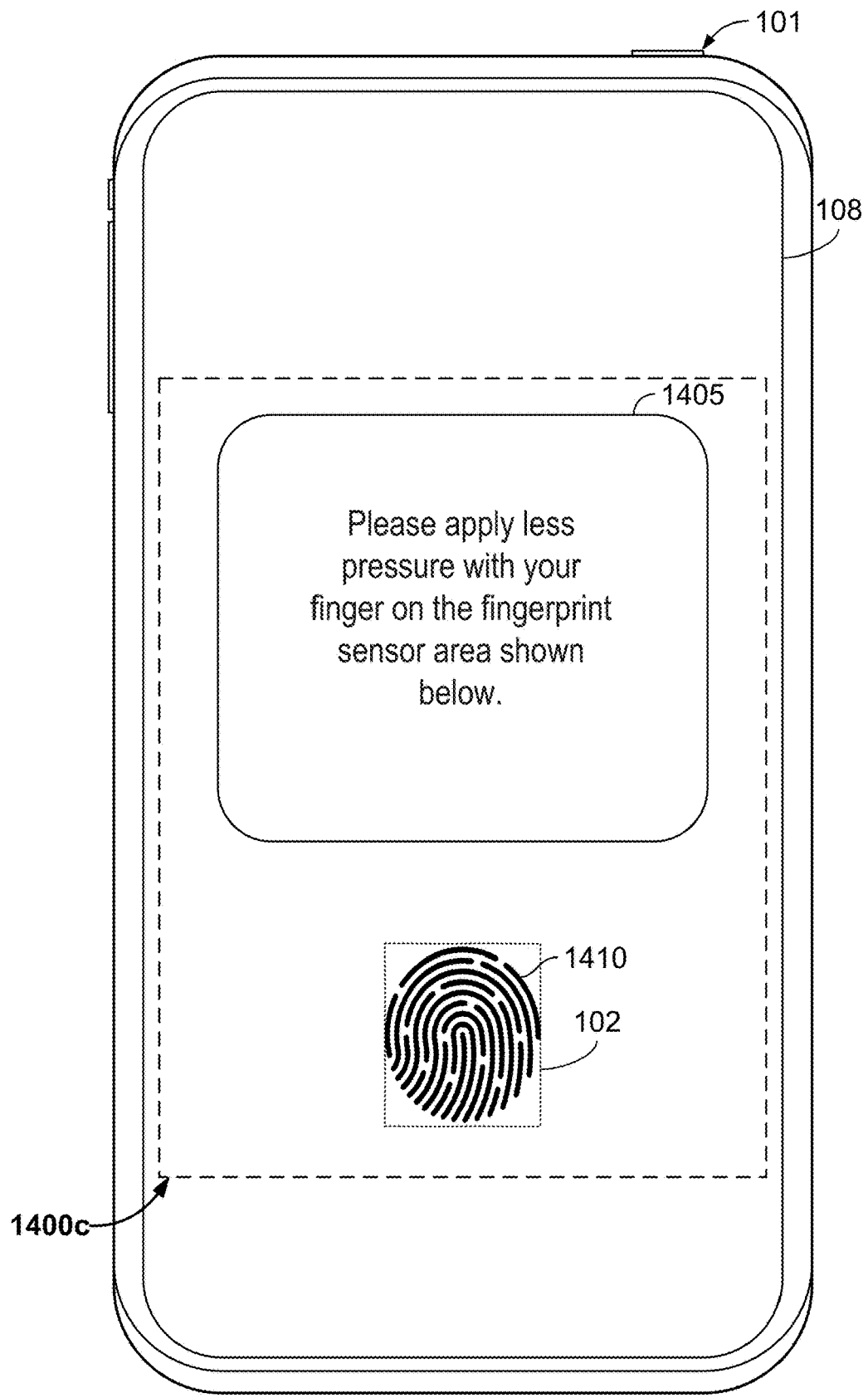

In the example shown in FIG. 14C, the message area 1405 of GUI 1400c includes a textual prompt for the user to apply less pressure to the user's finger on the outer surface of the apparatus 101 corresponding to the fingerprint sensor system area icon 1410. By implication, the message area 1405 is indicating that the current digit force or the current digit pressure is not within an acceptable range, but instead is too high.

Figure 14D:
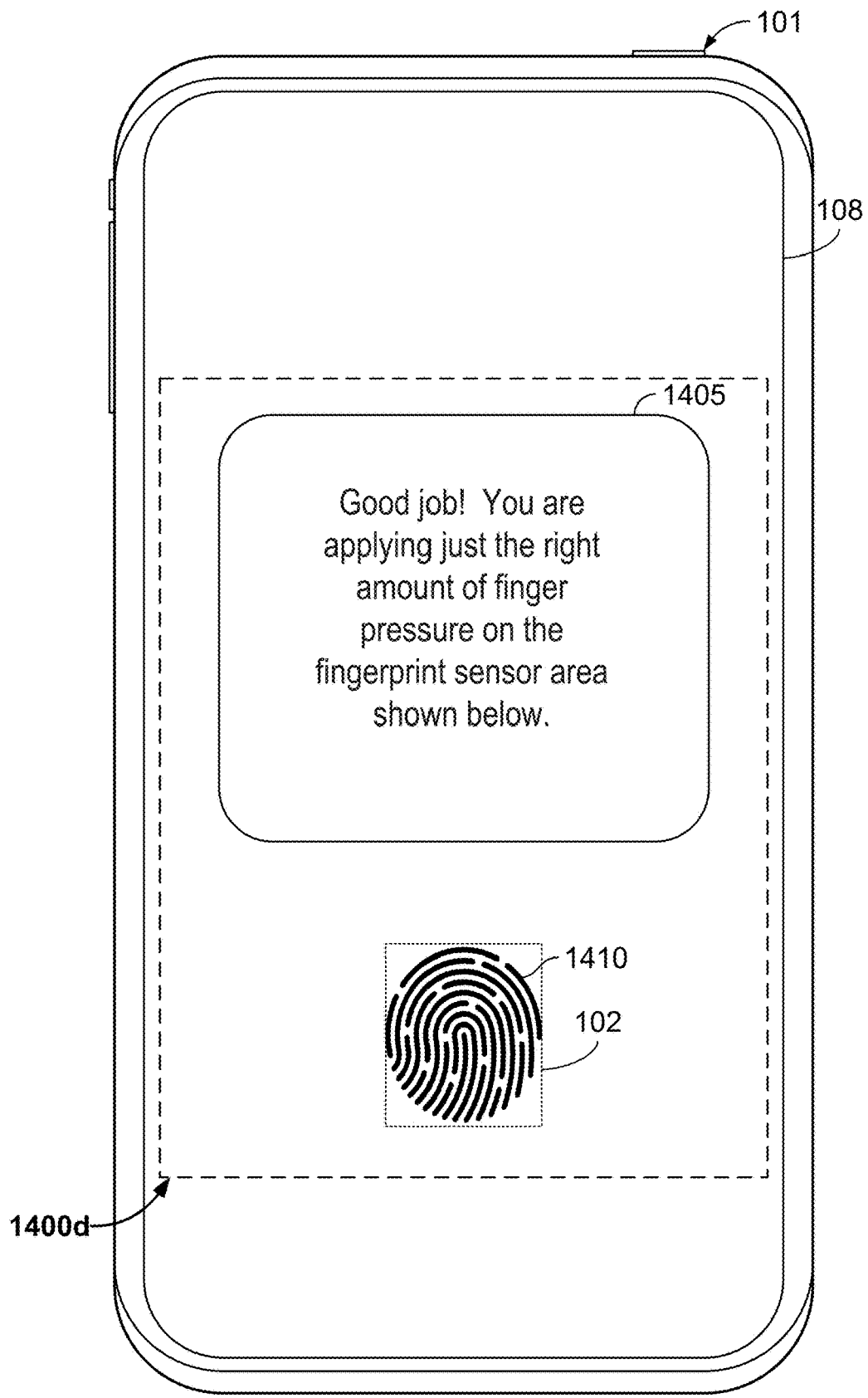

In the example shown in FIG. 14D, the message area 1405 of GUI 1400d includes textual feedback indicating that the user's finger is applying a satisfactory amount of pressure on the outer surface of the apparatus 101 corresponding to the fingerprint sensor system area icon 1410. Accordingly, the message area 1405 is indicating that the current digit force or the current digit pressure is within an acceptable range.

In some examples, the first prompt and/or the second prompt referenced in FIG. 13 may be presented during a user enrollment process. According to some such examples, the second prompt may correspond with a force calibration phase or a pressure calibration phase of a user enrollment process. For example, one or more of the GUIs shown in FIGS. 14A-14D may be presented during a force calibration phase or a pressure calibration phase of a user enrollment process.

In some examples, the first prompt and/or the second prompt may correspond with a fingerprint capture phase of a user enrollment process. For example, one or more of the GUIs shown in FIGS. 14A-14D may be presented during a fingerprint capture phase of a user enrollment process.

However, in some examples the first prompt and/or the second prompt may be presented after an enrollment process, e.g., as part of an authentication process. For example, one or more of the GUIs shown in FIGS. 14A-14D may be presented during the authentication process.

In some implementations, method 1300 may involve obtaining fingerprint image data based on signals received from the fingerprint sensor system 102. Some implementations of method 1300 may involve determining an image quality metric corresponding to the fingerprint image data. According to some implementations, determining the image quality metric may involve evaluating the fingerprint image data and making a signal and/or noise determination, such as a signal-to-noise ratio determination. Signal-to-noise ratios (SNRs) may be determined, for example, by dividing the relative amplitude of fingerprint sensor data corresponding to ridges of a fingerprint by the amplitude of the background (such as valleys of a fingerprint or from sensor data with no object positioned on the sensor platen). In some implementations, determining the image quality metric may involve evaluating image contrast and/or image sharpness. Image contrast may be determined, for example, by comparing the magnitude of the ridge data with the magnitude of the valley data, such as by generating a ratio between one or more ridges and one or more valleys of the fingerprint image data. Image sharpness may be determined, for example, by comparing the magnitudes of ridge data and valley data and dividing by the number of sensor pixels between an edge of a ridge and the floor of a valley. According to some implementations, determining the image quality metric may involve evaluating the fingerprint image data to determine a topology of curves corresponding to ridge and valley structures. Some such implementations may involve determining a curve orientation field. In some examples, determining the image quality metric may involve evaluating metrics such as the orientation of ridge flow, the clarity of ridge flow and/or ridge flow continuity. In some implementations, determining the image quality metric may involve evaluating the fingerprint image data for the existence of one or more fingerprint features such as minutia points. A topology of curves corresponding to ridges and valleys may be determined, for example, by constructing a vector field associated with the angular direction of the ridges and valleys disposed on an outer surface of a device in an active area of the fingerprint sensor system 102. A curve orientation field may be determined, for example, by constructing a vector field associated with the curvature of the ridges and valleys (e.g., a relatively straight ridge or valley may have a small curvature and a highly curved ridge or valley such as a whorl may have a high curvature). Image quality metrics such as the orientation of ridge flow, the clarity of ridge flow, and/or ridge flow continuity may be determined, for example, by examining the angular direction, length, continuity and curvature of ridges within the fingerprint sensor data to assess whether a sufficient number of features are available to allow successful matching and/or to identify good images for enrollment templates.

According to some examples, the second prompt of method 1300 may be based, at least in part, on the image quality metric. In some such examples, the second prompt may indicate whether a current digit force or a current digit pressure should be changed.

In some implementations, method 1300 may involve controlling, via the control system, the apparatus to provide a third prompt based, at least in part, on the image quality metric. The third prompt may, for example, indicate that a finger moisture level should be changed. For example, the third prompt may be, or may include, a text on a GUI prompting a user to apply moisturizer to the finger.

In some implementations, other types of digit characteristics may be determined and stored during an enrollment process, in addition to fingerprint image characteristic data (e.g., in addition to identifying and storing fingerprint features such as fingerprint ridge endings, fingerprint ridge bifurcations, short ridges and/or islands, and the locations of such fingerprint features). Such other digit characteristics may be determined and stored as digit characteristic data. The digit characteristic data may, for example, include digit orientation data, digit force data, digit pressure data or digit dryness data.

According to some such examples, a subsequent authentication process may be based, at least in part, on one or more types of digit characteristic data. If it is determined during the authentication process that a currently-determined digit characteristic does not match a digit characteristic that was determined during an enrollment process, even if the currently-obtained fingerprint features match fingerprint features that were previously acquired and stored during an enrollment process, this may be an indication of a spoof attempt. In some implementations, this condition may trigger a more rigorous authentication procedure, such as a requirement that a user enter a code, answer questions that were part of an enrollment process and/or provide another type of biometric data, such as facial recognition data.

Some implementations of method 1300 may involve determining (e.g., during an enrollment process) an acceptable image quality force range or an acceptable image quality pressure range associated with image quality metrics that equal or exceed an image quality metric threshold. In some instances, the acceptable image quality force range or the acceptable image quality pressure range may be a force or pressure range corresponding with a maximum level of observed image quality. As noted elsewhere herein, due to the differences in finger characteristics from person to person, an individual (and/or an individual's particular digit) may have a characteristic acceptable image quality force range or an acceptable image quality pressure range associated with an acceptable fingerprint image quality. Some implementations may involve associating the acceptable image quality force range or the acceptable image quality pressure range with a person (and/or with a particular digit of the person) and storing the acceptable image quality force range or the acceptable image quality pressure range in a memory.

Some such examples may involve performing a subsequent authentication process and applying the acceptable image quality force range or the acceptable image quality pressure range as part of the authentication process. For example, the authentication process may be primarily based on matching currently-determined fingerprint features determined via a fingerprint sensor system with fingerprint features that were stored during an enrollment process. However, if it is determined during the authentication process that a currently-determined force or pressure does not match an acceptable image quality force range or an acceptable image quality pressure range that was determined during an enrollment process, this may be an indication of a spoof attempt and may trigger a more rigorous authentication procedure.

Figure 15:
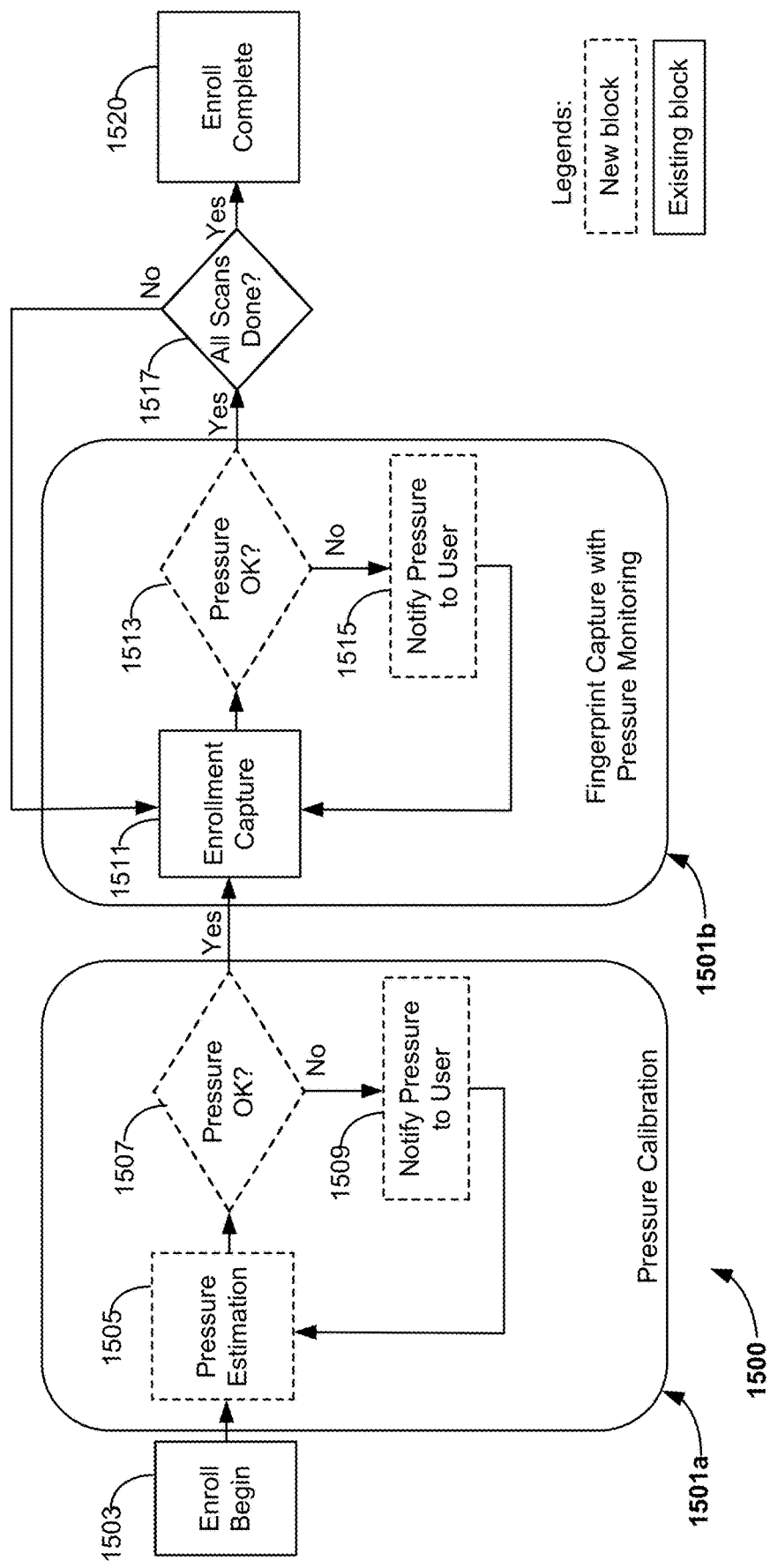
FIG. 15 is a flow diagram that provides example blocks of some additional methods disclosed herein.

FIG. 15 is a flow diagram that provides example blocks of some additional methods disclosed herein. The blocks of FIG. 15 may, for example, be performed by the apparatus 101 of FIG. 1A, FIG. 1B or FIG. 2, or by a similar apparatus. As with other methods disclosed herein, the method 1500 outlined in FIG. 15 may include more or fewer blocks than indicated. Moreover, the blocks of methods disclosed herein are not necessarily performed in the order indicated. In some examples, some blocks of methods disclosed herein may be performed concurrently.

According to this example, the method 1500 is a method of controlling an apparatus that includes a fingerprint sensor, which may or may not be an ultrasonic fingerprint sensor depending on the particular implementation. In this example, the method 1500 corresponds to a user enrollment process that involves phases 1501a and 1501b. In this implementation, phase 1501a is a pressure calibration phase of the user enrollment process and phase 1501b is a fingerprint capture phase of the user enrollment process. As noted in more detail below, the fingerprint capture phase 1501b involves pressure monitoring.

According to this implementation, block 1503 involves controlling, via a control system of the apparatus (such as the control system 106 of the apparatus 101), the apparatus to initiate the user enrollment process. Block 1503 may, for example, involve providing a prompt such as the first prompt discussed above with reference to FIG. 13: the first prompt may be a prompt to place a digit on an outer surface of the apparatus in a fingerprint sensor system area. In some examples, block 1503 may involve controlling at least a portion of a user interface system (e.g., a loudspeaker system of the apparatus 101) to provide the first prompt. In some instances, block 1503 may involve controlling a display device of the apparatus (which may be an instance of the optional display system 108 of FIG. 1A) to provide the first prompt. The first prompt may, for example, be provided via a GUI, such as the GUI 1400 that is described above with reference to FIG. 14.

In this example, block 1505 involves a process of estimating the pressure of a digit on an outer surface of an apparatus in an active area of a fingerprint sensor system. As noted elsewhere herein, the terms "force" and "pressure" may be used interchangeably herein. In some examples, block 1505 may be a force estimation process. Block 1505 may, for example, involve one or more of the examples of force estimation processes that are provided below.

According to this example, block 1507 involves determining whether the pressure estimated in block 1505 is within an acceptable range. In some examples, block 1505 or block 1507 may involve obtaining fingerprint image data via a fingerprint sensor system. According to some implementations, block 1507 may involve evaluating the quality of the fingerprint image data. Some implementations may involve determining an acceptable image quality force range or an acceptable image quality pressure range associated with image quality metrics that equal or exceed an image quality metric threshold. As noted elsewhere herein, due to the differences in finger characteristics from person to person, an individual (and/or an individual's particular digit) may have a characteristic acceptable image quality force range or an acceptable image quality pressure range associated with an acceptable fingerprint image quality. Therefore, in some examples, the acceptable image quality force range or acceptable image quality pressure range used for the evaluation process of block 1507 may differ according to the particular individual, or even according to the particular digit, that is being enrolled.

According to this example, if it is determined in block 1507 that the digit pressure is not in an acceptable range, method 1500 continues to block 1509, wherein the control system causes the apparatus 101 to provide a prompt (such as an audio prompt, a haptic feedback response and/or a GUI) indicating that the digit pressure is not in an acceptable range.

In some implementations (e.g., as described above with reference to FIG. 14D), if it is determined in block 1507 that the digit pressure is in an acceptable range, the control system may cause the apparatus to provide a prompt (such as an audio prompt and/or a GUI) indicating that the digit pressure is in an acceptable range. In some examples, if it is determined in block 1507 that the digit pressure is in an acceptable range, method 1500 continues to the fingerprint capture phase 1501b. However, according to some implementations, blocks 1505, 1507 and 1509 may need to be performed for a minimum number of times (e.g., 2 times, 3 times, 4 times, 5 times, 6 times, etc.) before method 1500 continues to the fingerprint capture phase 1501b. In some such examples, method 1500 may proceed from block 1507 to block 1509 even if the digit pressure is in an acceptable range.

Figure 16A:
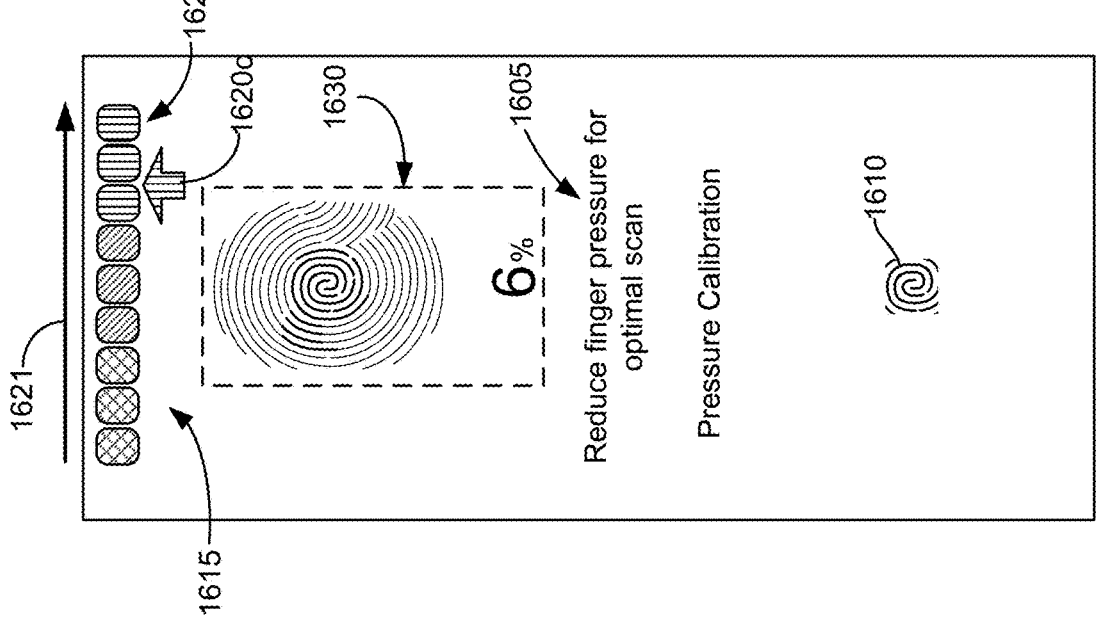
FIGS. 16A, 16B and 16C show examples of GUIs that may be presented during a pressure calibration phase of a user enrollment process.
Figure 16B:
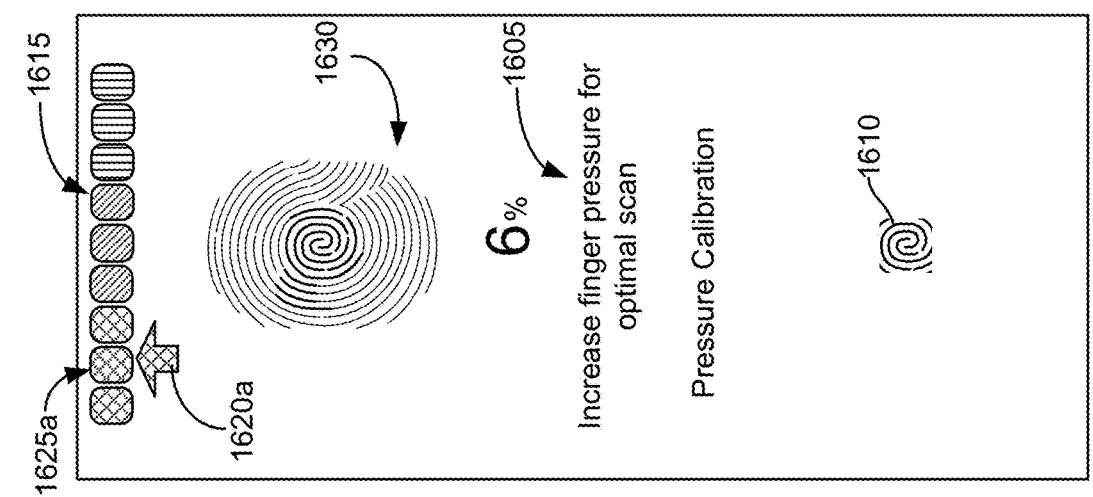
Figure 16C:
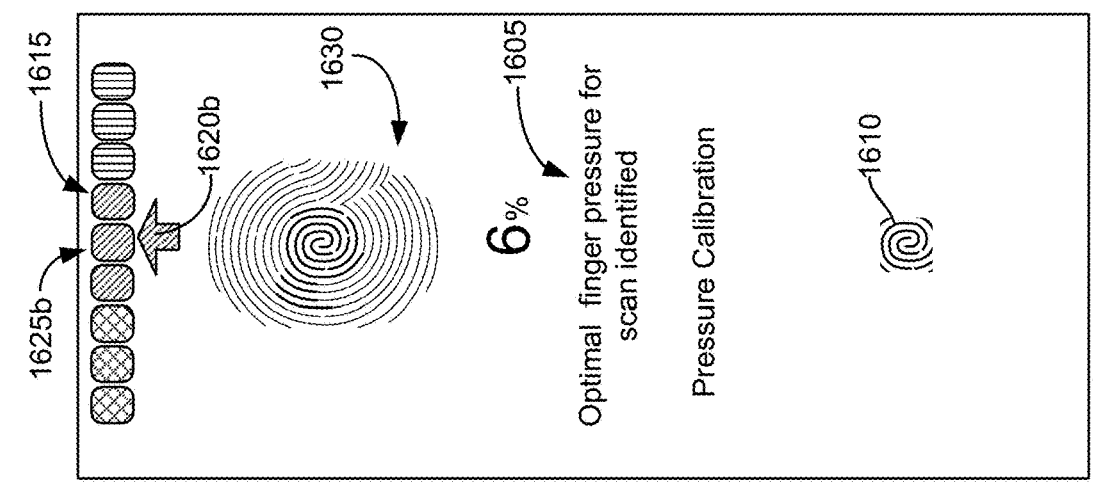

FIGS. 16A, 16B and 16C show examples of GUIs that may be presented during a pressure calibration phase of a user enrollment process. FIGS. 17A, 17B, 17C and 17D show examples of GUIs that may be presented during a fingerprint capture phase of a user enrollment process. As with other disclosed implementations, the types, numbers and arrangements of elements in the disclosed GUIs are merely made by way of example and are not intended to be limiting. Other GUI implementations that are within the scope of the present disclosure may have different types, numbers and/or arrangements of elements.

According to the examples shown in FIGS. 16A-16C, a control system is controlling a display system to present GUIs 1600a, 1600b and 1600c, respectively, each of which includes a message area 1605, a fingerprint sensor system area icon 1610, a current digit pressure indicator 1615 and an progress indicator 1630. In these examples, the current digit pressure indicators 1615 include the arrows 1620a, 1620b and 1620c, as well as the elements 1625a, 1625b and 1625c, respectively.

The GUI 1600a of FIG. 16A is an example of a GUI that may be presented during block 1509 if it is determined in block 1507 that the digit pressure is not in an acceptable range. In this example, the message area 1605 includes a prompt for the user to reduce the finger pressure being applied to the outer surface of the apparatus in an area corresponding to fingerprint sensor system area icon 1610.

In the examples shown in FIGS. 16A-17D, the position of the arrows 1620a, 1620b, 1620c, 1720b, 1720b, 1720b, and 1720b indicate a current finger pressure level. The arrow 1621 shown in FIG. 16A (which would not necessarily be presented in the GUI 1600a) points in the direction of increasing pressure. In FIG. 16A, the current digit pressure indicator 1615 indicates that the current finger pressure is in a range that is unacceptably high: here, the arrow 1620c is in a location corresponding to the elements 1625c, which are in a high-pressure region of the current digit pressure indicator 1615. In this example, the arrow 1620c has a pattern corresponding to that of the elements 1625c. In some examples, if the current digit pressure indicator 1615 indicates that the current finger pressure is in a range that is unacceptably high, the arrow 1620c and the elements 1625c may be presented in a red color. In this instance, the progress indicator 1630 shows that the pressure calibration phase is 6% complete.

The GUI 1600b of FIG. 16B is another example of a GUI that may be presented during block 1509 if it is determined in block 1507 that the digit pressure is not in an acceptable range. In this example, the message area 1605 includes a prompt for the user to increase the finger pressure being applied to the outer surface of the apparatus in an area corresponding to fingerprint sensor system area icon 1610. The current digit pressure indicator 1615 indicates that the current finger pressure is in a range that is unacceptably low: here, the arrow 1620a is in a location corresponding to the elements 1625a, which are in a low-pressure region of the current digit pressure indicator 1615. Here, the arrow 1620a has a pattern corresponding to that of the elements 1625a. In some examples, if the current digit pressure indicator 1615 indicates that the current finger pressure is in a range that is unacceptably low, the arrow 1620a and the elements 1625a may be presented in a yellow color.

The GUI 1600bc of FIG. 16C is an example of a GUI that may be presented if it is determined in block 1507 that the digit pressure is in an acceptable range. In this example, the message area 1605 includes an encouraging message to the user, indicating that the finger pressure being applied to the outer surface of the apparatus in an area corresponding to fingerprint sensor system area icon 1610 is in an optimal range. The current digit pressure indicator 1615 indicates that the current finger pressure is in a range that is acceptable: here, the arrow 1620b is in a location corresponding to the elements 1625b, which are in a medium-pressure region of the current digit pressure indicator 1615. Here, the arrow 1620b has a pattern corresponding to that of the elements 1625b. In some examples, if the current digit pressure indicator 1615 indicates that the current finger pressure is in an acceptable range, the arrow 1620b and the elements 1625b may be presented in a green color.

Returning to FIG. 15, one example of the fingerprint capture phase 1501b of the user enrollment process will now be described. In this example, block 1511 involves obtaining data from a fingerprint sensor system while a digit is placed on a surface of an apparatus corresponding to an active area of the fingerprint sensor system. According to some examples, block 1511 may involve obtaining data from an array of sensor pixels of an ultrasonic fingerprint sensor system, such as the array of sensor pixels 206 that are shown in FIG. 2. In some examples, block 1511 may involve obtaining data from an electrode layer of an ultrasonic fingerprint sensor system, such as the electrode layer 210 that is shown in FIG. 2. Other examples may involve obtaining data from an array of sensor pixels of a different type of fingerprint sensor system, such as one of the alternative examples described above with reference to FIG. 1A.

According to this example, block 1513 involves determining whether the current digit pressure (which may, for example, be estimated in block 1511 or block 1513) is within an acceptable range. Some implementations may involve determining a current digit force or pressure is within an acceptable image quality force range or an acceptable image quality pressure range that was previously determined during the pressure calibration phase and saved to a memory. As noted above, in some examples the acceptable image quality force range or acceptable image quality pressure range used for the evaluation process of block 1513 may differ according to the particular individual, or even according to the particular digit, that is being enrolled.

According to this example, if it is determined in block 1513 that the digit pressure is not in an acceptable range, method 1500 continues to block 1515, wherein the control system causes the apparatus 101 to provide a prompt (such as an audio prompt, a haptic feedback response and/or a visual prompt) indicating that the digit pressure is not in an acceptable range.

In some implementations (e.g., as described above with reference to FIGS. 14D and 16C), if it is determined in block 1513 that the digit pressure is in an acceptable range, the control system may cause the apparatus to provide a prompt (such as an audio prompt and/or a visual prompt) indicating that the digit pressure is in an acceptable range.

According to this implementation, if it is determined in block 1513 that the digit pressure is in an acceptable range, the process continues to block 1517, in which it is determined whether the fingerprint capture phase 1501b of the user enrollment process has been completed. In this example, if it is determined in block 1517 that the fingerprint capture phase 1501b of the user enrollment process has not been completed, the process reverts to block 1511 and additional fingerprint image data is acquired. If it is determined in block 1517 that the fingerprint capture phase 1501b of the user enrollment process has been completed, the process continues to block 1520, which corresponds to the end of the user enrollment process. In some examples, block 1520 may involve providing a message (e.g., an audio message, a textual message, a video, etc.) indicating that the user enrollment process has completed successfully.

As noted above, FIGS. 17A-17D show examples of GUIs that may be presented during a fingerprint capture phase of a user enrollment process. According to the examples shown in FIGS. 17A-17D, a control system is controlling a display system to present GUIs 1700a, 1700b, 1700c and 1700d, respectively, each of which includes a message area 1705, a current digit pressure indicator 1715 and an progress indicator 1730. FIGS. 17A-17C also include a fingerprint sensor system area icon 1710.

The GUI 1700a of FIG. 17A is an example of a GUI that may be presented if it is determined in block 1513 that the digit pressure is in an acceptable range during a fingerprint capture phase, but that additional fingerprint image data needs to be acquired from other portions of the finger for which fingerprint image data is currently being captured. In this instance, the current digit pressure indicator 1715 indicates that the current finger pressure is in a range that is acceptable: here, the arrow 1720a is in a location corresponding to the elements 1725a, which are in a medium-pressure region of the current digit pressure indicator 1715.

In this example, the message area 1705 includes a prompt for the user to adjust the finger position. In addition, the message area 1705 includes a prompt for the user to press the finger to the outer surface of the apparatus in an area corresponding to fingerprint sensor system area icon 1710, then to lift the finger off upon receiving haptic feedback, which is a vibration in this example. In this instance, the progress indicator 1730 indicates that the fingerprint capture phase is 27% complete.

The GUI 1700b of FIG. 17B is an example of a GUI that may be presented if it is determined in block 1513 that the digit pressure is not in an acceptable range during a fingerprint capture phase of a user enrollment process. In this instance, the current digit pressure indicator 1715 indicates that the current finger pressure is in a range that is too high: here, the arrow 1720b is in a location corresponding to the elements 1725b, which are in a high-pressure region of the current digit pressure indicator 1715.

In this example, the message area 1705 includes a prompt for the user to reduce the finger pressure. In addition, the message area 1705 includes a prompt for the user to press the finger to the outer surface of the apparatus in an area corresponding to fingerprint sensor system area icon 1710, then to lift the finger off upon perceiving a vibration. In this instance, the progress indicator 1730 indicates that the fingerprint capture phase is 32% complete.

The GUI 1700c of FIG. 17C is another example of a GUI that may be presented if it is determined in block 1513 that the digit pressure is in an acceptable range during a fingerprint capture phase, but that additional fingerprint image data needs to be acquired from other portions of the finger for which fingerprint image data is currently being captured. In this instance, the current digit pressure indicator 1715 indicates that the current finger pressure is in a range that is acceptable: here, the arrow 1720c is in a location corresponding to the elements 1725a, which are in a medium-pressure region of the current digit pressure indicator 1715.

In this example, the message area 1705 includes a prompt for the user to adjust the finger position in order to fully scan the finger for which fingerprint image data is currently being captured. In addition, the message area 1705 includes a prompt for the user to press the finger to the outer surface of the apparatus in an area corresponding to fingerprint sensor system area icon 1710, then to lift the finger off upon receiving haptic feedback, which is a vibration in this example. In this instance, the progress indicator 1730 indicates that the fingerprint capture phase is 32% complete.

The GUI 1700d of FIG. 17D is an example of a GUI that may be presented if it is determined in block 1517 of FIG. 15 that the fingerprint capture phase of a user enrollment process has successfully completed. The GUI 1700d may, for example, be presented in block 1520. In this instance, the progress indicator 1730 indicates that the fingerprint capture phase is 100% complete. According to this example, the current digit pressure indicator 1715 is still providing user feedback and indicates that the current finger pressure is in a range that is acceptable.

Figure 17E:
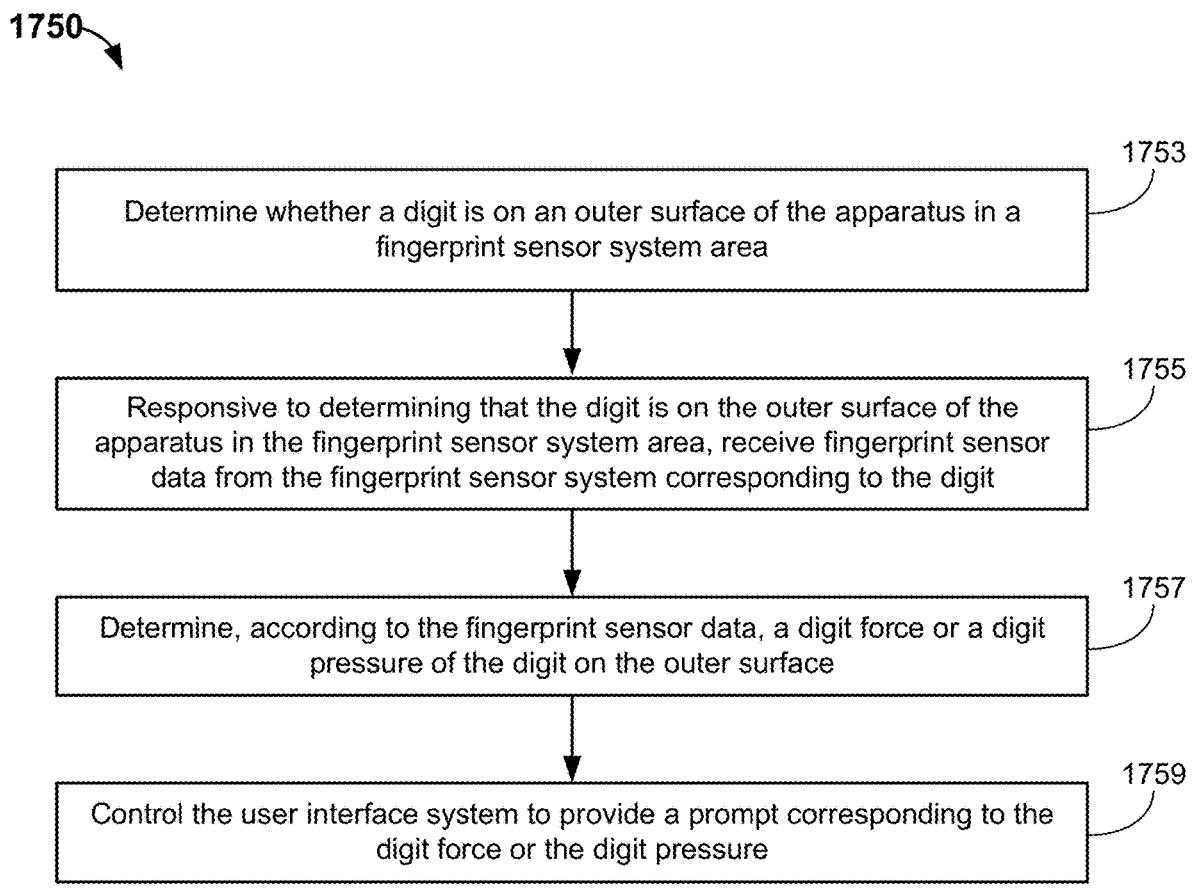
FIG. 17E is a flow diagram that provides example blocks of some alternative methods disclosed herein.

FIG. 17E is a flow diagram that provides example blocks of some alternative methods disclosed herein. The blocks of FIG. 17E may, for example, be performed by the apparatus 101 of FIG. 1A, FIG. 1B or FIG. 2, or by a similar apparatus. As with other methods disclosed herein, the method 1750 outlined in FIG. 17E may include more or fewer blocks than indicated. Moreover, the blocks of methods disclosed herein are not necessarily performed in the order indicated. In some examples, some blocks of methods disclosed herein may be performed concurrently.

According to this example, the method 1750 is a method of controlling an apparatus that includes a fingerprint sensor, which may or may not be an ultrasonic fingerprint sensor depending on the particular implementation. According to this implementation, block 1753 involves determining, via a control system of the apparatus (such as the control system 106 of the apparatus 101), whether a digit is on an outer surface of the apparatus in a fingerprint sensor system area. In some examples, the apparatus may include a touch sensor system and block 1753 may involve receiving input from the touch sensor system indicating whether a target object is on an outer surface of the apparatus in an active area of a fingerprint sensor system. In some examples, block 1753 may involve receiving input from the touch sensor system and/or the fingerprint sensor system indicating whether a target object on the outer surface of the apparatus in an active area of a fingerprint sensor system has one or more characteristics of a finger, such as a finger shape, fingerprint features, etc. In some examples, block 1753 may involve receiving input from the fingerprint sensor system indicating whether a target object on the outer surface of the apparatus in an active area of a fingerprint sensor system has one or more sub-epidermal features such as papillary layer features, reticular layer features, subcutis features, blood vessel features, lymph vessel features, fat lobule features, muscle tissue features, bone features, etc.

In this example, in block 1755, responsive to determining (in block 1753) that a digit is on the outer surface of the apparatus in the fingerprint sensor system area, receiving fingerprint sensor data from the fingerprint sensor system corresponding to the digit. As noted above, in some instances block 1753 also may involve receiving fingerprint sensor data from a target object in the process of determining whether the target object is a digit. According to some such examples, no additional fingerprint sensor data will be obtained in block 1755. However, in some such instances additional fingerprint sensor data may be obtained in block 1755. For example, in some instances block 1753 may involve receiving fingerprint sensor data from an electrode layer, such as the electrode layer 210 of FIG. 2, whereas block 1755 may involve receiving fingerprint sensor data from an array of sensor pixels, such as the array of sensor pixels 206 of FIG. 2.

According to this example, block 1757 involves determining, via the control system, a digit force or a digit pressure of the digit on the outer surface of the apparatus. In some examples, the control system may determine the digit force or the digit pressure according to fingerprint sensor data received from the fingerprint sensor system. According to some such examples, the fingerprint sensor data may be, or may include, ultrasonic fingerprint sensor data. In some such examples, the ultrasonic fingerprint sensor data may be received via an electrode layer proximate a piezoelectric layer of an ultrasonic fingerprint sensor system. Alternatively, or additionally, in some examples the ultrasonic fingerprint sensor data may be received via an array of ultrasonic sensor pixels. Some detailed examples for estimating digit force or digit pressure according to fingerprint sensor data are described below with reference to FIG. 8A et seq. However, in some implementations block 1757 may involve determining a digit force or a digit pressure according to force sensor data from a force sensor (such as the optional force sensor 110 of FIG. 1A or FIG. 1B) that is separate from the fingerprint sensor system 102.

According to this example, block 1759 involves controlling, via the control system, a user interface system of the apparatus to provide a prompt corresponding to the digit force or the digit pressure. In some examples, the prompt may be, or may include, an audio prompt made via a loudspeaker system of the apparatus 101 and/or haptic feedback from a haptic feedback system of the apparatus 101. Alternatively, or additionally, in some examples the prompt may include a visual prompt made via a display system.

For example, providing the prompt may involve presenting a GUI on a display device of the apparatus. The GUI may, for example, indicate a current digit force or a current digit pressure. The GUI may, in some instances, indicate whether the current digit force or the current digit pressure is within an acceptable range, e.g., as in the examples described above with reference to one of FIG. 14D, 16C, 17A, 17C or 17D. However, in some instances, the GUI may indicate that the current digit force or the current digit pressure is not within an acceptable range, e.g., as in the examples described above with reference to one of FIG. 14B, 14C, 16A, 16B or 17B. According to some such examples, the GUI may include a prompt to change the current digit force or the current digit pressure.

In some examples, the prompt referenced in FIG. 17E may be presented during a user enrollment process. According to some such examples, the prompt may correspond with a force calibration phase or a pressure calibration phase of a user enrollment process. In some examples, the prompt may correspond with a fingerprint capture phase of a user enrollment process. However, in some examples the prompt may be presented after an enrollment process, e.g., as part of an authentication process.

In some implementations, method 1750 may involve obtaining fingerprint image data based on signals received from the fingerprint sensor system 102. Some implementations of method 1750 may involve determining an image quality metric corresponding to the fingerprint image data, e.g., as described above with reference to FIG. 13. According to some examples, the prompt of method 1750 may be based, at least in part, on the image quality metric. In some such examples, the second prompt may indicate whether a current digit force or a current digit pressure should be changed.

In some implementations, method 1750 may involve controlling, via the control system, the apparatus to provide a second prompt based, at least in part, on the image quality metric. The second prompt may, for example, indicate that a finger moisture level should be changed. For example, the second prompt may be, or may include, a text on a GUI prompting a user to apply moisturizer to the finger.

In some implementations, other types of digit characteristics may be determined and stored during an enrollment process, in addition to fingerprint image characteristic data (e.g., in addition to identifying and storing fingerprint features such as fingerprint ridge endings, fingerprint ridge bifurcations, short ridges and/or islands, and the locations of such fingerprint features). Such other digit characteristics may be determined and stored as digit characteristic data. The digit characteristic data may, for example, include digit orientation data, digit force data, digit pressure data or digit dryness data.

According to some such examples, a subsequent authentication process may be based, at least in part, on one or more types of digit characteristic data. If it is determined during the authentication process that a currently-determined digit characteristic does not match a digit characteristic that was determined during an enrollment process, this may be an indication of a spoof attempt. In some implementations, this condition may trigger a more rigorous authentication procedure.

Figure 18A:
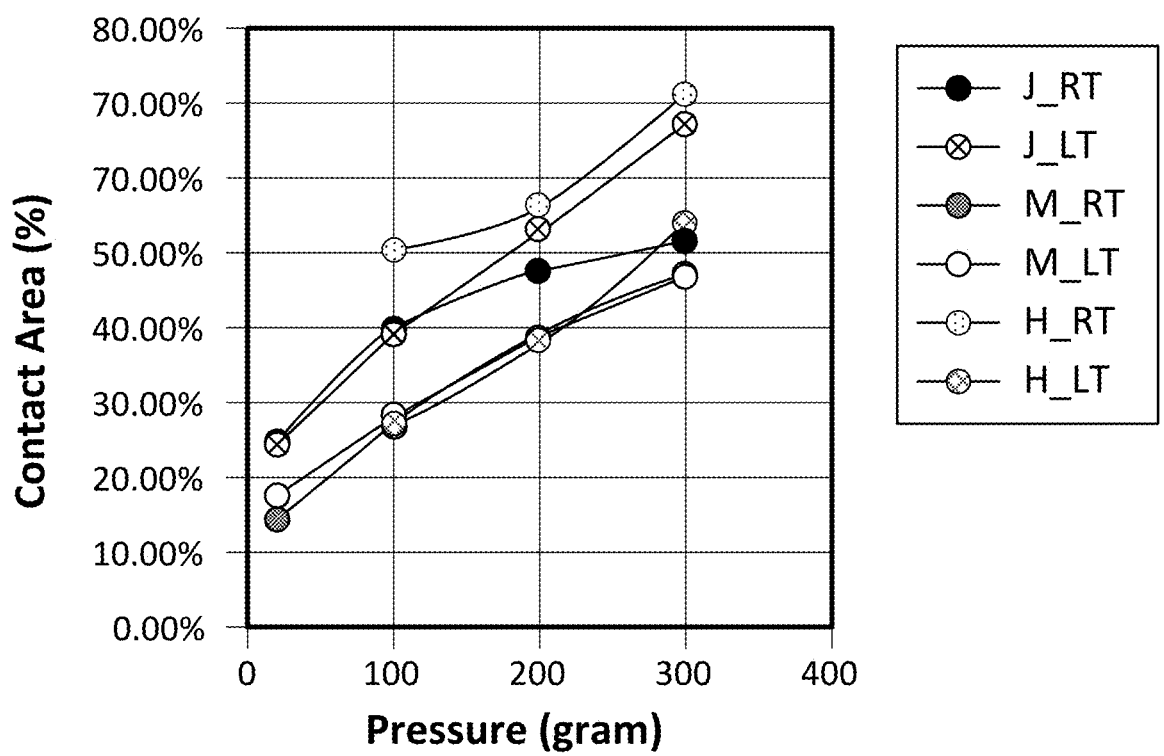
FIGS. 18A, 18B and 18C show examples of graphs that indicate changes in fingerprint images according to changes in applied finger pressure.
Figure 18B:
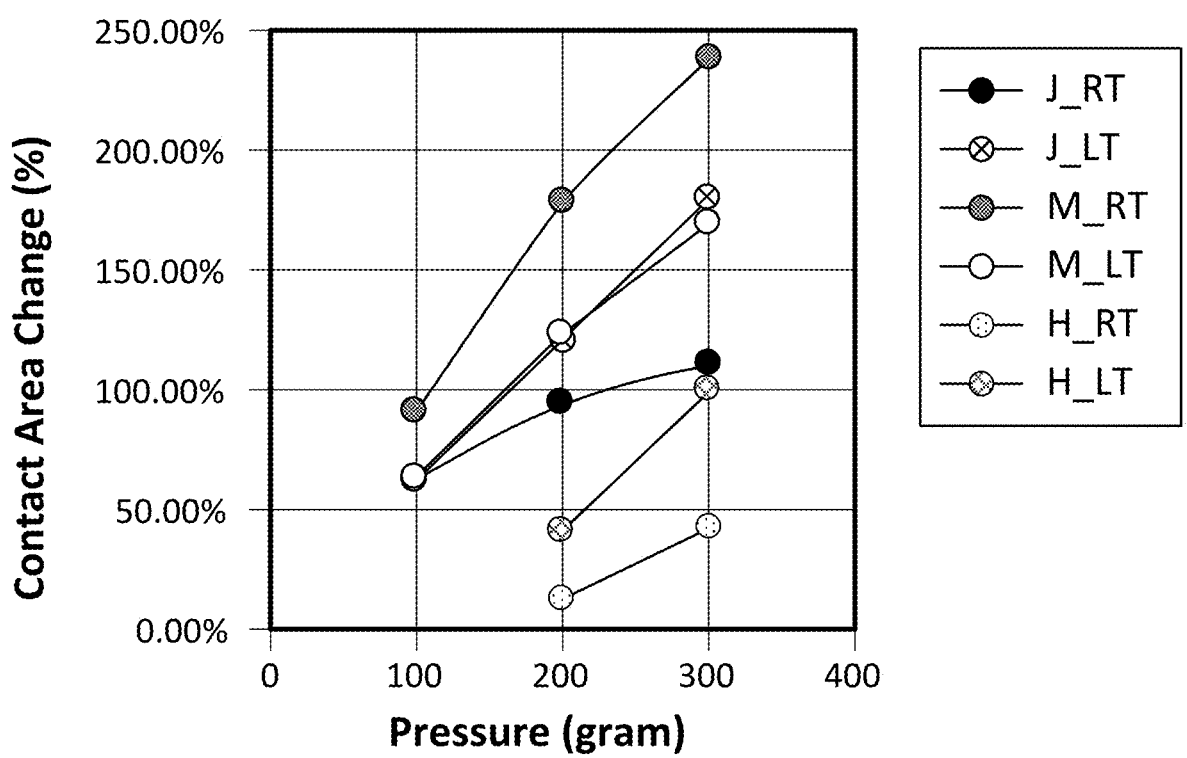
Figure 18C:
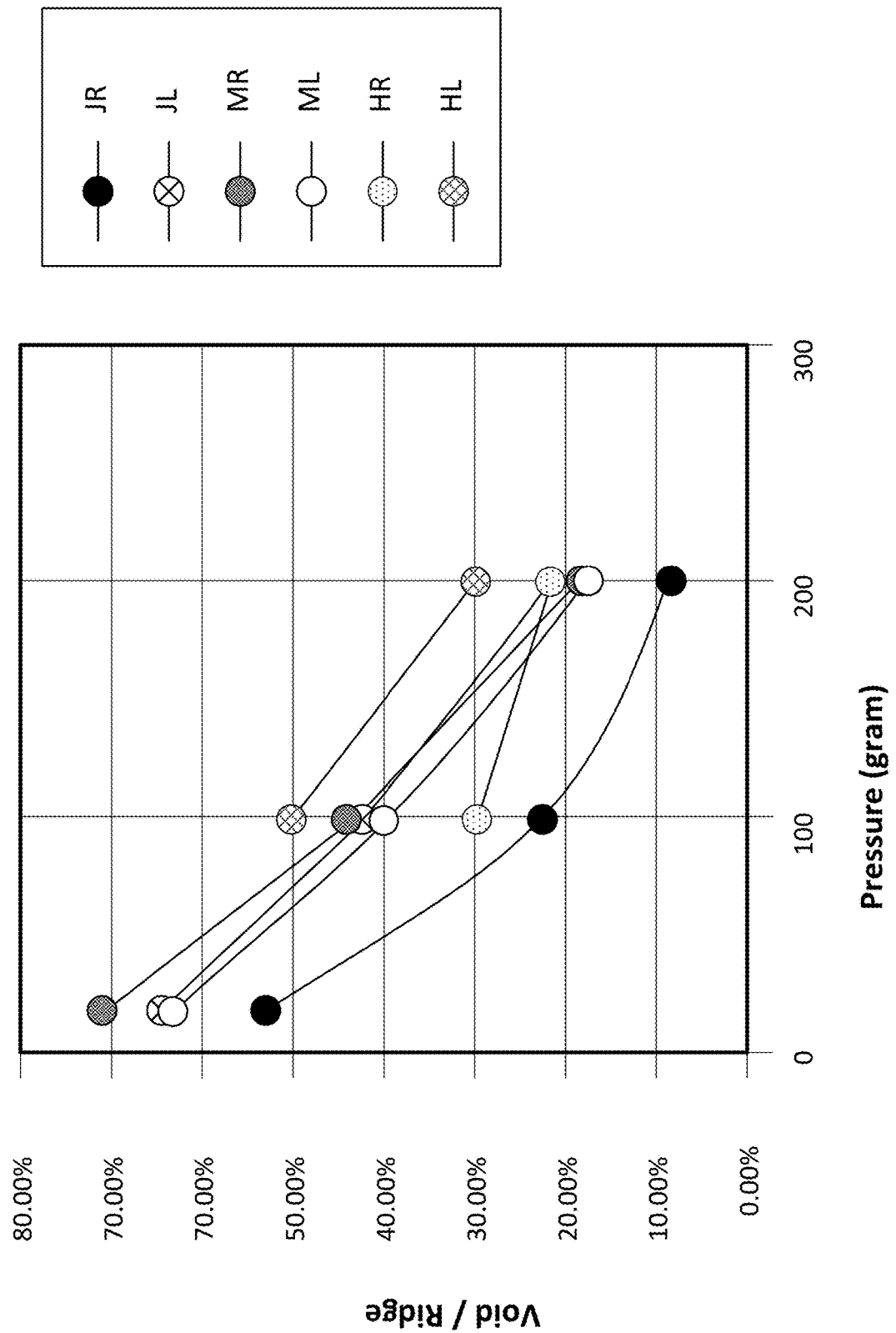

FIGS. 18A, 18B and 18C show examples of graphs that indicate changes in fingerprint images according to changes in applied finger pressure. FIG. 18A shows examples of how the contact area of various fingers changed according to increased pressure. The curves in FIG. 18A correspond to the left and right thumbs (LT and RT) of three different individuals (J, M and H). In these examples, J_RT and J_LT correspond to normal fingers, M_RT and M_LT correspond to worn fingers, and H_RT and H_LT correspond to dry fingers. It may be seen in FIG. 18A that the contact area generally increased with increased pressure, as described above. However, each finger responded to the increased pressure in a different manner. It may be seen in FIG. 18A, for example, that the contact areas of these digits vary substantially at the same pressure levels. For example, the H_RT curve indicates a contact area slightly above 50% at an applied pressure of 100 grams, whereas the contact areas of the curves M_RT, M_LT and H_LT indicate contact areas slightly below 30% at an applied pressure of 100 grams.

It also may be seen in FIG. 18A, that the slopes of the H_RT curve and the H_LT curve increased as the pressure increased from 200 to 300 grams. Both of these curves are concave upwards. In contrast, the slope of the J_LT curve was generally constant in a pressure range from 10 to 300 grams. The slope of the J_RT curve changed significantly in this pressure range, producing a concave downwards curve. The curves shown in FIG. 18B show the above-described contact area changes as a function of pressure. As shown in FIGS. 18A and 18B, these changes are characteristic to particular digits and can change significantly between individuals and also between digits of the same individual.

FIG. 18C shows examples of how the void-to-ridge ratio of fingerprint images changes as a function of applied pressure. A fingerprint "void" is also referred to herein as a fingerprint valley. The curves in FIG. 18C correspond to the left and right thumbs (L and R) of the individuals J, M and H. The values shown in FIG. 18C, as well as the slope changes, are characteristic to particular digits. Both the values and the slopes can change significantly between individuals and between digits of the same individual.

According to some examples, the anti-spoofing process may involve a process of estimating a target object material property. In some such examples, the material property of the target object may be based on the slope of one of more of the graphs shown in FIGS. 18A, 18B and 18C. For example, the slope in FIG. 18A indicates how much a finger deforms when an applied force is increased. The stiffer the finger is, the smaller the deformation is. Normally, there is a positive correlation between stiffness and the dryness of a finger. By tracking this information, further we can derive the material properties, such as Young's modulus and Poisson's ratio. With the same nominal force, the change of contact area indicates the strain on the skin. The strain-stress ratio can be calculated to indicate the relative value of Young's modulus. The ratio of transverse strain (which can be estimated by the contact area change) and the axial strain (which can be estimated by the depth information extracted from a subdermal scan) is used to obtain Poisson's ratio.

Figure 19:
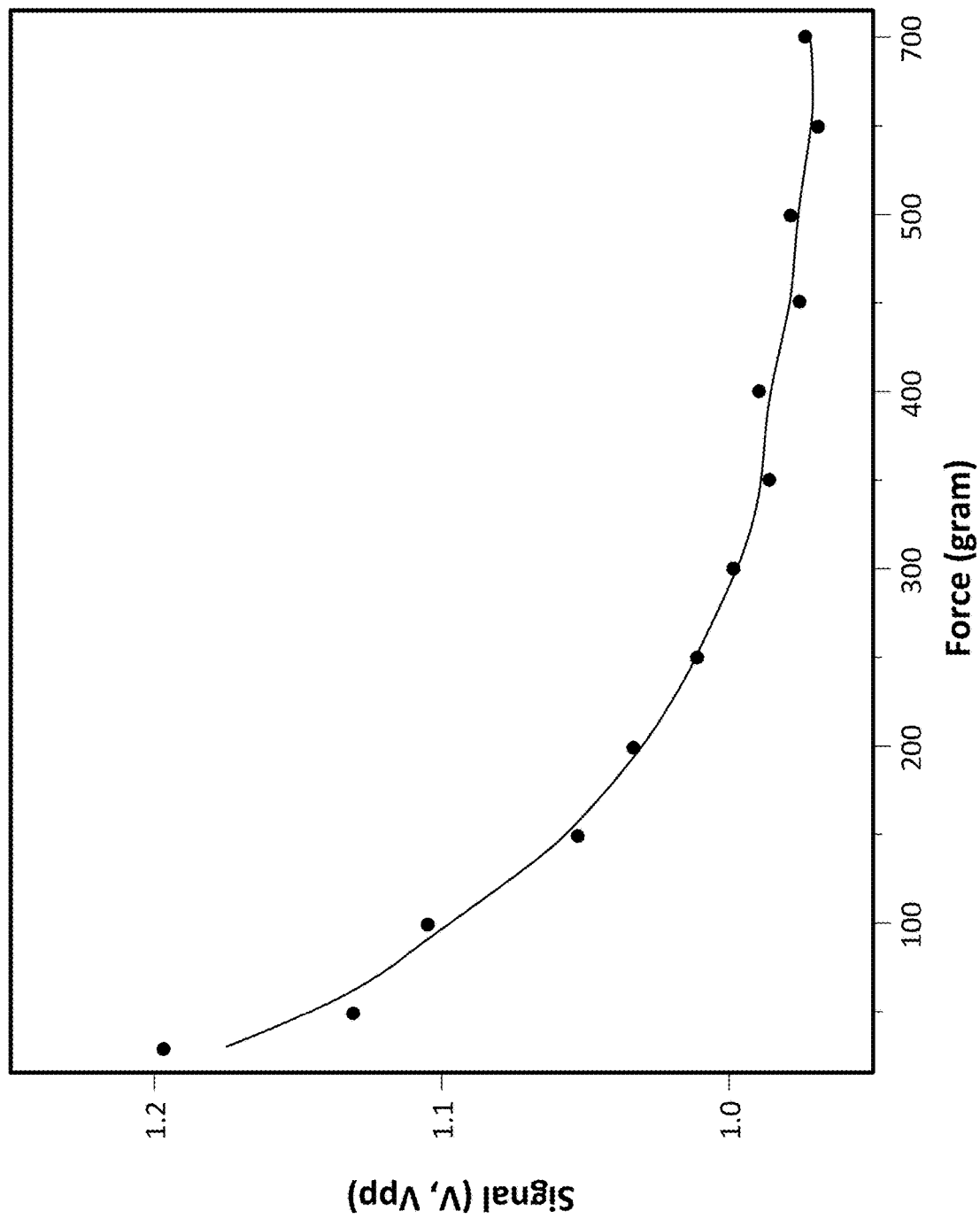
FIG. 19 is a graph that shows changes in received signal strength according to changes in the force applied to a finger on an ultrasonic sensor according to some examples.

FIG. 19 is a graph that shows changes in received signal strength according to changes in the force applied to a finger on an ultrasonic sensor according to some examples. In the examples depicted in FIG. 19, the ultrasonic sensor system used for the scans was of the general type shown in FIG. 2. Accordingly, in this example the ultrasonic sensor system 102 included a piezoelectric layer 208, an electrode layer 210 on one side of the piezoelectric layer 208 and an array of sensor pixels 206 on a second and opposing side of the piezoelectric layer 208. In these examples, the ultrasonic signals corresponding to the ultrasonic scans were obtained via "direct sampling": instead of reading out the signal from each individual sensor pixel of the array of sensor pixels 206, the reflected ultrasonic waves were received via the electrode layer 210. In the example shown in FIG. 19, the horizontal axis indicates force in gram-force units and the vertical axis indicates signal strength, with "V" representing voltage and "Vpp" representing peak-to-peak voltage. Each data point shown in FIG. 19 corresponds to an average values from 6 independent tests. The signal strength shown in FIG. 19 indicates the signal reflection from the finger/platen interface. The larger the contact force, the larger the contact area corresponding to fingerprint ridges and therefore the smaller returning signal from the finger/platen interface.

Figure 20:
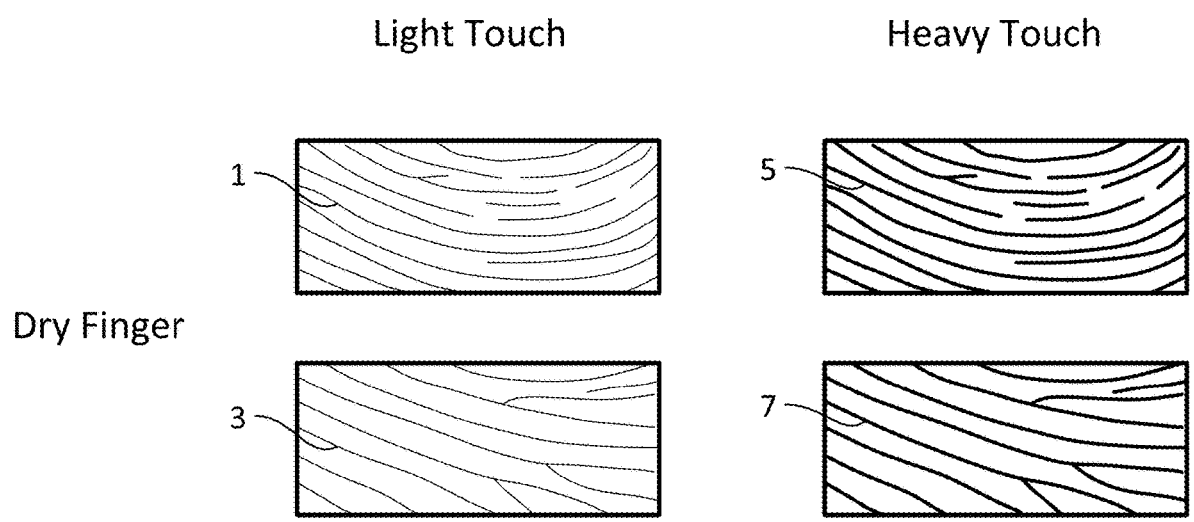
FIG. 20 shows examples of fingerprint images obtained from a dry finger by an ultrasonic fingerprint sensor.

FIG. 20 shows examples of fingerprint images obtained from a dry finger by an ultrasonic fingerprint sensor. In these examples, image 1 and image 5 are from the same portion of the finger. Image 3 and image 7 both correspond to another portion of the finger. Images 1 and 3 were obtained when the finger was lightly touching the surface of the ultrasonic fingerprint sensor, whereas images 5 and 7 were obtained when the finger was pressed against the surface of the ultrasonic fingerprint sensor with a relatively larger force. In these examples, the light touches correspond to approximately 30 gram-force and the heavier touches correspond to 100 gram-force or more.

Figure 21:
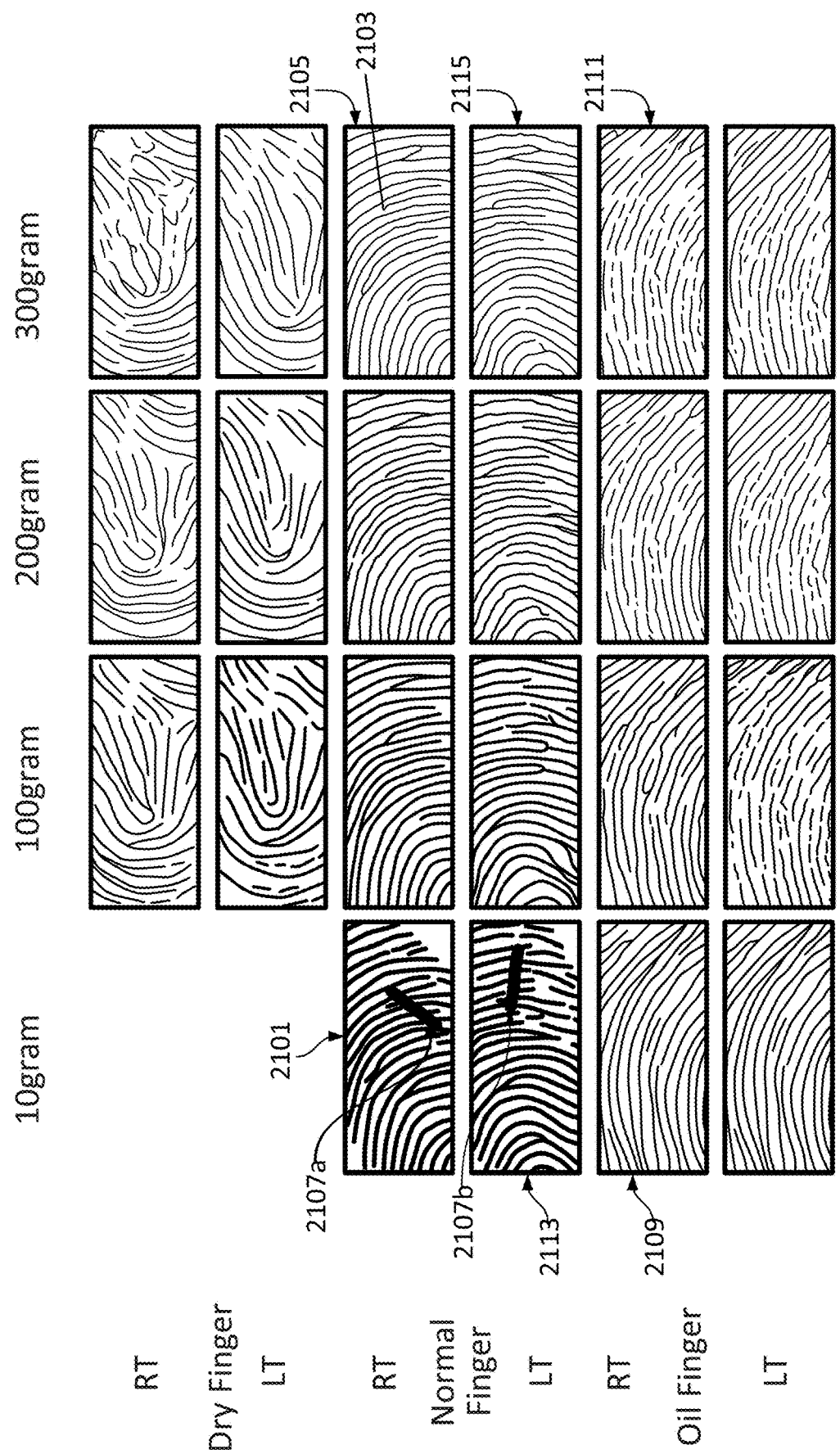
FIG. 21 shows examples of fingerprint images and corresponding forces.

FIG. 21 shows examples of fingerprint images and corresponding forces. The indicated forces are in gram-force units. Despite the fact that grams are actually units of mass, not force, the discussion in this disclosure may refer to forces or pressures as being in "grams" for convenience and economy of language. In FIG. 21, "RT" means right thumb and "LT" means left thumb.

In FIG. 21, the relatively darker portions of the images correspond to areas with relatively higher-amplitude reflections. As noted above, the relatively higher-amplitude reflections will generally correspond to air/platen or, more generally, air/outer surface interfaces, which will occur when a fingerprint valley is adjacent the outer surface. The relatively higher-amplitude reflections occur because the air/outer surface interfaces have higher acoustic impedance contrasts than the skin/outer surface interfaces that will be created when a fingerprint ridge is in contact with the outer surface.

One may see that the image 2101 has a much higher percentage of dark regions than image 2105. This is because image 2101 was obtained when a normal right thumb was pressing on the outer surface with a force of 10 grams, whereas image 2105 was obtained when a normal right thumb was pressing on the outer surface with a force of 300 grams. In the latter case, the fingerprint ridges are responding to the applied force by appearing to spread out laterally, in part because portions of the fingerprint ridges that were not contacting the surface when a lower force was applied are now being pressed against the surface. The result is that the image 2105 was obtained when a relatively higher percentage of the image corresponded to fingerprint ridge/outer surface interfaces, which correspond to the lighter regions of image 2105.

The above-described effect may not be as pronounced for oily fingers. For example, referring to the right thumb "oil finger" example of FIG. 21, one may observe that while image 2109 has a slightly higher percentage of dark areas as compared to image 2111, the difference is not nearly as great as the difference between image 2101 and image 2105.

As shown in FIG. 21, some fingerprint image features may be clearer when a larger force is being applied. For example, the termination 2103 is more clearly shown in image 2105 than in image 2101.

However, other fingerprint image features may be clearer when a smaller force is being applied. For example, the fold 2107*a* is prominent in image 2101, but is not prominent in image 2105. Similarly, the fold 2107*b* is readily observable in image 2113, but is not prominent in image 2115.

According to some disclosed implementations, an anti-spoofing process may be based on one or more of the features, or other aspects, of a fingerprint image that change according to pressure. In some such implementations, a fingerprint enrollment process may involve obtaining ultrasonic fingerprint image data for the same portion of a finger at multiple different applied forces. For example, after obtaining a first set of ultrasonic fingerprint image data at a first measured (or estimated) force from a portion of a user's finger, the user could be prompted (e.g., via text and/or an image provided on a display and/or via an audio prompt provided via a speaker) to press down the same portion of the finger more firmly against an outer surface of an ultrasonic fingerprint sensor surface (or a surface of a device proximate an area in which the ultrasonic fingerprint sensor resides). A second applied force could be measured (or estimated) and a second set of ultrasonic fingerprint image data could be obtained from the same portion of the user's finger. In some instances, the process could be repeated in order to obtain third, fourth and/or fifth sets of ultrasonic fingerprint image data when the finger is being pressed against the outer surface with third, fourth and/or fifth measured or estimated forces. According to some implementations, the process could be repeated for multiple digits of the user during the enrollment process.

As described above with reference to FIG. 21, an enrollment process that involves obtaining fingerprint image data when two or more different forces are being applied may reveal characteristics of a finger that would be difficult to spoof. For example, if a hacker were in possession of an image like that of image 2105, the hacker would not be able to successfully represent the fold 2107*a* shown in image 2101. Similarly, if a hacker were in possession of the image 2115, the hacker would not be able to successfully represent the fold 2107*b* shown in image 2113.

During a "run time" operation after successful completion of the enrollment process, an anti-spoofing process may be based, at least in part, on data obtained during the enrollment process. In some instances, the anti-spoofing process may also be based, at least in part, on a first fingerprint image of a target object corresponding to first ultrasonic receiver signals and/or a second fingerprint image of the target object corresponding to second ultrasonic receiver signals. Some anti-spoofing processes may involve obtaining a third fingerprint image of the target object corresponding to third ultrasonic receiver signals. In some instances, the target object may be a finger. In some implementations, the anti-spoofing process may be based, at least in part, on measured or estimated forces of the finger against the outer surface at the times that the ultrasonic receiver signals are obtained.

For example, some examples of method 300 and/or method 750 may involve measuring and/or estimating a first force corresponding to the first ultrasonic receiver signals and measuring and/or estimating a second force corresponding to the second ultrasonic receiver signals. In some such examples, method 300 and/or method 750 may involve controlling a display and/or a speaker to provide a prompt to apply a different force after measuring and/or estimating the first force.

Figure 22A:
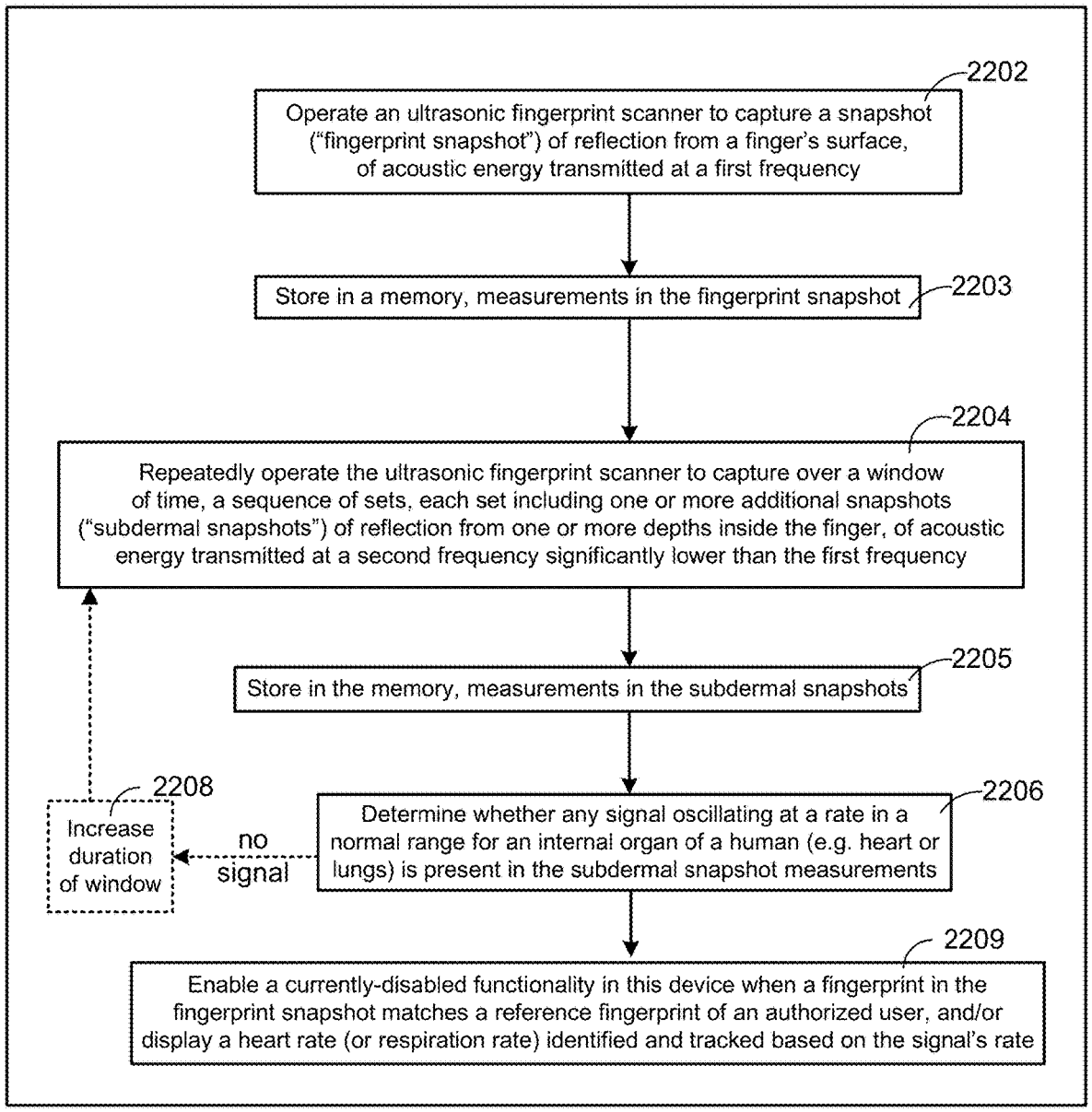
FIG. 22A illustrates an example implementation of measuring heart rate and respiration rate using an ultrasonic fingerprint sensor, according to some aspects of the present disclosure.

FIG. 22A illustrates an example implementation of measuring heart rate and respiration rate using an ultrasonic fingerprint sensor, according to aspects of the present disclosure. In this example, a sequence of sets of one or more snapshots (or ultrasound images) at one or more depths within a user's finger may be captured sequentially in time by the ultrasonic fingerprint sensor, and a controller may be configured to use changes over time in the sequence of sets, due to movements of one or more subdermal structures in the user's finger, to determine the user's heart rate and/or respiration rate.

In one embodiment, control system 106 (see FIG. 1B) responds to placement of a user's finger adjacent to an ultrasonic fingerprint sensor area of apparatus 101 by operating the ultrasonic fingerprint sensor. Specifically, the ultrasonic fingerprint sensor is operated to transmit acoustic energy at a first frequency toward a surface of the finger (e.g., see block 2202A in FIG. 22C) and capture one or more initial snapshots (also called "fingerprint snapshots") of one or more reflections of the acoustic energy from the finger's surface (e.g., see block 2202B in FIG. 22C). Depending on the embodiment, the ultrasonic fingerprint sensor may be operated indirectly by control system 106 sending commands to fingerprint sensor system 102 of FIG. 1B. In some embodiments, acoustic energy may be transmitted by the ultrasonic fingerprint sensor as an unmodulated pulse having a predetermined number of cycles of a sine wave at the first frequency. The just-described operation, which may be performed by control system 106 in some embodiments of apparatus 101, is illustrated by block 2202 in FIG. 22A (which may be implemented as blocks 2202A and 2202B in FIG. 22C).

Figure 22B:
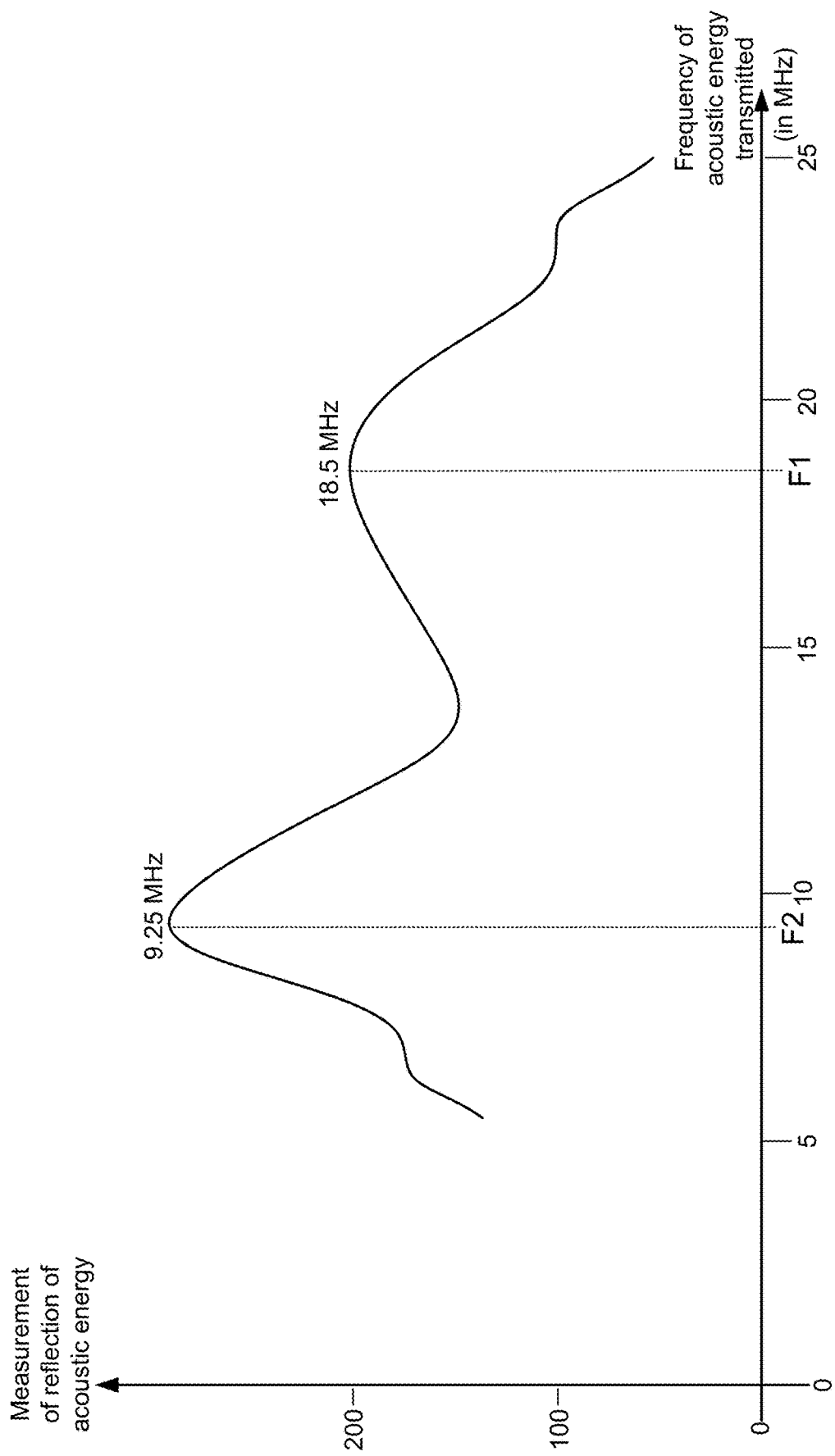
FIG. 22B is a graph of reflected acoustic energy versus frequency according to one example.
Figure 22C:
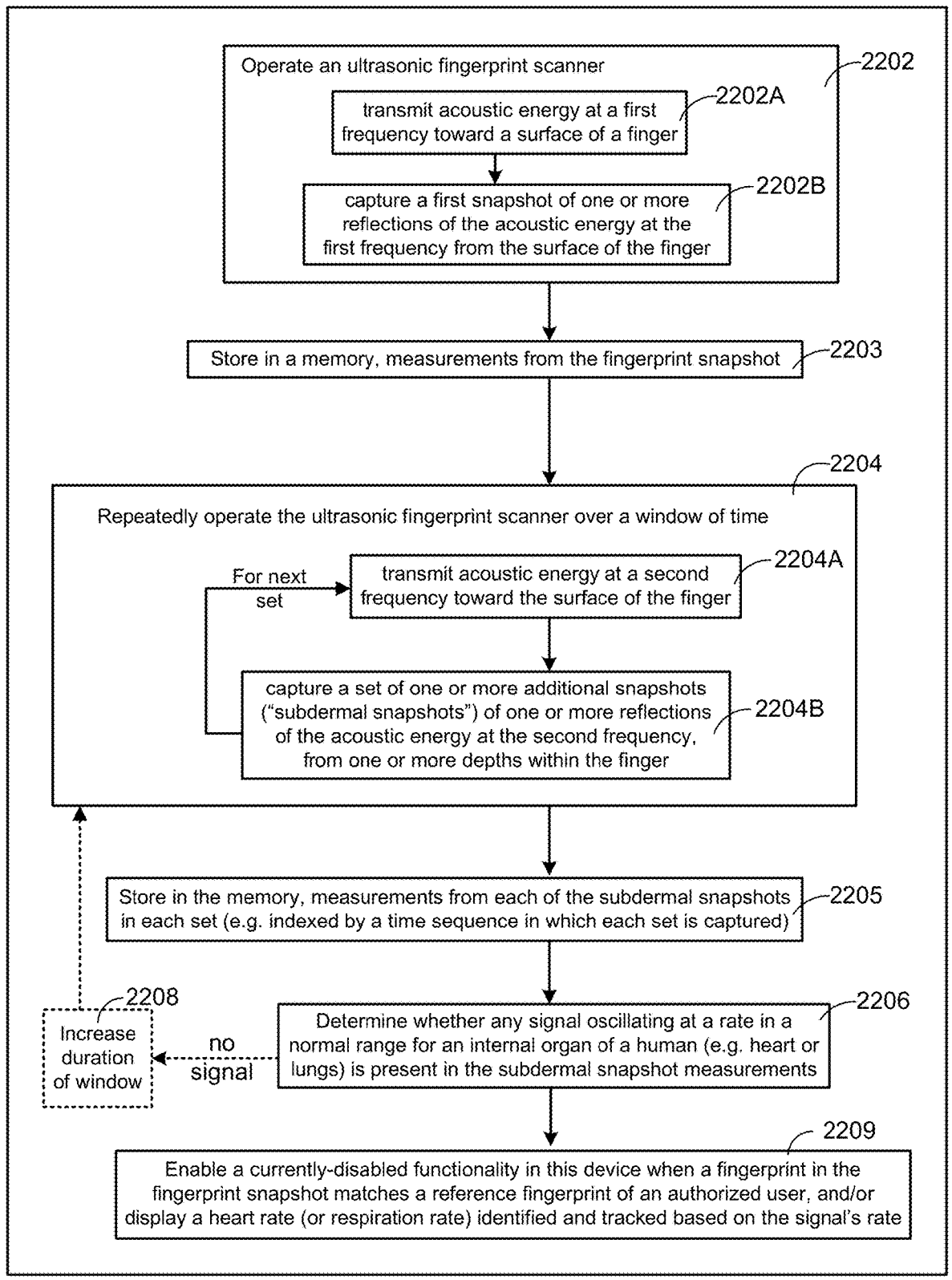
FIG. 22C shows details of some blocks of FIG. 22A, according to some aspects of the present disclosure.

The first frequency specified by control system 106 in block 2202 may be determined ahead of time in some embodiments to be high enough for acoustic energy sensed in the ultrasonic fingerprint sensor's pixel circuits, at (x,y) locations in a two-dimensional array (e.g., 80×180 in size), as measurements that have sufficient spatial resolution to identify lines representing ridges and valleys on the finger's surface. One embodiment of control system 106 specifies in block 2202, as the ultrasonic transmitter's frequency, a frequency F1 (e.g., 18.5 MHz as illustrated in FIG. 22B) which is experimentally determined, based on occurrence of a local maxima in a graph of signal strength (measured in reflection of acoustic energy) on the y-axis and frequency of the acoustic energy transmitted on the x-axis (see FIG. 22B). In some implementations, control system 106 may be configured to obtain the ultrasonic transmitter's frequency specified in block 2202, based on variation of a current temperature from a reference temperature at which an initial value for frequency F1 is experimentally determined (e.g., 18.5 MHz as illustrated in FIG. 22B).

Moreover, to capture the initial snapshots in block 2202, control system 106 may specify a time delay (also referred to as range gate delay) between operating the ultrasonic receiver 103 and the ultrasonic transmitter 102, based on an amount of time needed for sound to travel a first distance from the ultrasonic transmitter to the finger's surface (which may be placed on a surface of a platen or in another area of the outer surface of the apparatus 101), and a second distance from the finger's surface to the ultrasonic receiver.

On completion of block 2202, measurements by the ultrasonic fingerprint sensor which are included in one or more initial snapshots, may be stored in a memory of apparatus 101. The just-described storage operation, which may be performed by control system 106 in some embodiments of apparatus 101, is illustrated by block 2203 in FIG. 22A. Also, control system 106 may be configured to process the one or more initial snapshot(s) in a memory of apparatus 101 in a normal manner, e.g., to extract a fingerprint therefrom, and compare the extracted fingerprint to a reference fingerprint of an authorized user. If the extracted fingerprint matches the reference fingerprint, control system 106 may authenticate the user and enable the user to gain access to apparatus 101. In addition to authenticating a user based on an extracted fingerprint, certain embodiments of control system 106 may be configured to determine liveness of the user's finger (e.g., find a signal oscillating at a heart rate or at a respiration rate) as described herein, before enabling access to apparatus 101.

Additionally, control system 106 may be configured to further operate the ultrasonic fingerprint sensor repeatedly (as illustrated by block 2204 in FIG. 22A), to capture over a window of time (e.g., of 3 seconds duration), a sequence of sets, each set including one or more additional snapshots ("subdermal snapshots") of reflection from one or more depths within the user's finger, of acoustic energy transmitted (e.g., also as an unmodulated pulse having a predetermined number of cycles of a sine wave) at a second frequency by the ultrasonic fingerprint sensor. The just-described operation, which may be performed by control system 106 in some embodiments of apparatus 101 is illustrated by block 2204 in FIG. 22A (which may be implemented as blocks 2204A and 2204B in FIG. 22C).

In block 2204 in FIG. 22A (and more particularly in block 2204A in FIG. 22C), control system 106 is configured to not specify the first frequency (which is specified in block 2202), because any reflections of acoustic energy at the first frequency from the one or more subdermal structures in the finger have intensities at the ultrasound receiver that are too low to be distinguishable from noise. Specifically, there is a tradeoff between resolution and scan depth: to obtain better resolution, the frequency needs to be increased, however, as the frequency increases the SNR decreases (the signal is attenuated) and the acoustic energy cannot travel deeper into the finger. Hence, control system 106 is configured, in some embodiments, to specify in block 2204 a second frequency that is sufficiently low for the reflections of acoustic energy from the one or more subdermal structures to have intensities at the ultrasound receiver sufficiently high to be distinguishable from noise.

The second frequency specified by control system 106 in block 2204 in FIG. 22A (and more particularly in block 2204A in FIG. 22C), may be determined ahead of time in some embodiments to be significantly lower (e.g., more than 30% lower, or in some embodiments even more than 40% lower) than the first frequency used in block 2202. In several embodiments, the second frequency is predetermined to be low enough for acoustic energy to pass through skin and reach subdermal structures within the finger. One embodiment of control system 106 specifies in block 2204, as the ultrasonic transmitter's frequency, a frequency F2 (e.g., 9.25 MHz illustrated in FIG. 22B) which is also experimentally determined, based on occurrence of another local maxima in the graph of signal strength (measured in reflection of acoustic energy) on the y-axis and frequency of the acoustic energy transmitted on the x-axis (see FIG. 22B). In the specific embodiment illustrated in FIG. 22B, frequency F2 (which is used to determine oscillation of an internal organ) is precisely half of the frequency F1 (which is used to create a fingerprint), although this relationship between these two frequencies is approximate in other embodiments. In a manner similar or identical to block 2202, some implementations of control system 106 may be additionally configured to obtain the ultrasonic transmitter's frequency specified in block 2204, based on variation of the current temperature from a reference temperature at which the initial value for frequency F2 is experimentally determined (e.g., 9.25 MHz illustrated in FIG. 22B).

Moreover, to capture the additional snapshots in block 2204, control system 106 may specify one or more time delays (or range gate delays), based on an amount of time needed for sound to travel a first distance from the ultrasonic transmitter to one or more depths in the finger, and a second distance from the one or more depths in the finger to the ultrasonic receiver. The one or more depths in the finger may be selected to be, for example, in a range centered at half the thickness of a human finger (e.g., 4 mm), with the range having a width also of half the thickness of the human finger (e.g., 4 mm also). The number of depths used in block 2204 may be configured ahead of time, e.g., based on computational power and memory of apparatus 101.

In some embodiments, control system 106 may be implemented with a system clock of 128 MHz, and may be configured to convert each depth to a time delay (or range gate delay, abbreviated as RGD) based on speed of sound at 1500 meters per second as follows:

Depth [mm]=RGD/2/128 [MHz]*1500 [m/s]*1e3

RGDs=[500,1100]

Depth [mm]=[500,1100]/2/128e6*1500*1e3=
[2.9,6.4]

The values 500 and 1100 of RGD shown above are numbers of cycles, of a clock oscillating at 128 MHz. However, it should be recognized that any suitable clock speed may be used to determine the RGD and that some device materials may have an average speed of sound that is greater or less than 1500 meters per second. In an illustrative embodiment, control system 106 uses an RGD of 650-800 corresponding to a depth in the range of ~4-4.5 mm. The just-described values of 650 and 800 are also expressed in number of clock cycles at 128 MHz. Some embodiments may use an RGD in the range of 4.5-8 μsec.

On completion of one or more loops of operation of block 2204, measurements by the ultrasonic fingerprint sensor, which are included in one or more additional snapshots, may be stored in a memory of apparatus 101. The just-described storage operation, which may be performed by control system 106 in some embodiments of apparatus 101 is illustrated by block 2205 in FIG. 22A.

Control system 106 may, in some examples, be configured to process the one or more additional snapshot(s) in a memory of apparatus 101 in block 2206 (FIG. 22A), to determine whether any signal oscillating at a rate in a predetermined range for an internal organ of a human is present. In one illustrative example, the internal organ is a heart, and the predetermined range may be selected to have a lower limit of 40 beats per minute (or 40 cycles per minute) and an upper limit of 200 beats per minute (or 200 cycles per minute). In another illustrative example, the internal organs are human lungs, and the predetermined range may be selected to have a lower limit of 8 breaths per minute (or 8 cycles per minute) and an upper limit of 40 breaths per minute (or 40 cycles per minute). Other examples of predetermined ranges for a human organ as described herein may use lower limits and upper limits that approximate the just-described values, for example to within 10%. Depending on the embodiment, control system 106 may be configured to respond to finding a signal in block 2206, by using the signal's oscillation rate in several ways as per block 2209 in FIG. 22A. For example, block 2209 may enable functionality that is currently disabled in apparatus 101 (such as turning on power to display system 108 in FIG. 1B), when a fingerprint in an initial snapshot (see block 2202) is found to match a reference fingerprint of an authorized user, or to identify and track (and in some embodiments, show on display system 108) as a current value of the user's heart rate (or respiration rate), the signal's oscillation rate.

In some implementations, when control system 106 finds no signal in block 2206, control system 106 is configured to operate block 2208 in which duration of the above-described window (see block 2204) is increased, e.g., by 1 second. When block 2206 is again operated, on measurements captured over the increased duration window, control system 106 may find a signal. The just-described loop, between blocks 2208, 2204, 2205 and 2206 may be repeated a predetermined number of times (e.g., 9 times) to reach a final window size (e.g., of 12 seconds). If control system 106 does not detect a signal (or a predetermined number of signals) during the loop, control system 106 may determine that the object placed proximate to the fingerprint sensor is not a live finger or extremity (in other words, the object is a spoof). However, if control system 106 detects a signal (or a predetermined number of signals) in one or more of the loops, control system 106 may determine that the object placed proximate to the fingerprint sensor is a live finger of the user. In some embodiments, a control system 106 that operates one or more of blocks 2202-2209 in FIG. 22A supports (and is used to implement), means for controlling the operations of the mobile device and the ultrasonic fingerprint sensor and/or means for controlling the operations of the methods described herein.

Figure 23:
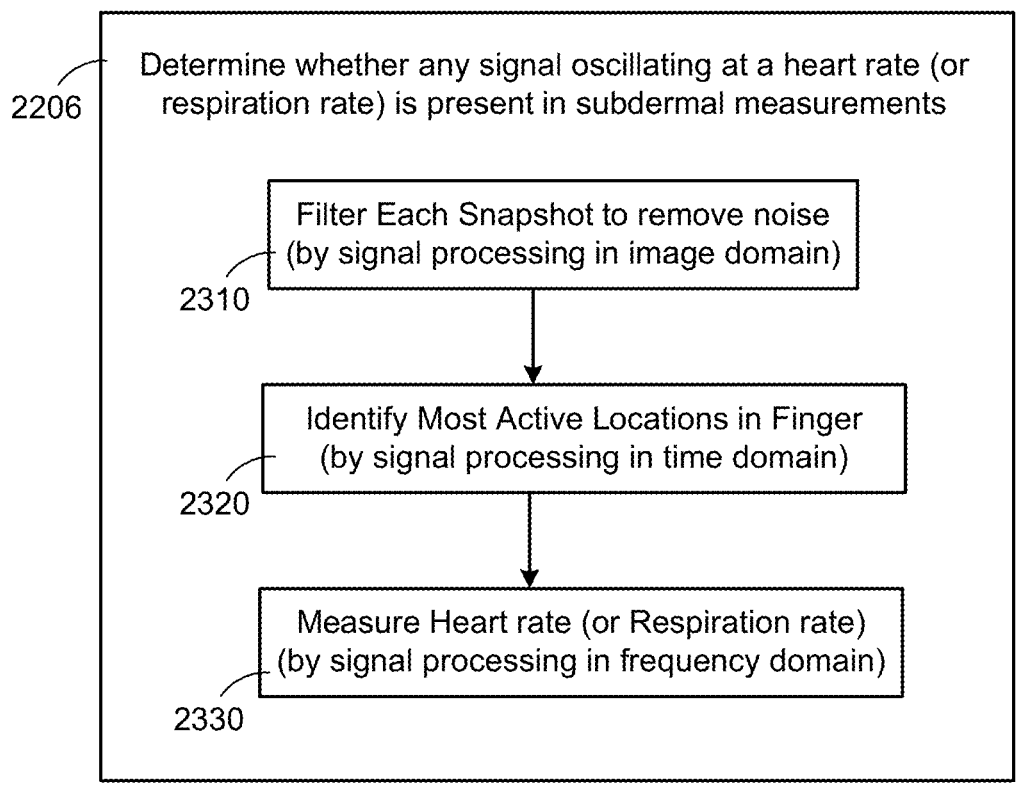
FIG. 23 shows details of block 2206 of FIG. 22A, according to some aspects of the present disclosure.

In some embodiments of control system 106, block 2206, which involves determining whether any signal oscillating at a heart rate (or respiration rate) is present in the additional measurements (captured in block 2204), may be operated by operating one or more of blocks 2310-2330 illustrated in FIG. 23. Specifically, in block 2310, control system 106 may be configured to filter each snapshot to remove noise (e.g., by signal processing in image domain). Thereafter, in block 2320, control system 106 may be configured to identify most active locations (wherein blood flow is likely) in the finger (e.g., by signal processing in time domain). Finally, in block 2330, control system 106 may be configured to measure heart rate or respiration rate (e.g., by signal processing in frequency domain).

Figure 24:
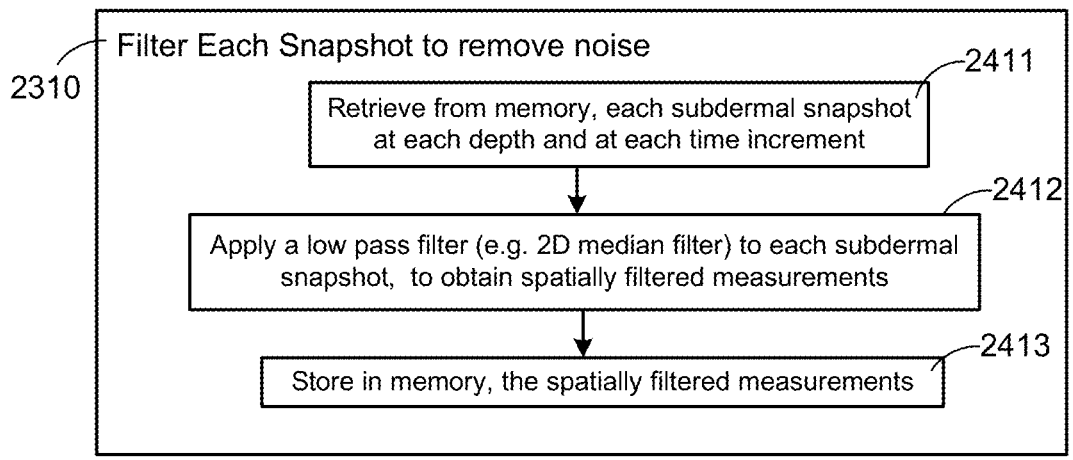
FIG. 24 shows details of block 2310 of FIG. 23, according to some aspects of the present disclosure.

Control system 106 may be configured to operate block 2310 (FIG. 23) by operating one or more of blocks 2411-2413 (FIG. 24) as follows. In block 2411, control system 106 may be configured to retrieve, from a memory of apparatus 101, all snapshots within a time window (e.g., of 3 seconds in duration) that have been stored by block 2205 (FIG. 22A). In block 2412, control system 106 may be configured apply a low pass filter, such as a 2D median filter, to each snapshot, to obtain spatially filtered measurements. In block 2413, control system 106 may be configured to store in a memory of apparatus 101, the spatially filtered measurements obtained by block 2412.

As noted above in reference to block 2204 (see FIGS. 22A and 22C), the ultrasonic fingerprint sensor may be operated repeatedly over a window of time, to capture a sequence of sets, and each set may include one or more snapshots at each of one or more depths (e.g., measured along z axis). Hence, measurements in the sequence may be indexed by time across the snapshots, e.g., at a specific location in the finger whose x,y coordinates are determined by a specific pixel circuit that measures acoustic energy at an (x,y) location in a two-dimensional array in the ultrasound receiver, and whose z coordinate is determined by depth in the finger (in turn determined by a time delay, also referred to as range gate delay). Thus, for each (x, y, z) location which is sampled in the finger (also called "subdermal location"), a memory of apparatus 101 contains a sequence of measurements indexed by time, which is stored by block 2205 (e.g., see FIG. 22C). Additionally, at each (x, y, z) location sampled in the finger, there may be a sequence of spatially filtered measurements indexed by time, which may be stored in a memory of apparatus 101 by block 2413 (if operated, depending on the embodiment).

Figure 25:
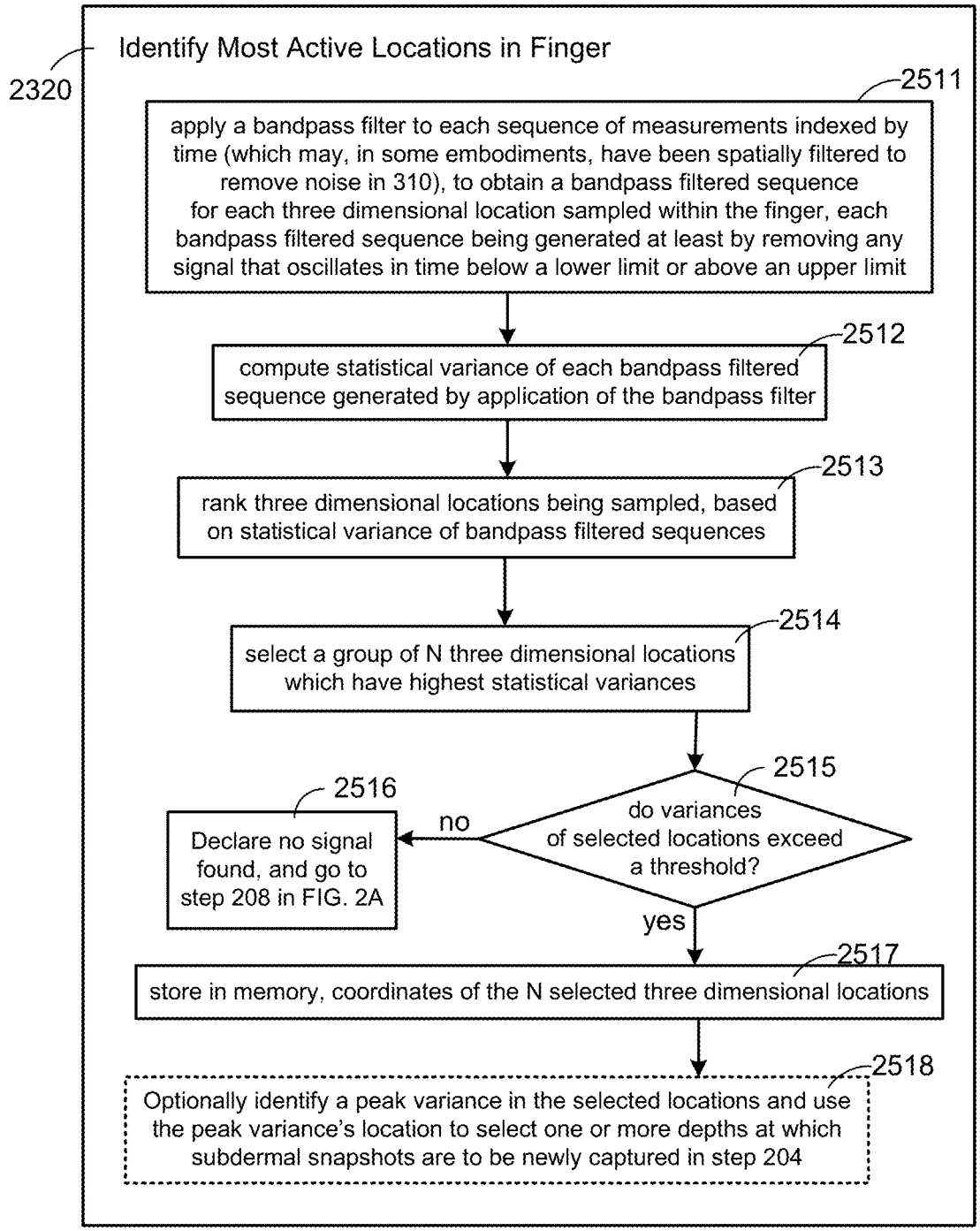
FIG. 25 shows details of block 2320 of FIG. 23, according to some aspects of the present disclosure.
Figure 26:
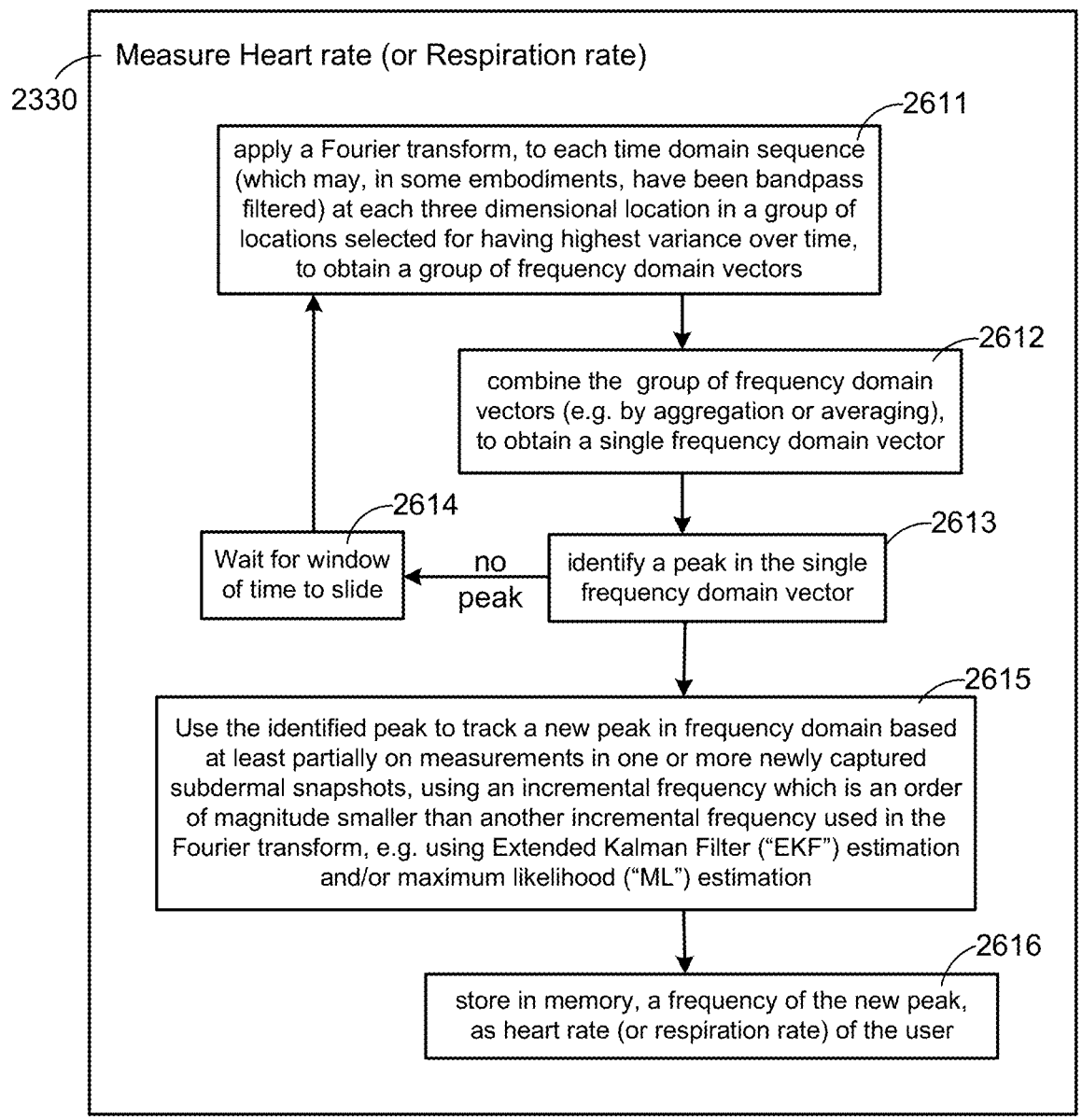
FIG. 26 shows details of block 2330 of FIG. 23, according to some aspects of the present disclosure.

In some embodiments, control system 106 may be configured to operate block 2320 (FIG. 23) by operating one or more of blocks 2511-2517 and optional block 2518 (FIG. 25) as follows. In block 2511, control system 106 may be configured to apply a bandpass filter to each sequence of measurements indexed by time (which may, in some embodiments, have been spatially filtered to remove noise in block 2310). The result of operation of block 2511 is a bandpass filtered sequence for each location sampled within the finger, and each bandpass filtered sequence may be generated at least by removing (or reducing the amplitude of) any signal that oscillates in time below a lower limit or above an upper limit.

In one illustrative embodiment, control system 106 operates block 2511 to determine whether any signal oscillating at a human heart rate is present, and in some examples may use 40 beats per minute as the lower limit of the bandpass filter and 200 beats per minute as the upper limit. In another illustrative embodiment, control system 106 may operate block 2511 to determine whether any signal oscillating at a human respiration rate is present, and in some examples may use 8 breaths per minute as the lower limit of the bandpass filter and 40 breaths per minute as the upper limit.

In still another embodiment, block 2206 (see FIG. 22A) may be implemented to contain therein two parallel branches that are respectively used to determine heart rate and respiration rate simultaneously. In one such example, these two parallel branches start in a common block 2310, followed by two copies of block 2320 to identify two different sets of most active locations in the finger (see FIG. 23) for use in determining heart rate and respiration rate respectively (e.g., by applying two bandpass filters, with corresponding predetermined ranges of 40-200 cycles per minute and 8-40 cycles per minute). The two copies of block 2320 may be followed by corresponding two copies of block 2330 used to find respective peaks in the frequency domain, thereby to identify the heart rate and respiration rate. In one such embodiment, a time window may be 8 seconds in duration, and both heart rate and respiration rate may be determined simultaneously, from a common set of measurements. In such an embodiment, heart rate may be determined as soon as measurements are accumulated for 3 seconds, although determination of respiration rate may require additional time (e.g., an additional 5 seconds) so that sufficient measurements are accumulated in the time window (e.g., of 8 seconds). In other embodiments, a different time window may be used (e.g., 16 seconds) to provide sufficient time to measure the respiratory rate.

Yet another embodiment may be configured to operate block 2206 (and therefore block 2320) twice, a first time to determine heart rate and a second time to determine respiration rate, and these rates may be determined based on measurements in respective time windows that do not overlap one another.

In many such embodiments, wherein signals of both heart rate and respiration rate are determined from subdermal snapshots in a finger, most of the blocks and operations described herein may be operated and/or performed similarly or identically to one another, except for the above-noted difference in upper and lower limits of the predetermined ranges.

In block 2512, control system 106 may be configured to compute variance of each bandpass filtered sequence generated in block 2511, by application of the bandpass filter. For example, in one illustrative embodiment, control system 106 computes variance as follows:

$$\frac{1}{T}\sum_{t=0}^{T-1}(x[t]-\mu_x)^2$$

where T represents the number of samples (or measurements) in a sequence along the time axis, t. Thereafter, in block 2513, control system 106 may rank the subdermal locations being sampled (or probed), based on variance of corresponding bandpass filtered sequences, which is computed in block 2512. Next, based on the rank ordering in block 2513, control system 106 may select (in block 2514) a predetermined number N of subdermal locations (e.g., 1000 subdermal locations), which have the highest statistical variances (and hence may be most active).

Thereafter, in block 2515, control system 106 may be configured to perform a test (e.g., check if variances of the N selected locations exceed a threshold or other such test) related to noise. If the test in block 2515 is not met, block 2516 may be operated to declare that no signal is found, followed by going to block 2208 (see FIG. 22A, described above). If the test in block 2515 is met, block 2517 may be operated, to store in a memory of apparatus 101, coordinates of the N selected locations. Finally, in an optional block 2518, the N selected locations may be used to identify location of peak variance, and the peak variance's location may be used to select a central depth and one or more depths around the central depth, for use in operating the ultrasound receiver to capture subdermal snapshots in a next operation of block 2204 (see FIG. 22A, described above). In such embodiments, an initial set of depths may be predetermined to be in the range [−450,150] around a center RGD of ~650, in blocks of 50 or less.

Control system 106 may be configured to operate block 2330 (FIG. 23) by operating one or more of blocks 2611-2616 (FIG. 6) as follows. In block 2611, control system 106 may be configured to apply a Fourier transform, to each time domain sequence (which may, in some embodiments, have been bandpass filtered in block 2511 as described above) at each subdermal location in the N subdermal locations selected for having highest variance over time (e.g., as described above in block 2514 (FIG. 25). On completion of block 2611, control system 106 may obtain N frequency domain vectors. Thereafter, in block 2612, control system 106 may be configured to combine the N frequency domain vectors, e.g., by aggregation (or by averaging), to obtain a single frequency domain vector. Subsequently, in block 2613, control system 106 may be configured to identify a peak in the single frequency domain vector. The peak may be tested in block 2613 to determine whether the peak has sufficient signal-to-noise ratio, and if not then control system 106 may go to block 2614 to wait for a new set of subdermal snapshots to become available (e.g., by sliding the time window forward, when an iteration of sampling is completed).

In some embodiments, block 2613 may involve calculating an estimated signal-to-noise ratio and a quality factor, to determine the presence of a peak (and hence a signal oscillating at a rate in the predetermined range for an internal organ of a human, as per block 2206), e.g., based on the following formulae.

Peak $\triangleq Y(f=f_c)$

Noise $\triangleq Y(f \neq f_c)$ $$SNR_{est} = \frac{Peak^2}{MeanNoise^2} \cdot \frac{\pi}{2N_{fft}}$$

-continued $$QF_{est} = \frac{Peak - Mean(Noise)}{Std(Noise)}$$

When a peak is found, in some embodiments, control system 106 may be configured to operate block 2615, wherein the identified peak is used to track a new peak in the frequency domain. The tracking in block 2615 may, for example, be performed in the frequency domain on measurements in one or more newly captured subdermal snapshots, using an incremental frequency which is an order of magnitude smaller than another incremental frequency used in the Fourier transform, e.g., using Extended Kalman Filter ("EKF") estimation and/or maximum likelihood ("ML") estimation. A frequency of the new peak obtained by tracking in block 2615 may be stored in block 2616 by control system 106 in a memory of apparatus 101, for use as a heart rate of the user (or a respiration rate of the user), e.g., in block 2209 (FIG. 22A).

The frequency stored in a memory of apparatus 101 by block 2616 may be shown, in some embodiments, on display system 108 of apparatus 101 (FIG. 1B), e.g., as a heart rate or a respiration rate. Depending on the embodiment, the frequency stored in a memory of apparatus 101 by block 2616 may be used by control system 106 to determine liveness and based thereon enable power to display system 108, as described above. In some embodiments, a time window of at least 3 seconds in duration is used to determine heart rate as described above. Hence, after a finger is placed on an outer surface of an apparatus in an ultrasonic fingerprint sensor system area in such embodiments, a pulse of low ultrasound frequency may be repeatedly transmitted towards the finger for at least a time interval (e.g., a time interval of 3 seconds) before the display is powered up and heart rate displayed thereon (if the user's fingerprint is determined to be authentic).

In some embodiments, block 2615 may be configured to calculate estimates using a quadratic interpolation method, e.g., based on a peak and its two nearest samples as follows:

$y1 = Xa(k-1);$ $y2 = Xa(k);$ $y3 = Xa(k+1);$ $d = (y3-y1)/(2*(2*y2-y1-y3));$ $f\_interp = f(k)+d*df;$ where:

k represents the peak index;
Xa(k) represents the peak value;
f(k) represents the frequency of the peak;
df represents the frequency spacing; and
f_interp represents the final interpolated frequency.

Figure 27:
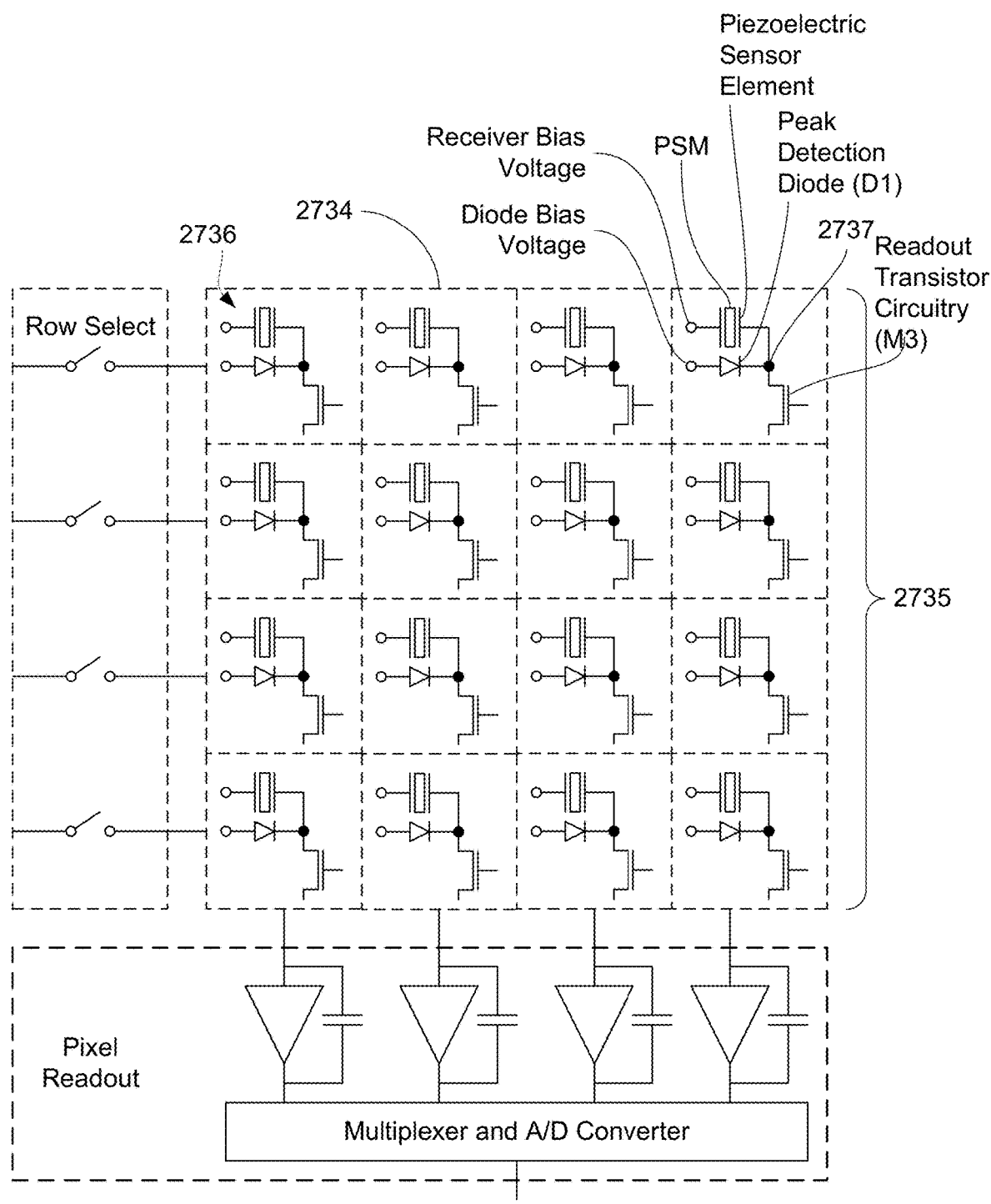
FIG. 27 representationally depicts aspects of a 4×4 pixel array of sensor pixels for an ultrasonic fingerprint sensor.

FIG. 27 representationally depicts aspects of a 4×4 pixel array of sensor pixels for an ultrasonic fingerprint sensor. Each sensor pixel 2734 may be, for example, associated with a local region of piezoelectric sensor material (PSM), a pixel input electrode 2737, a peak detection diode (D1) and a readout transistor circuitry (M3); many or all of these elements may be formed on or in a substrate to form the pixel circuit 2736. In practice, the local region of piezoelectric sensor material of each sensor pixel 2734 may transduce received ultrasonic energy into electrical charges. The peak detection diode D1 may register the maximum amount of charge detected by the local region of piezoelectric sensor material PSM. Each row of the pixel array 2735 may then be scanned, e.g., through a row select mechanism, a gate driver, or a shift register, and the readout transistor circuitry M3 for each column may be triggered to allow the magnitude of the peak charge for each sensor pixel 2734 to be read by additional circuitry, e.g., a multiplexer and an A/D converter. The pixel circuit 2736 may include one or more TFTs to allow gating, addressing, and resetting of the sensor pixels 2734.

Each pixel circuit 2736 may provide information about a small portion of the object detected by the ultrasonic fingerprint sensor. While, for convenience of illustration, the example shown in FIG. 27 is of a relatively coarse resolution, ultrasonic sensors having a resolution on the order of 500 pixels per inch or higher may be configured with an appropriately scaled structure. The detection area of the ultrasonic fingerprint sensor may be selected depending on the intended object of detection. For example, the detection area may range from about 8 mm×3 mm, 5 mm×5 mm or 9 mm×4 mm for a single finger to about 3 inches×3 inches for four fingers. Smaller and larger areas, including square, rectangular and non-rectangular geometries, may be used as appropriate for the target object.

Figure 28A:
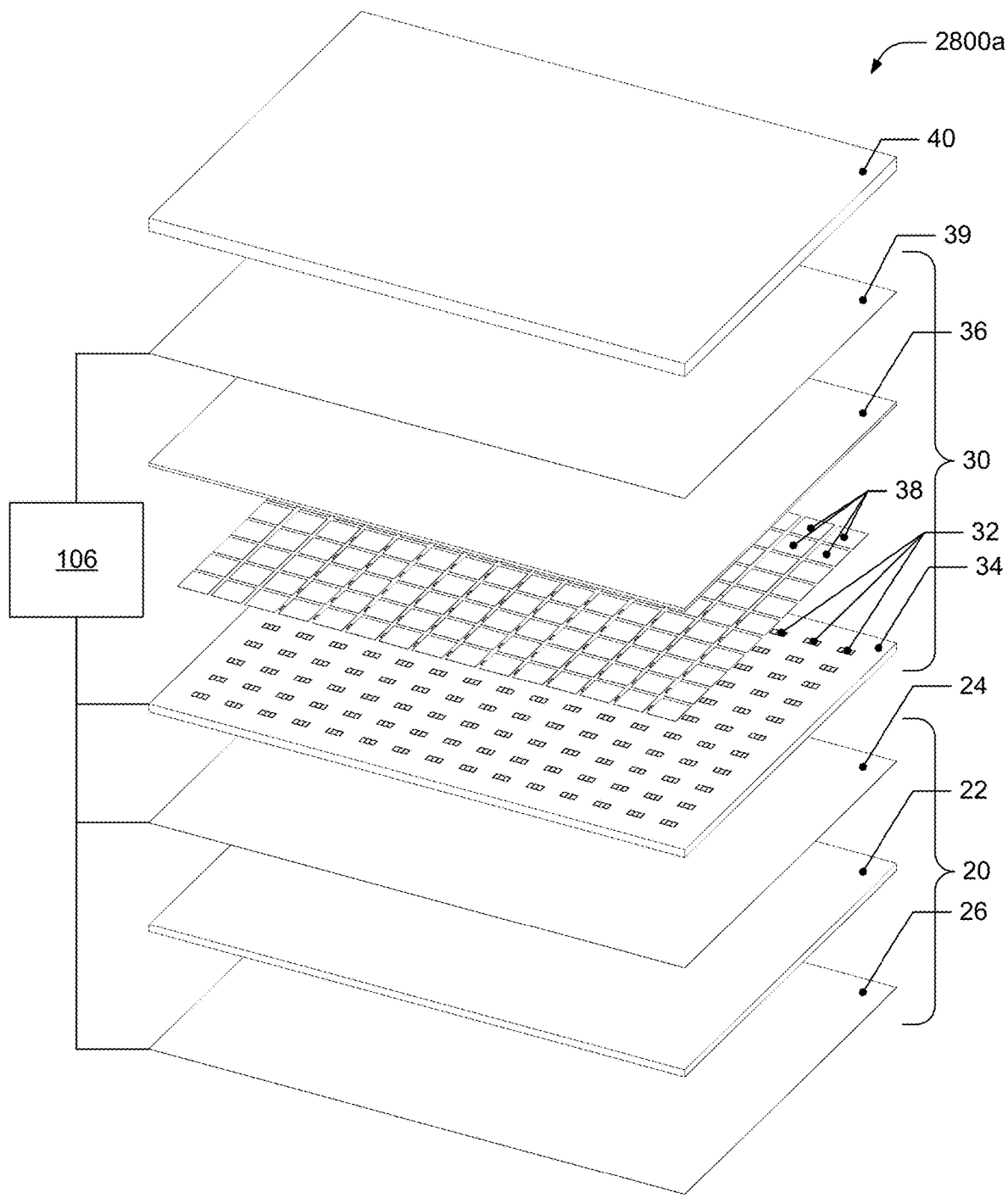
FIGS. 28A and 28B show example arrangements of ultrasonic transmitters and receivers in an ultrasonic fingerprint sensor, with other arrangements being possible.

FIG. 28A shows an example of an exploded view of an ultrasonic fingerprint sensor. In this example, the ultrasonic fingerprint sensor 2800a includes an ultrasonic transmitter 20 and an ultrasonic receiver 30 under a platen 40. According to some implementations, the ultrasonic receiver 30 may be an example of the ultrasonic receiver 103 that is shown in FIG. 1B and described above. In some implementations, the ultrasonic transmitter 20 may be an example of the ultrasonic transmitter 105 that is shown in FIG. 1B and described above. The ultrasonic transmitter 20 may include a substantially planar piezoelectric transmitter layer 22 and may be configured for functioning as a plane wave generator. Ultrasonic waves may be generated by applying a voltage to the piezoelectric layer to expand or contract the layer, depending upon the signal applied, thereby generating a plane wave. In this example, the control system 106 may be configured for causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be configured for processing the amplified signals received from the sensor pixel circuits 32.

The control system 106 may be configured for controlling the ultrasonic transmitter 20 and/or the ultrasonic receiver 30 to obtain ultrasonic data, which may include fingerprint data. According to some implementations, the control system 106 may be configured for providing functionality such as that described herein.

Whether or not the ultrasonic fingerprint sensor 2800a includes a separate ultrasonic transmitter 20, in some implementations the control system 106 may be configured for obtaining attribute information from the ultrasonic data. In some examples, the control system 106 may be configured for controlling access to one or more devices based, at least in part, on the attribute information. The ultrasonic fingerprint sensor 2800a (or an associated device) may include a memory system that includes one or more memory devices. In some implementations, the control system 106 may include at least a portion of the memory system. The control system 106 may be configured for obtaining attribute information from ultrasonic data and storing the attribute information in the memory system. In some implementations, the control system 106 may be configured for capturing a fingerprint image, obtaining attribute information from the fingerprint image and storing attribute information obtained from the fingerprint image (which may be referred to herein as fingerprint image information or fingerprint image data) in the memory system. According to some examples, the control system 106 may be configured for capturing a fingerprint image, obtaining attribute information from the fingerprint image and storing attribute information obtained from the fingerprint image even while maintaining the ultrasonic transmitter 20 in an "off" state.

In some implementations, the control system 106 may be configured for operating the ultrasonic fingerprint sensor 2800a in an ultrasonic imaging mode or a force-sensing mode. In some implementations, the control system may be configured for maintaining the ultrasonic transmitter 20 in an "off" state when operating the ultrasonic fingerprint sensor in a force-sensing mode. The ultrasonic receiver 30 may be configured for functioning as a force sensor when the ultrasonic fingerprint sensor 2800a is operating in the force-sensing mode. In some implementations, the control system 106 may be configured for controlling other devices, such as a display system, a communication system, etc. In some implementations, the control system 106 may be configured for operating the ultrasonic fingerprint sensor 2800a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is configured for imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 1 MHz to 20 MHz, with wavelengths on the order of a millimeter or less.

Figure 28B:
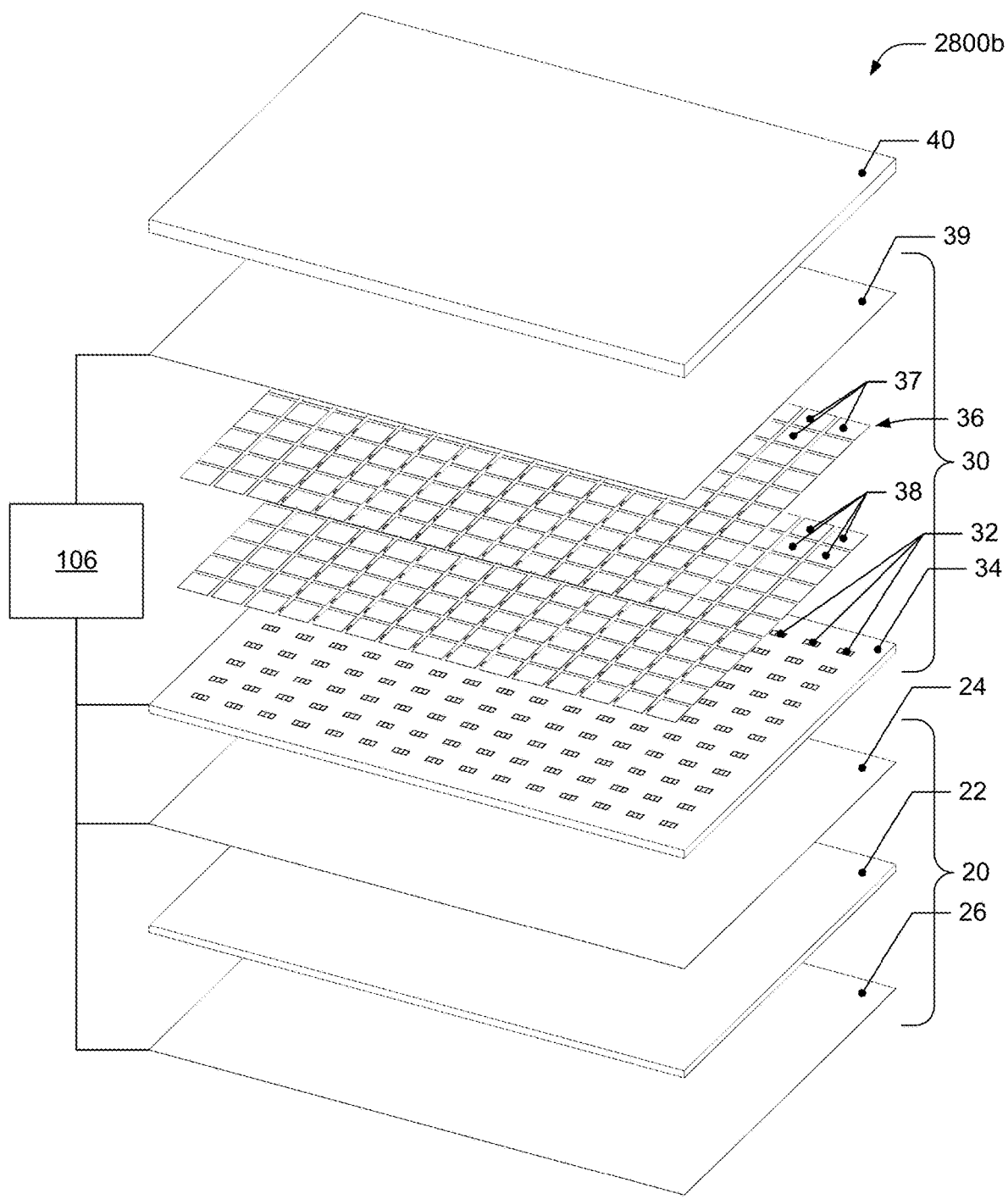

FIG. 28B shows an exploded view of an alternative example of an ultrasonic fingerprint sensor. In this example, the piezoelectric receiver layer 36 has been formed into discrete elements 37. In the implementation shown in FIG. 28B, each of the discrete elements 37 corresponds with a single pixel input electrode 38 and a single sensor pixel circuit 32. However, in alternative implementations of the ultrasonic fingerprint sensor 2800b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 28A and 28B show example arrangements of ultrasonic transmitters and receivers in an ultrasonic fingerprint sensor, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic fingerprint sensor may include an acoustic delay layer. For example, an acoustic delay layer may be incorporated into the ultrasonic fingerprint sensor between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic fingerprint sensor is arriving at the ultrasonic receiver 30. In some implementations, the substrate 34 and/or the platen 40 may serve as an acoustic delay layer.

Figure 28C:
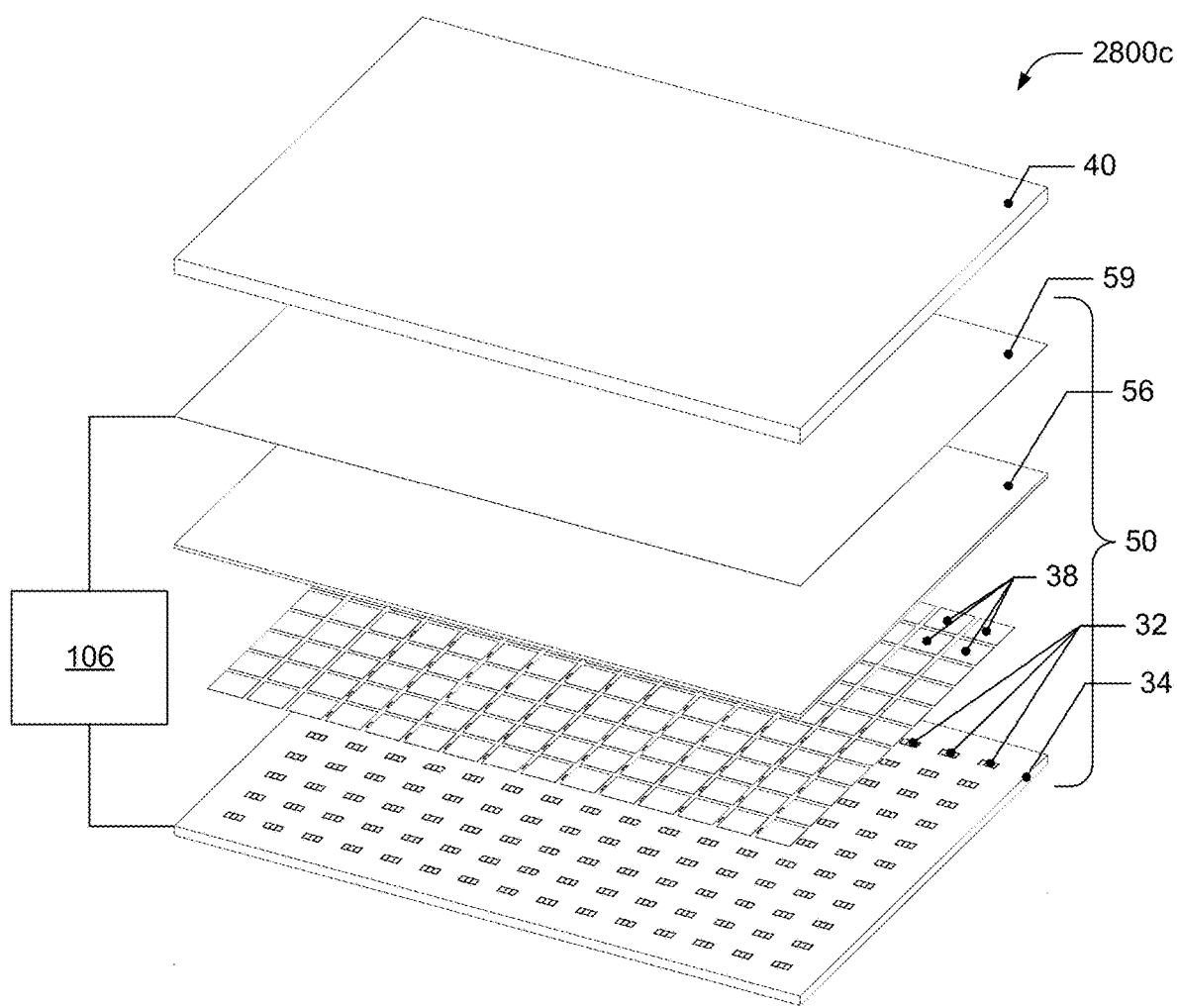
FIG. 28C shows an exploded view of an example of an ultrasonic fingerprint sensor.

FIG. 28C shows an exploded view of an example of an ultrasonic fingerprint sensor. In this example, the ultrasonic fingerprint sensor 2800c includes an ultrasonic transceiver array 50 under a platen 40. According to some implementations, the ultrasonic transceiver array 50 may serve as both the ultrasonic receiver 103 and the ultrasonic transmitter 105 that is shown in FIG. 1B and described above. The ultrasonic transceiver array 50 may include a substantially planar piezoelectric transceiver layer 56 configured for functioning as a plane wave generator. Ultrasonic waves may be generated by applying a voltage across the transceiver layer 56. The control system 106 may be configured for generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be configured for processing the amplified signals received from the sensor pixel circuits 32.

The control system 106 may be configured for controlling the ultrasonic transceiver array 50 to obtain ultrasonic data, which may include fingerprint data. According to some implementations, the control system 106 may be configured for providing functionality such as described herein.

In other examples of an ultrasonic fingerprint sensor with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

Implementation examples are described in the following numbered clauses:

1. A method of controlling an apparatus that includes a fingerprint sensor system, the method comprising: receiving, by a control system, fingerprint sensor data from the fingerprint sensor system; detecting, by the control system and according to the fingerprint sensor data, a presence of a digit on an outer surface of the apparatus in a fingerprint sensor system area; determining, by the control system and according to the fingerprint sensor data, a digit force or a digit pressure of the digit on the outer surface of the apparatus; making, by the control system and according to the fingerprint sensor data, a time threshold determination, the time threshold determination comprising determining whether a length of time during which the digit force exceeds a threshold digit force or during which the digit pressure exceeds a threshold digit pressure is greater than or equal to a threshold length of time; and determining, by the control system and based at least in part on the time threshold determination, whether to enable one or more emergency response functions of the apparatus.

2. The method of clause 1, wherein the one or more emergency response functions include one or more of initiating a telephone call to an emergency response telephone number, initiating a telephone call to a designated emergency communication recipient or initiating a text message to the designated emergency communication recipient.

3. The method of clause 1 or clause 2, wherein the one or more emergency response functions include one or more of initiating an audio recording session, initiating a video recording session, taking one or more photographs or causing one or more financial institution accounts to be locked.

4. The method of any one of clauses 1-3, further comprising: determining, by the control system and according to the fingerprint sensor data, a heart rate; and determining, by the control system, whether the heart rate equals or exceeds a threshold heart rate.

5. The method of clause 4, wherein the control system determines that the heart rate does not equal or exceed the threshold heart rate, further comprising controlling, by the control system, the apparatus to provide a prompt indicating that at least one of the one or more emergency response functions will be enabled if first specified user actions are taken.

6. The method of clause 5, wherein providing the prompt involves presenting a graphical user interface (GUI) on a display device of the apparatus.

7. The method of clause 5 or clause 6, wherein the first specified user actions comprise additional instances of digit force or additional instances of digit pressure to be applied in the fingerprint sensor system area.

8. The method of clause 4, wherein the control system determines that the heart rate equals or exceeds the threshold heart rate, further comprising estimating, by the control system and according to the fingerprint sensor data, an anxiety level.

9. The method of clause 8, wherein estimating the anxiety level involves detecting a presence of digit perspiration or an absence of digit perspiration.

10. The method of clause 9, wherein the control system detects the presence of digit perspiration, further comprising enabling, by the control system, the one or more emergency response functions.

11. The method of clause 10, further comprising determining user location data prior to enabling the one or more emergency response functions and providing the user location data with at least one emergency response communication.

12. The method of clause 9, wherein the control system does not detect the presence of digit perspiration, further comprising controlling, by the control system, the apparatus to provide a prompt indicating that at least one of the one or more emergency response functions will be enabled if second specified user actions are taken.

13. The method of clause 12, wherein the second specified user actions comprise additional instances of digit force or additional instances of digit pressure to be applied in the fingerprint sensor system area.

14. The method of any one of clauses 1-13, wherein receiving the fingerprint sensor data comprises receiving ultrasonic fingerprint sensor data.

15. The method of any one of clauses 1-14, further comprising determining, by the control system, whether the digit is a digit that is most often used for an authentication process.

16. The method of any one of clauses 1-15, further comprising determining, by the control system, whether the digit has been selected for triggering the one or more emergency response functions, wherein determining whether to enable one or more emergency response functions is based, at least in part, on whether the digit has been selected for triggering the one or more emergency response functions.

17. The method of any one of clauses 1-16, further comprising a pattern determination process of determining, by the control system, whether a complete pattern has been input via the fingerprint sensor system, wherein determining whether to enable one or more emergency response functions is based, at least in part, on the pattern determination process.

18. The method of clause 17, wherein the complete pattern comprises a number of instances of digit force or instances of digit pressure applied in the fingerprint sensor system area.

19. The method of clause 17 or clause 18, wherein the control system determines that the complete pattern has not been received via the fingerprint sensor system, further comprising controlling, by the control system, the apparatus to provide a prompt indicating that at least one of the one or more emergency response functions will be enabled if specified user actions are taken.

20. The method of clause 19, wherein providing the prompt involves presenting a graphical user interface (GUI) on a display device of the apparatus.

21. The method of clause 19 or clause 20, wherein the specified user actions comprise additional instances of digit force or additional instances of digit pressure to be applied in the fingerprint sensor system area.

22. The method of any one of clauses 1-21, further comprising performing, by the control system, an authentication process that is based, at least in part, on the fingerprint sensor data.

23. One or more non-transitory media having software stored thereon, the software including instructions for controlling one or more device to perform a method, the method comprising: receiving, by a control system, fingerprint sensor data from a fingerprint sensor system; detecting, by the control system and according to the fingerprint sensor data, a presence of a digit on an outer surface of an apparatus in a fingerprint sensor system area; determining, by the control system and according to the fingerprint sensor data, a digit force or a digit pressure of the digit on the outer surface of the apparatus; determining, by the control system and according to the fingerprint sensor data, a heart rate; and determining, by the control system and based at least in part on the heart rate and the digit force or the digit pressure, whether to enable one or more emergency response functions of the apparatus.

24. The one or more non-transitory media of clause 23, wherein the one or more emergency response functions include one or more of initiating a telephone call to an emergency response telephone number, initiating a telephone call to a designated emergency communication recipient, initiating a text message to the designated emergency communication recipient, initiating an audio recording session, initiating a video recording session, taking one or more photographs or causing one or more financial institution accounts to be locked.

25. The one or more non-transitory media of clause 23 or clause 24, further comprising determining, by the control system, whether the heart rate equals or exceeds a threshold heart rate.

26. The one or more non-transitory media of clause 25, wherein the control system determines that the heart rate does not equal or exceed the threshold heart rate, further comprising controlling, by the control system, the apparatus to provide a prompt indicating that at least one of the one or more emergency response functions will be enabled if first specified user actions are taken.

27. The one or more non-transitory media of clause 26, wherein providing the prompt involves presenting a graphical user interface (GUI) on a display device of the apparatus.

28. The one or more non-transitory media of clause 26 or clause 27, wherein the first specified user actions comprise additional instances of digit force or additional instances of digit pressure to be applied in the fingerprint sensor system area.

29. An apparatus, comprising: a fingerprint sensor system; and a control system configured to: receive fingerprint sensor data from a fingerprint sensor system; detect, according to the fingerprint sensor data, a presence of a digit on an outer surface of an apparatus in a fingerprint sensor system area; determine, according to the fingerprint sensor data, a digit force or a digit pressure of the digit on the outer surface of the apparatus; make a time threshold determination, the time threshold determination comprising determining whether a length of time during which the digit force exceeds a threshold digit force or during which the digit pressure exceeds a threshold digit pressure is greater than or equal to a threshold length of time; and determine, based at least in part on the time threshold determination, whether to enable one or more emergency response functions of the apparatus.

30. The apparatus of clause 29, wherein the control system is further configured to perform a pattern determination process of determining whether a complete pattern has been input via the fingerprint sensor system, wherein the complete pattern comprises a number of instances of digit force or additional instances of digit pressure applied in the fingerprint sensor system area and wherein determining whether to enable one or more emergency response functions is based, at least in part, on the pattern determination process.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. A method of controlling an apparatus that includes a fingerprint sensor system, the method comprising:
   receiving, by a control system, fingerprint sensor data from the fingerprint sensor system;
   detecting, by the control system and according to the fingerprint sensor data, a presence of a digit on an outer surface of the apparatus in a fingerprint sensor system area;
   determining, by the control system and according to the fingerprint sensor data, a digit force or a digit pressure of the digit on the outer surface of the apparatus;
   making, by the control system and according to the fingerprint sensor data, a time threshold determination, the time threshold determination comprising determining whether a length of time during which the digit force exceeds a threshold digit force or during which the digit pressure exceeds a threshold digit pressure is greater than or equal to a threshold length of time;
   determining, by the control system and according to the fingerprint sensor data, a heart rate;
   determining, by the control system, whether the heart rate equals or exceeds a threshold heart rate;
   wherein the control system determines that the heart rate does not equal or exceed the threshold heart rate, further comprising controlling, by the control system, the apparatus to provide a prompt indicating that at least one of the one or more emergency response functions will be enabled if first specified user actions are taken; and
   determining, by the control system and based at least in part on the time threshold determination, whether to enable one or more emergency response functions of the apparatus.

2. The method of claim 1, wherein the one or more emergency response functions include one or more of initiating a telephone call to an emergency response telephone number, initiating a telephone call to a designated emergency communication recipient or initiating a text message to the designated emergency communication recipient.

3. The method of claim 1, wherein the one or more emergency response functions include one or more of initiating an audio recording session, initiating a video recording session, taking one or more photographs or causing one or more financial institution accounts to be locked.

4. The method of claim 1, wherein providing the prompt involves presenting a graphical user interface (GUI) on a display device of the apparatus.

5. The method of claim 1, wherein the first specified user actions comprise additional instances of digit force or additional instances of digit pressure to be applied in the fingerprint sensor system area.

6. The method of claim 1, wherein the control system determines that the heart rate equals or exceeds the threshold heart rate, further comprising estimating, by the control system and according to the fingerprint sensor data, an anxiety level.

7. The method of claim 6, wherein estimating the anxiety level involves detecting a presence of digit perspiration or an absence of digit perspiration.

8. The method of claim 7, wherein the control system detects the presence of digit perspiration, further comprising enabling, by the control system, the one or more emergency response functions.

9. The method of claim 8, further comprising determining user location data prior to enabling the one or more emergency response functions and providing the user location data with at least one emergency response communication.

10. The method of claim 7, wherein the control system does not detect the presence of digit perspiration, further comprising controlling, by the control system, the apparatus to provide a prompt indicating that at least one of the one or more emergency response functions will be enabled if second specified user actions are taken.

11. The method of claim 10, wherein the second specified user actions comprise additional instances of digit force or additional instances of digit pressure to be applied in the fingerprint sensor system area.

12. The method of claim 1, wherein receiving the fingerprint sensor data comprises receiving ultrasonic fingerprint sensor data.

13. The method of claim 1, further comprising determining, by the control system, whether the digit is a digit that is most often used for an authentication process.

14. The method of claim 1, further comprising determining, by the control system, whether the digit has been selected for triggering the one or more emergency response functions, wherein determining whether to enable one or more emergency response functions is based, at least in part, on whether the digit has been selected for triggering the one or more emergency response functions.

15. The method of claim 1, further comprising a pattern determination process of determining, by the control system, whether a complete pattern has been input via the fingerprint sensor system, wherein determining whether to enable one or more emergency response functions is based, at least in part, on the pattern determination process.

16. The method of claim 15, wherein the complete pattern comprises a number of instances of digit force or instances of digit pressure applied in the fingerprint sensor system area.

17. The method of claim 15, wherein the control system determines that the complete pattern has not been received via the fingerprint sensor system, further comprising controlling, by the control system, the apparatus to provide a prompt indicating that at least one of the one or more emergency response functions will be enabled if specified user actions are taken.

18. The method of claim 17, wherein providing the prompt involves presenting a graphical user interface (GUI) on a display device of the apparatus.

19. The method of claim 17, wherein the specified user actions comprise additional instances of digit force or additional instances of digit pressure to be applied in the fingerprint sensor system area.

20. The method of claim 1, further comprising performing, by the control system, an authentication process that is based, at least in part, on the fingerprint sensor data.

21. One or more non-transitory media having software stored thereon, the software including instructions for controlling one or more device to perform a method, the method comprising:
   receiving, by a control system, fingerprint sensor data from a fingerprint sensor system;
   detecting, by the control system and according to the fingerprint sensor data, a presence of a digit on an outer surface of an apparatus in a fingerprint sensor system area;
   determining, by the control system and according to the fingerprint sensor data, a digit force or a digit pressure of the digit on the outer surface of the apparatus;

determining, by the control system and according to the fingerprint sensor data, a heart rate;

determining, by the control system and according to the fingerprint sensor data, a heart rate;

determining, by the control system, whether the heart rate equals or exceeds a threshold heart rate;

wherein the control system determines that the heart rate does not equal or exceed the threshold heart rate, further comprising controlling, by the control system, the apparatus to provide a prompt indicating that at least one of the one or more emergency response functions will be enabled if first specified user actions are taken; and determining, by the control system and based at least in part on the heart rate and the digit force or the digit pressure, whether to enable one or more emergency response functions of the apparatus.

22. The one or more non-transitory media of claim 21, wherein the one or more emergency response functions include one or more of initiating a telephone call to an emergency response telephone number, initiating a telephone call to a designated emergency communication recipient, initiating a text message to the designated emergency communication recipient, initiating an audio recording session, initiating a video recording session, taking one or more photographs or causing one or more financial institution accounts to be locked.

23. The one or more non-transitory media of claim 21, wherein providing the prompt involves presenting a graphical user interface (GUI) on a display device of the apparatus.

24. The one or more non-transitory media of claim 21, wherein the first specified user actions comprise additional instances of digit force or additional instances of digit pressure to be applied in the fingerprint sensor system area.

25. An apparatus, comprising:
a fingerprint sensor system; and
a control system configured to:
receive fingerprint sensor data from the fingerprint sensor system;
detect, according to the fingerprint sensor data, a presence of a digit on an outer surface of the apparatus in a fingerprint sensor system area;
determine, according to the fingerprint sensor data, a digit force or a digit pressure of the digit on the outer surface of the apparatus;
make a time threshold determination, the time threshold determination comprising determining whether a length of time during which the digit force exceeds a threshold digit force or during which the digit pressure exceeds a threshold digit pressure is greater than or equal to a threshold length of time;
determine, by the control system and according to the fingerprint sensor data, a heart rate;
determine, by the control system, whether the heart rate equals or exceeds a threshold heart rate;
wherein the control system determines that the heart rate does not equal or exceed the threshold heart rate, further comprising controlling, by the control system, the apparatus to provide a prompt indicating that at least one of the one or more emergency response functions will be enabled if first specified user actions are taken; and
determine, based at least in part on the time threshold determination, whether to enable one or more emergency response functions of the apparatus.

26. The apparatus of claim 25, wherein the control system is further configured to perform a pattern determination process of determining whether a complete pattern has been input via the fingerprint sensor system, wherein the complete pattern comprises a number of instances of digit force or additional instances of digit pressure applied in the fingerprint sensor system area and wherein determining whether to enable one or more emergency response functions is based, at least in part, on the pattern determination process.

* * * * *